United States Patent
Sato et al.

(10) Patent No.: US 12,302,017 B2
(45) Date of Patent: May 13, 2025

(54) SOLID-STATE IMAGING DEVICE

(71) Applicant: Sony Semiconductor Solutions Corporation, Kanagawa (JP)

(72) Inventors: Mamoru Sato, Kanagawa (JP); Akihiko Kato, Tokyo (JP); Yusuke Oike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 53 days.

(21) Appl. No.: 17/971,981

(22) Filed: Oct. 24, 2022

(65) Prior Publication Data

US 2023/0041457 A1 Feb. 9, 2023

Related U.S. Application Data

(63) Continuation of application No. 16/976,361, filed as application No. PCT/JP2019/000550 on Jan. 10, 2019, now Pat. No. 11,553,148.

(30) Foreign Application Priority Data

Apr. 4, 2018 (JP) .................................. 2018-072215

(51) Int. Cl.
  *H04N 25/673* (2023.01)
  *H04N 25/63* (2023.01)
  (Continued)

(52) U.S. Cl.
  CPC .......... *H04N 25/673* (2023.01); *H04N 25/63* (2023.01); *H04N 25/633* (2023.01);
  (Continued)

(58) Field of Classification Search
  None
  See application file for complete search history.

(56) References Cited

U.S. PATENT DOCUMENTS 10,104,321 B1 * 10/2018 Sohn ...................... H04N 25/63
2003/0052982 A1   3/2003 Chieh
(Continued)

FOREIGN PATENT DOCUMENTS

CN    101094322 A    12/2007
CN    104113708 A    10/2014
(Continued)

OTHER PUBLICATIONS

Extended European Search Report dated Apr. 8, 2021 for corresponding European Application No. 19780747.2.

*Primary Examiner* — Paul M Berardesca
(74) *Attorney, Agent, or Firm* — Michael Best & Friedrich LLP

(57) ABSTRACT

To improve the image quality of image data in a solid-state imaging device that reads a signal according to a potential difference between respective floating diffusion regions of a pair of pixels.

A pixel unit is provided with a plurality of rows each including a plurality of pixels. A readout row selection unit selects any of the plurality of rows as a readout row every time a predetermined period elapses, and causes each of the plurality of pixels in the readout row to generate a signal potential according to a received light amount. A reference row selection unit selects a row different from a previous row from among the plurality of rows as a current reference row every time the predetermined period elapses, and causes each of the plurality of pixels in the reference row to generate a predetermined reference potential. A readout circuit unit reads a voltage signal according to a difference between the signal potential and the reference potential.

6 Claims, 57 Drawing Sheets

(51) Int. Cl.
*H04N 25/633* (2023.01)
*H04N 25/677* (2023.01)
*H04N 25/778* (2023.01)
*H04N 25/74* (2023.01)
*H04N 25/79* (2023.01)

(52) U.S. Cl.
CPC ......... *H04N 25/677* (2023.01); *H04N 25/778* (2023.01); *H04N 25/74* (2023.01); *H04N 25/79* (2023.01)

(56) References Cited

U.S. PATENT DOCUMENTS

| | | |
|---|---|---|
| 2004/0051802 A1 | 3/2004 | Krymski |
| 2004/0222351 A1* | 11/2004 | Rossi ............... H04N 5/262 348/E3.018 |
| 2008/0258047 A1* | 10/2008 | Sakakibara .......... H04N 25/616 250/214 C |
| 2009/0190005 A1 | 7/2009 | Mo et al. |
| 2010/0097501 A1* | 4/2010 | Fowler ................ H04N 25/778 348/241 |
| 2011/0273601 A1 | 11/2011 | Egawa |
| 2012/0212657 A1* | 8/2012 | Mo ..................... H04N 25/677 348/300 |
| 2012/0286139 A1* | 11/2012 | Tashiro ............... H01L 27/146 250/208.1 |
| 2014/0240569 A1* | 8/2014 | Yang ..................... H04N 25/63 348/308 |
| 2014/0307142 A1* | 10/2014 | Matsumoto ........... H04N 25/63 348/308 |
| 2019/0289240 A1* | 9/2019 | Zhu ....................... H04N 25/77 |
| 2020/0106975 A1* | 4/2020 | Oike ..................... H04N 25/75 |
| 2021/0352232 A1* | 11/2021 | Yorikado ........... H01L 27/14641 |

FOREIGN PATENT DOCUMENTS

| | | | |
|---|---|---|---|
| JP | 2008-271280 A | 11/2008 | |
| JP | 2014-207631 A | 10/2014 | |
| KR | 20080095175 A | 10/2008 | |
| KR | 20140107045 A | 9/2014 | |
| WO | 2015084991 A1 | 6/2015 | |
| WO | 2016/190116 A1 | 12/2016 | |
| WO | WO-2017134969 A1 | 8/2017 | |
| WO | WO-2017179319 A1 * | 10/2017 | ........... H01L 27/146 |
| WO | 2018190127 A1 | 10/2018 | |

* cited by examiner

FIG. 37
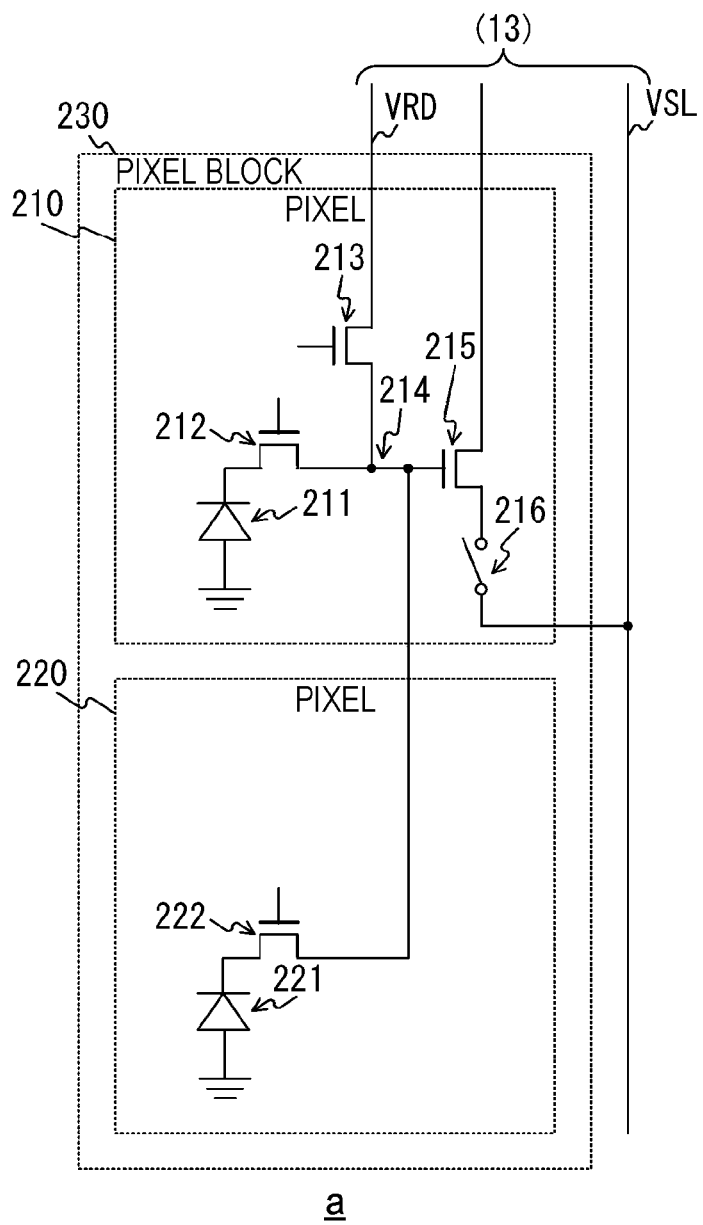
a
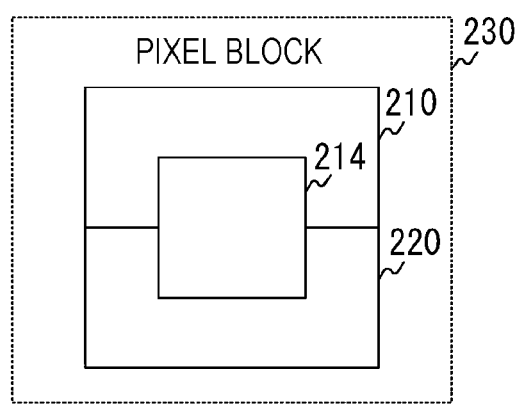
b

SOLID-STATE IMAGING DEVICE

CROSS REFERENCE TO RELATED APPLICATIONS

The present application is a Continuation of application Ser. No. 16/976,361, filed Aug. 27, 2020, which is a 371 National Stage Entry of International Application No. PCT/JP2019/000550, filed on Jan. 10, 2019, which claims the benefit of Japanese Priority Patent Application JP 2018-072215 filed on Apr. 4, 2018, the entire contents of which are incorporated herein by reference.

TECHNICAL FIELD

The present technology relates to a solid-state imaging device. More specifically, the present technology relates to a solid-state imaging device that reads a signal according to a difference in potential between a pair of pixels.

BACKGROUND ART

Conventionally, complementary metal oxide semiconductor (CMOS) image sensors have been used in imaging devices and the like. For example, there has been proposed a differential amplification CMOS image sensor that amplifies and reads a potential difference between respective floating diffusion regions of an effective pixel and a dummy pixel (see, for example, Patent Document 1). Here, the effective pixel is a pixel provided with a photodiode, and the dummy pixel is a pixel not provided with a photodiode. The dummy pixels are arranged in a dummy row or the like around a region where the effective pixels are arranged, and the same dummy row is selected every time an effective pixel row is selected. Then, in the selected effective pixel row and dummy row, a signal corresponding to the potential difference between the respective floating diffusion regions of the effective pixel and the dummy pixel in the same column is read.

CITATION LIST

Patent Document

Patent Document 1: Japanese Patent Application Laid-Open No. 2008-271280

SUMMARY OF THE INVENTION

Problems to be Solved by the Invention

In the above-described conventional technology, image data can be read with high sensitivity in, for example, a dark place by amplifying the potential difference. However, since the same dummy row is selected every time the effective pixel row is read, fixed pattern noise generated in the dummy row appears in all the effective pixel rows, and a horizontal stripe called streaking appears in the image data. Then, there is a problem that the image quality of the image data is deteriorated due to the streaking or the like.

The present technology has been made in view of such circumstances, and an object of the present technology is to improve the image quality of image data in a solid-state imaging device that reads a signal according to a potential difference between respective floating diffusion regions of a pair of pixels.

Solutions to Problems

The present technology has been made to solve the above-described problems, and the first aspect thereof is a solid-state imaging device including: a pixel unit provided with a plurality of rows, each row including a plurality of pixels; a readout row selection unit configured to select one of the plurality of rows as a readout row every time a predetermined period elapses and cause each of the plurality of pixels in the readout row to generate a signal potential according to a received light amount; a reference row selection unit configured to select a row different from a previous row from among the plurality of rows as a current reference row every time the predetermined period elapses, and cause each of the plurality of pixels in the reference row to generate a predetermined reference potential; and a readout circuit unit configured to read a signal according to a difference between the signal potential and the reference potential. This brings about an effect that a signal corresponding to the difference between the signal potential and the reference potential is read.

Furthermore, in the first aspect, a random number generation unit configured to generate a predetermined random number may be further included, and the reference row selection unit may select the reference row on the basis of the random number. This brings about an effect that a signal corresponding to a difference between the random reference row and the readout row is read.

Furthermore, in the first aspect, the plurality of rows may include an effective pixel row including an effective pixel that performs photoelectric conversion and a dummy pixel row including a dummy pixel that does not perform photoelectric conversion, the readout row selection unit may select one of the effective pixel rows as the readout row, and the reference row selection unit may select one of the dummy pixel rows as the reference row. This brings about an effect that a signal corresponding to a difference between the dummy row and the readout row is read.

Furthermore, in the first aspect, the plurality of rows may include an effective pixel row including an effective pixel that performs photoelectric conversion, the readout row selection unit may select one of the effective pixel rows as the readout row, and the reference row selection unit may select a row different from the readout row from among the effective pixel rows as the reference row. This brings about an effect that a signal corresponding to a difference between the reference row different from the readout row and the readout row is read.

Furthermore, in the first aspect, the reference row selection unit may select an effective pixel row adjacent to the readout row in a direction perpendicular to a predetermined direction as the reference row. This brings about an effect that a signal corresponding to a difference between the reference row adjacent to the readout row and the readout row is read.

Furthermore, in the first aspect, the reference row selection unit may select the effective pixel row at a predetermined relative position to the readout row in a direction perpendicular to the predetermined direction as the reference row. This brings about an effect that a signal corresponding to a difference between the reference row at the predetermined relative position to the readout row and the readout row is read.

Furthermore, in the first aspect, the readout row selection unit may select one of the effective pixel rows as the readout row, and the reference row selection unit may select the effective pixel row at a predetermined relative position to the readout row in a direction perpendicular to the predetermined direction as the reference row. This brings about an effect that a signal corresponding to differences between one of the effective pixel rows and the pair of reference rows is read.

Furthermore, in the first aspect, the readout row selection unit may select a pair of the effective pixel rows not sharing a charge-voltage conversion unit as the readout rows, and the reference row selection unit may select two pairs of the effective pixel rows each pair sharing the charge-voltage conversion unit as the reference rows. This brings about an effect that a signal corresponding to differences between the pair of effective pixel rows and the two pairs of reference rows is read.

Furthermore, in the first aspect, the readout row selection unit may select a pair of the effective pixel rows not sharing a charge-voltage conversion unit as the readout rows, and the reference row selection unit may select a pair of the effective pixel rows sharing the charge-voltage conversion unit as the reference rows. This brings about an effect that a signal corresponding to differences between the pair of effective pixel rows and the pair of reference rows is read.

Furthermore, in the first aspect, the predetermined period may be a period of a horizontal synchronization signal, and the reference row selection unit may select a row different from the reference row corresponding to the previous readout row as the reference row every time a period of a predetermined vertical synchronization signal having a lower frequency than the horizontal synchronization signal elapses. This brings about an effect that a signal corresponding to a difference between the reference row different from the previous reference row and the readout row is read every time the period of the vertical synchronization signal elapses.

Furthermore, in the first aspect, each of the plurality of pixels in the readout row may include a readout-side amplification transistor provided according to each of input signals from a plurality of input channels and which amplifies the input signal input via a sample-hold circuit, each of the plurality of pixels in the reference row may include a reference-side amplification transistor paired with each of the readout-side amplification transistors, and an output of the readout-side amplification transistor may be set for the sample-hold circuit on a side of the readout-side amplification transistor as a negative feedback, and an arbitrary voltage may be set for a sample-hold circuit on a side of the reference-side amplification transistor.

Furthermore, in the first aspect, each of the plurality of pixels may include a photoelectric conversion unit, a transfer transistor configured to transfer a charge photoelectrically converted by the photoelectric conversion unit, a charge-voltage conversion unit configured to convert the charge transferred by the transfer transistor into a voltage signal, and a reset transistor configured to reset the charge-voltage conversion unit.

Furthermore, in the first aspect, each of the plurality of pixels may further include a selection transistor that selects the pixel, and the selection transistor may select an arbitrary pair of a readout pixel including the readout-side amplification transistor and a reference pixel including the reference-side amplification transistor.

Furthermore, in the first aspect, a reference pixel including the reference-side amplification transistor may be read on a column-by-column basis.

Furthermore, in the first aspect, in a reference pixel including the reference-side amplification transistor, the transfer transistor and the charge-voltage conversion unit may be configured as a same as an effective pixel that accumulates and reads a signal.

Furthermore, in the first aspect, each of the plurality of pixels is capable of source follower-type readout, and the readout circuit unit can further include a switching unit that switches the source-follower readout and a differential amplification readout.

Furthermore, in the first aspect, the readout circuit unit may further include a switching unit that switches a readout pixel including the readout-side amplification transistor and a reference pixel including the reference-side amplification transistor.

Furthermore, in the first aspect, the readout circuit unit may complementarily switch wire connection between the readout-side amplification transistor and the reference-side amplification transistor after reading a signal read by the readout-side amplification transistor via the transfer transistor according to a differential pair with the reference-side amplification transistor, and read a signal read by the reference-side amplification transistor before switching via the transfer transistor according to a differential pair with the readout-side amplification transistor before switching.

Furthermore, in the first aspect, the switching unit may set the effective pixel near the effective pixel that accumulates and reads a signal as the reference pixel including the reference-side amplification transistor.

Furthermore, in the first aspect, in a plurality of the reference-side amplification transistors, source sides, drain sides, or both of the source sides and the drain sides of all or some of the plurality of reference-side amplification transistors may be connected by wire.

Furthermore, in the first aspect, each of the plurality of pixels in the readout row may include a readout-side amplification transistor provided according to each of input signals from a plurality of input channels and which amplifies the input signal input via a sample-hold circuit, each of the plurality of pixels in the reference row may include a reference-side amplification transistor paired with each of the readout-side amplification transistors, and in a plurality of the reference-side amplification transistors, source sides, drain sides, or both of the source sides and the drain sides of all or some of the plurality of reference-side amplification transistors may be connected by wire.

Furthermore, in the first aspect, the input channels may be included in pixels two-dimensionally arranged in a matrix in a pixel array unit, and each of the plurality of pixels may include a photoelectric conversion unit, a transfer transistor configured to transfer a charge photoelectrically converted by the photoelectric conversion unit, a charge-voltage conversion unit configured to convert the charge transferred by the transfer transistor into a voltage signal, and a reset transistor configured to reset the charge-voltage conversion unit.

Furthermore, in the first aspect, each of the pixels may further include a selection transistor that selects the pixel, and the selection transistor may select an arbitrary pair of a readout pixel including the readout-side amplification transistor and a reference pixel including the reference-side amplification transistor.

Furthermore, in the first aspect, a reference pixel including the reference-side amplification transistor may be read on a column-by-column basis, and a number of reference pixels connected by wire with the reference-side amplification transistors may be a same as a number of readout pixels including the readout-side amplification transistors or less than the number of the readout pixels.

Furthermore, in the first aspect, in a reference pixel including the reference-side amplification transistor, the transfer transistor and the charge-voltage conversion unit may be configured as a same as an effective pixel that accumulates and reads a signal.

Furthermore, in the first aspect, each of the plurality of pixels is capable of source follower-type readout, and the readout circuit unit may further include a switching unit that switches the source-follower readout and a differential amplification readout.

Furthermore, in the first aspect, the readout circuit unit may further include a switching unit that switches a readout pixel including the readout-side amplification transistor and a reference pixel including the reference-side amplification transistor.

Furthermore, in the first aspect, the solid-state imaging device may complementarily switch wire connection between the readout-side amplification transistor and the reference-side amplification transistor after reading a signal read by the readout-side amplification transistor via the transfer transistor according to a differential pair with the reference-side amplification transistor, and read a signal read by the reference-side amplification transistor before switching via the transfer transistor according to a differential pair with the readout-side amplification transistor before switching.

Furthermore, in the first aspect, the switching unit may set the effective pixel near the effective pixel that accumulates and reads a signal as the reference pixel including the reference-side amplification transistor.

Furthermore, in the first aspect, the input signal may be input to the readout-side amplification transistors and the reference-side amplification transistor via a sample-hold circuit, an output of the differential amplification circuit may be set for the sample-hold circuit on a side of the readout-side amplification transistor as a negative feedback, and an arbitrary voltage may be set for the sample-hold circuit on a side of the reference-side amplification transistor.

Furthermore, in the first aspect, the readout circuit unit may further include a switch configured to connect, by wire, source sides, drain sides, or both of the source sides and the drain sides of all or some of the plurality of reference-side amplification transistors in a case of an on state. This brings about an effect that the source sides, drain sides, or both of the source sides and the drain sides of all or some of the amplification transistors are connected by wire by the control of the switch.

Furthermore, the second aspect of the present technology is a solid-state imaging device including: a pixel unit provided with a plurality of effective pixels each configured to perform photoelectric conversion and a plurality of light-shielding rows each configured not to perform photoelectric conversion; an effective pixel row selection unit configured to set one of a pair of the effective pixels of the plurality of effective pixels as a readout effective pixel and cause the readout effective pixel to generate a potential according to a received light amount, and set the other of the pair of effective pixels as a reference effective pixel and cause the reference effective pixel to generate a predetermined potential; a light-shielding pixel row selection unit configured to set one of a pair of the light-shielding pixels of the plurality of light-shielding pixels as a readout light-shielding pixel and cause the readout light-shielding pixel to generate a potential according to a dark current, and set the other of the pair of effective pixels as a reference light-shielding pixel and cause the reference light-shielding pixel to generate a predetermined potential; and a readout circuit configured to read a signal according to a difference between the potential of the readout effective pixel and a potential obtained by averaging the potential of the reference effective pixel and the potential of the reference light-shielding pixel, and read a signal according to a difference between the potential of the readout light-shielding pixel and the averaged potential. This brings about an effect that a signal corresponding to the difference between the potential of the readout light-shielding pixel and the averaged potential is read.

Effects of the Invention

According to the present technology, a solid-state imaging device that reads a signal according to a potential difference between respective floating diffusion regions of a pair of pixels exhibits an excellent effect of improving the image quality of image data. Note that effects described here are not necessarily limited, and any of effects described in the present disclosure may be exhibited.

BRIEF DESCRIPTION OF DRAWINGS

FIG. 37 is a diagram illustrating a configuration example of a pixel according to a fourth embodiment of the present technology.

MODE FOR CARRYING OUT THE INVENTION

Figure 1:
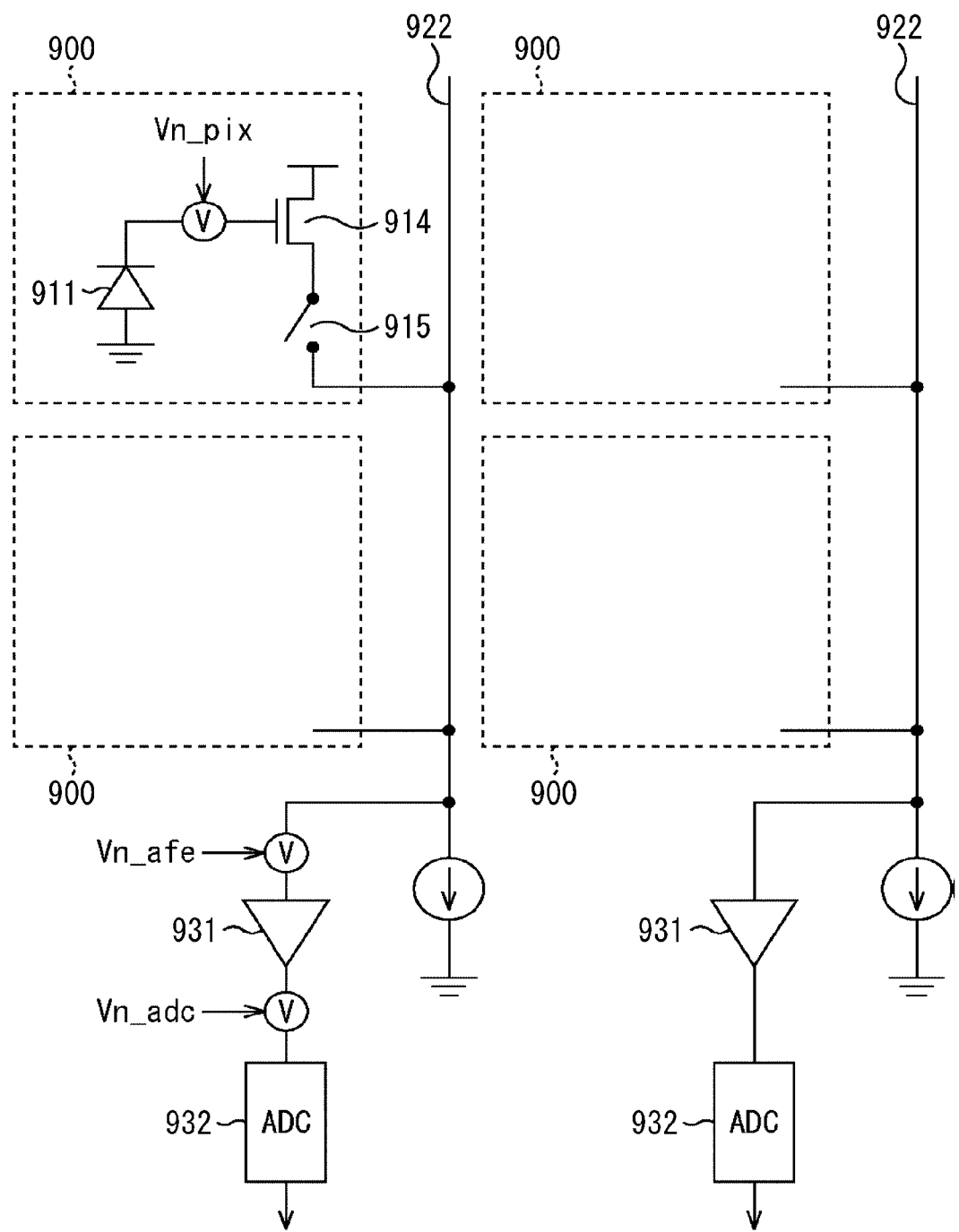
FIG. 1 is a circuit diagram illustrating noise occurrence portion in a source-follower readout configuration.

Hereinafter, modes for implementing the present technology (hereinafter referred to as embodiments) will be described. Description will be given according to the following order.
1. Overview of Present Technology
2. Configuration of Solid-State Imaging Device
3. First Embodiment: a configuration of setting a reset voltage by external application and negative feedback
4. Second Embodiment: a configuration of laterally connecting reference-side amplification transistors 5. Third Embodiment: an example of selecting an effective pixel row as a reference row
6. Fourth Embodiment: an example of reading one row at a time and selecting one FD row as a reference row
7. Fifth Embodiment: an example of reading two rows at a time and selecting a pair of FD rows as reference rows
8. Sixth Embodiment: an example of reading two rows at a time and selecting one FD row as reference row
9. Seventh Embodiment: an example of selecting a dummy row as a reference row
10. Eighth Embodiment: an example of selecting a dummy row different from a previous dummy row as a reference row
11. Ninth Embodiment: an example of selecting an effective pixel row different from a previous effective pixel row as a reference row
12. Tenth Embodiment: an example of correcting a black-level offset
13. Modification
14. Configuration of Electronic Device
15. Use Example of Solid-State Imaging Device
16. Application Example to Moving Body 1. Overview of the Present Technology In a CMOS image sensor, each of unit pixels (hereinafter also referred to as pixels) two-dimensionally arranged in a matrix manner in a pixel array unit includes a photodiode (PD) as a photoelectric conversion unit, a floating diffusion region (FD) for converting electrons photoelectrically converted by the photodiode into a voltage, and an amplification transistor having the voltage obtained in the floating diffusion region (FD) as a gate input, and typically, readout by a source-follower circuit using the amplification transistor (hereinafter referred to as source-follower readout) is performed.

Meanwhile, there is a configuration to perform readout by a source ground circuit, or a configuration to perform readout by a differential amplification circuit (hereinafter referred to as differential amplification readout) (for example, see Patent Document 1 described above) although the pixels have a similar configuration.

By the way, in the pixel, the electrons generated in the photodiode are converted into a voltage with voltage conversion efficiency per electron ($\mu$V/e−) according to a parasitic capacitance of an FD node. Voltage amplitude $\Delta$Vfd of the FD node according to the number of signal electrons is read from the pixels two-dimensionally arranged in the pixel array unit via the amplification transistors.

At this time, noise is superimposed on the read signal. Main sources of the noise include, for example, those illustrated in FIG. 1.

That is, there are noise Vn_pix ($\mu$Vrms) generated by an amplification transistor 914 in a pixel 900, noise Vn_afe ($\mu$Vrms) generated by an analog circuit (analog front end (AFE)) 931 for, for example, amplifying the voltage read from the two-dimensionally arranged pixels via a vertical signal line (VSL) 922, and noise Vn_adc ($\mu$Vrms) generated by an analog digital converter (ADC) 932.

In the following description, the noise Vn_pix is defined as noise input and converted into voltage noise generated at the FD node, the noise Vn_afe is defined as noise converted into voltage noise generated in the vertical signal line 922, and the noise Vn_adc is defined as noise converted into noise generated at an input node of the analog-digital conversion circuit 932.

In the source-follower readout configuration, gain Asf of voltage amplitude $\Delta$Vvsl of the vertical signal line (VSL) 922 is 0.8 to 1.0 times the voltage amplitude $\Delta$Vfd of the FD node. Thus, the relationship of the following expression (1) is satisfied.

$$\Delta Vvsl = Asf \times \Delta Vfd \quad (1)$$

Here, the electron-voltage conversion efficiency ($\mu$V/e−) at the FD node is $\eta$fd. That is, the relationship of the following expression (2) is satisfied in a case where the electron-voltage conversion efficiency ($\mu$V/e−) in the vertical signal line 922 is $\eta$vsl.

$$\eta vsl = Asf \times \eta fd \quad (2)$$

Furthermore, the relationship of the following expression (3) can be expressed where the number of signal electrons is Nsig_e.

$$\Delta Vvsl = \eta vsl \times Nsig\_e = \eta fd \times Asf \times Nsig\_e \quad (3)$$

Note that, here, for simplicity, when the noise superimposed on the output of AD conversion is converted into the voltage noise generated in the vertical signal line 922, assuming that the analog circuit (AFE) 931 does not perform voltage amplification, that is, a gain is 1 time, and Vn_total ($\mu$Vrms) is obtained, the noise becomes a sum (root mean square) of Vn_adc, Vn_afe, and Afd$\times$Vn_pix.

This represents that Vn_total noise is superimposed on the VSL signal amplitude $\Delta$Vvsl by the number of electrons Nsig_e. Here, from the viewpoint of the image quality, how much noise is superimposed on a certain number of signal electrons is important, so when converting noise into the number of electrons at the FD node (unit: e-rms), the relationship of the following expression (4) is satisfied.

[Math. 1]

$$Vn\_total\_e = \sqrt{\{(Vn\_adc/\eta vsl)^2 + (Vn\_afe/\eta vsl)^2 + (Vn\_pix/\eta fd)^2\}} \quad \text{Expression 4}$$

Note that, in the expression (4), since the relationship of $\eta$vsl=Asf$\times\eta$fd is obtained from the above expression (2), the influence of Vn_adc and Vn_afe can be reduced by increasing Asf. Furthermore, the influence of Vn_adc, Vn_afe, and Vn_pix can be reduced by increasing $\eta$fd.

Asf is a voltage gain of the source-follower circuit as described above, and is generally 0.8 to 1.0, and logically 1.0 or less. Therefore, improvement is difficult. $\eta$fd is determined according to a total parasitic capacitance Cfd seen from the FD node, and satisfies the relationship of the following expression (5).

$$\eta fd = e/Cfd \quad (5)$$

Note that, in the expression (5), e represents an electron content and is a constant of 1.602$\times$10$^{-19}$ clones. There is a physical limit to capacitance reduction for noise reduction. Moreover, if a structure where a plurality of pixels shares a transistor is adopted to decrease a pixel pitch, Cfd becomes large and it becomes more difficult to increase $\eta$fd.

Figure 2:
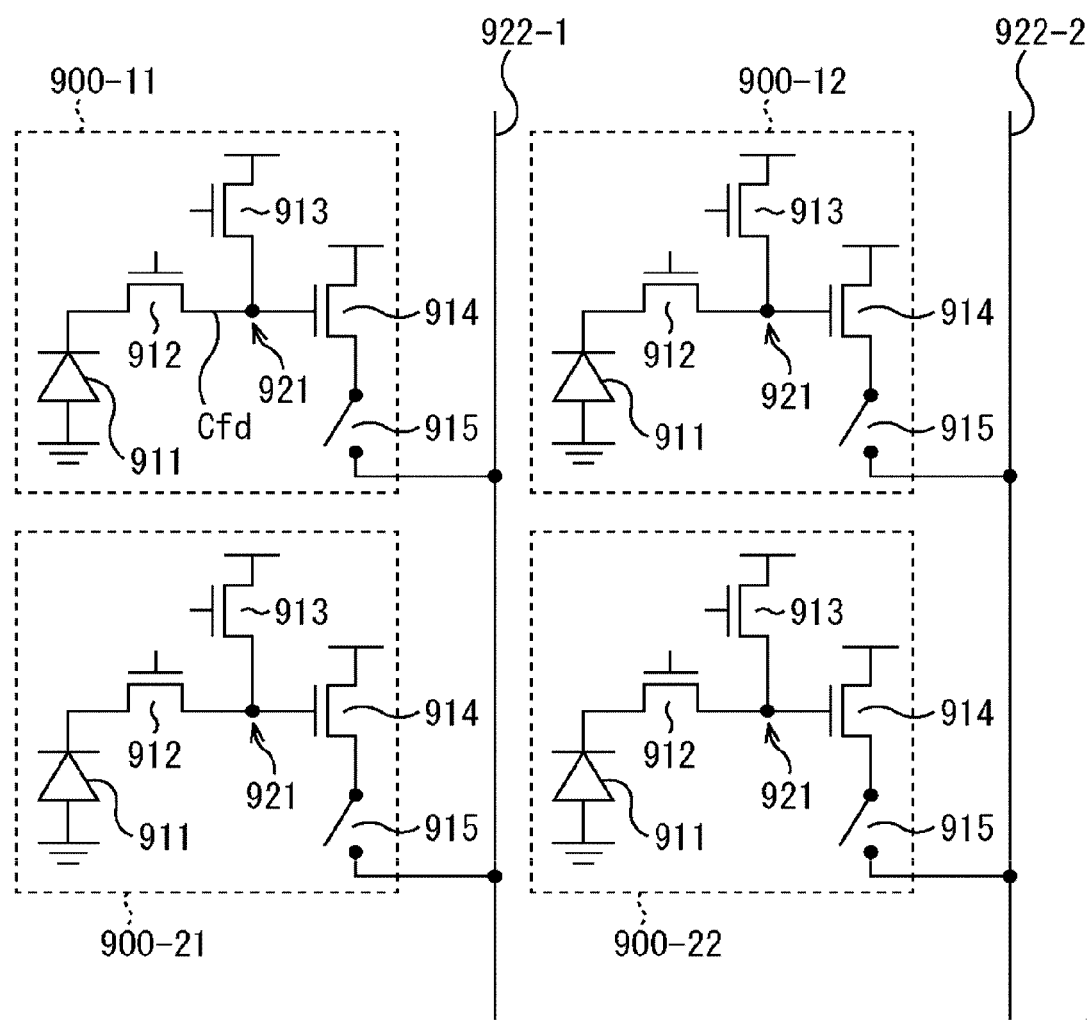
FIG. 2 is a circuit diagram illustrating a configuration in a case of no pixel sharing.

Note that FIG. 2 illustrates, as an example of pixels arranged in a pixel array unit, a configuration of a case where pixel sharing is not performed among pixels 900-11, 900-12, 900-21, and 900-22, and signals are independently read in respective pixels.

Figure 3:
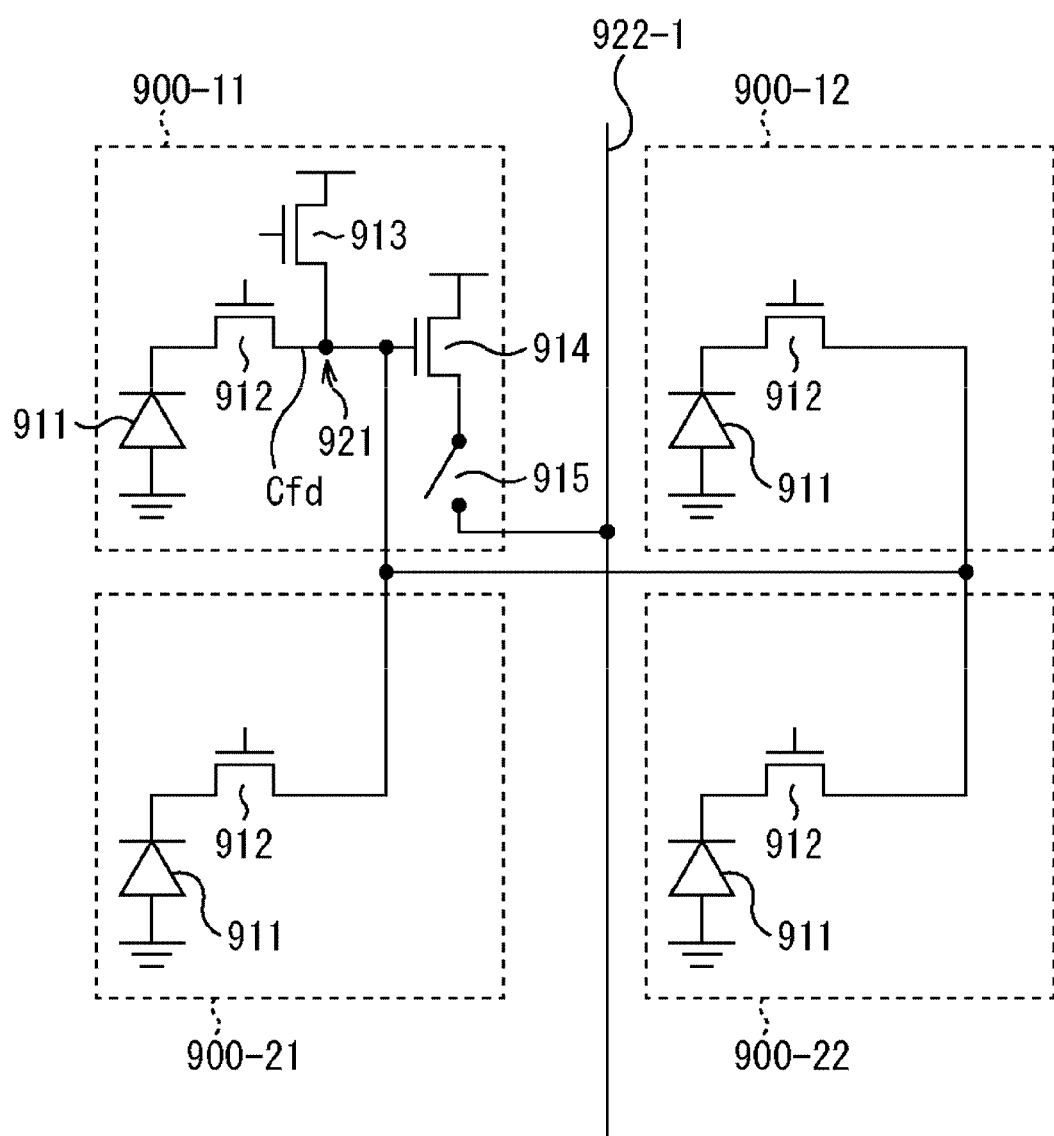
FIG. 3 is a circuit diagram illustrating a configuration in a case of pixel sharing.

Furthermore, FIG. 3 illustrates a configuration of a case where pixel sharing is performed among the four pixels 900-11, 900-12, 900-21, and 900-22, and a floating diffusion region (FD) 921 and the amplification transistor 914 of the pixel 900-11 are used by the other pixels.

As described above, in the source-follower readout configuration, the value of Asf is about 1 time, so if ηfd cannot be increased in a fine pixel, ηvsl cannot be designed large, and as a result, noise cannot be reduced.

Figure 4:
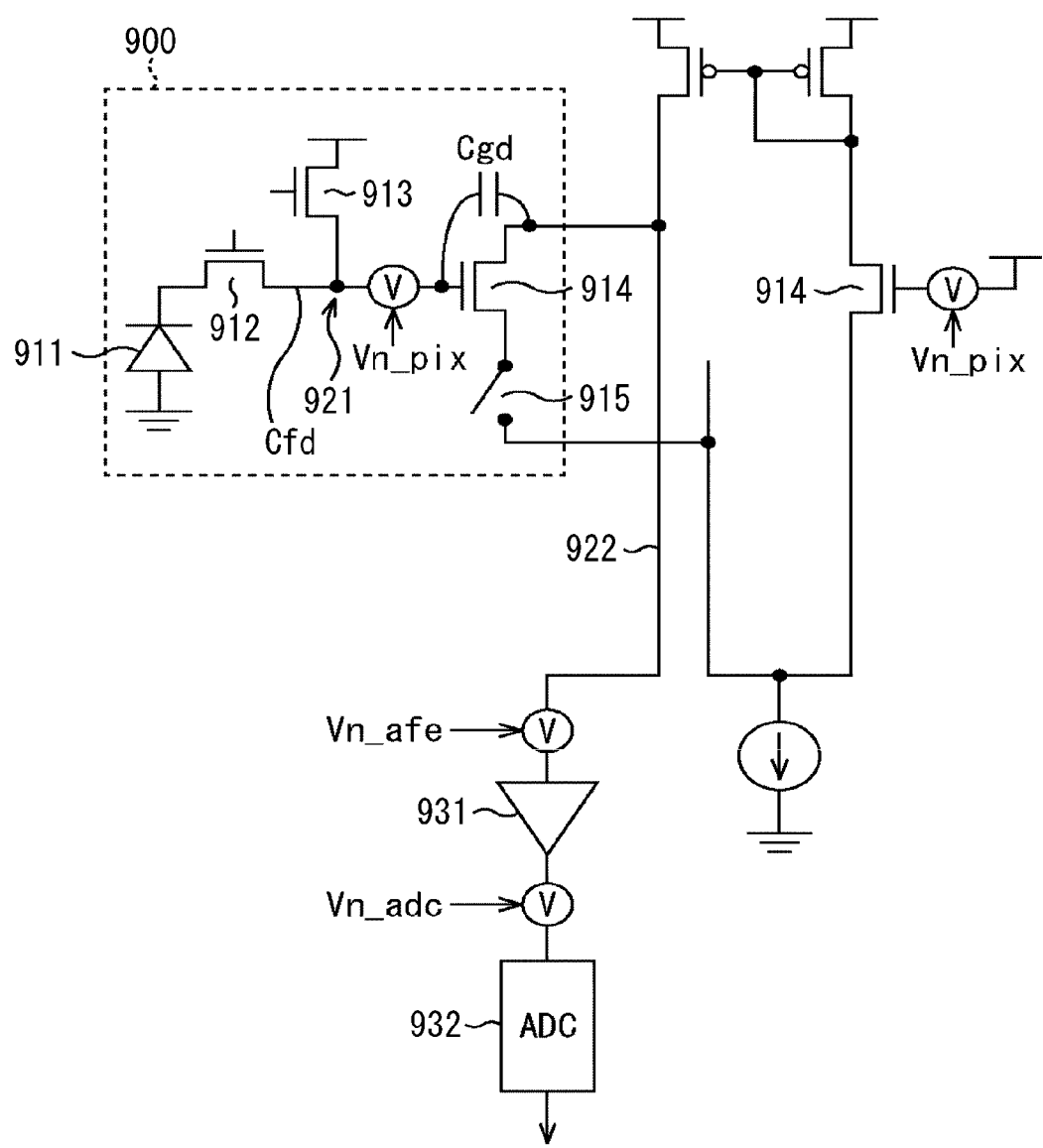
FIG. 4 is a circuit diagram illustrating noise occurrence portion in a differential amplification readout configuration.

Meanwhile, the differential amplification readout has a configuration as illustrated in FIG. 4, for example.

That is, in the differential amplification readout configuration, a gain Adif of the voltage amplitude ΔVvsl of the vertical signal line (VSL) 922 is determined according to a parasitic capacitance Cgd with a VSL node that is a part of the parasitic capacitance Cfd of the FD node. Note that Cgd may include not only the parasitic capacitance of the transistor but also a capacitance intentionally added as a wiring capacitance or the like for adjusting the gain Adif.

In such a differential amplification readout configuration, the relationship of the following expression (6) is satisfied in a case where an open loop gain of the differential amplification circuit is Av.

$$\eta vsl = e/\{Cgd + Cfd/Av\} \quad (6)$$

Similarly, the relationship of the following expression (7) is satisfied when total noise in the differential amplification readout configuration is converted into the number of electrons at the FD node.

[Math. 2]

$$Vn\_total\_e = \sqrt{\{(Vn\_adc/\eta vsl)^2 + (Vn\_afe/\eta vsl)^2 + 2 \times (Vn\_pix/\eta fd)^2\}} \quad \text{Expression 7}$$

From the relationship of the expression (7), it is clear that noise can be reduced by increasing ηvsl and Here, when comparing the expression (4) of the source-follower readout configuration in FIG. 1 and the expression (7) of the differential amplification readout configuration in FIG. 4, Vn_adc and Vn_afe can be discussed as follows.

That is, in the expression (4), ηvsl has the relationship of ηvsl=Asf×ηfd according to the expression (2). Moreover, since Asf is 1.0 at the maximum, the relationship of the following expression (8) is established.

$$\eta vsl \leq \eta fd = e/Cfd \quad (8)$$

Meanwhile, in the expression (7), ηvsl has the relationship of ηvsl=e/{Cgd+Cfd/Av} according to the expression (6). Moreover, since Av is generally several tens to hundreds, the influence of Cfd can be suppressed, and the relationship of the following expression (9) is established.

$$\eta vsl \approx e/Cgd \quad (9)$$

As described above, in the source-follower readout configuration, there is no means for increasing ηvsl in the situation where a decrease in Cfd is difficult from the relationship of the expression (8).

In contrast, in the differential amplification readout configuration, Cgd is a part of Cfd and thus has a smaller value than Cfd in the relationship of the expression (9), and is a capacitance parasitic on the amplification transistor 914, as illustrated in FIG. 4. Therefore, even in the case of adopting the structure (FIG. 3) in which the plurality of pixels shares a transistor, capacitance reduction is not hindered.

That is, the differential amplification readout configuration can have a larger value of ηvsl than the source-follower readout configuration, which is advantageous in terms of noise. Meanwhile, the conventional differential amplification readout configuration has two problems.

First, an initial FD potential, which is a reference potential, needs to be set to a voltage at which charges from the photoelectric conversion unit 911 such as a photodiode (PD) can be transferred, and a voltage at which am amplitude dynamic can be secured needs to be set in order to read sufficient signal charges.

In the circuit configuration illustrated in FIG. 4, a higher initial FD potential is more advantageous for transferring charges and can transfer larger signal charges. On the other hand, a lower initial FD potential can have larger output voltage amplitude. Note that, in a case where the photodiode (PD) as the photoelectric conversion units 911 has an opposite polarity, it is advantageous to set opposite potentials.

Therefore, it is important to set the initial FD potential at which charges from the photoelectric conversion unit 911 can be transferred, and the amplitude of the pixel output voltage can be made large.

However, in the differential amplification circuit, since an amplification gain is high, a variation in an input signal is amplified due to variations in element characteristics, power supply, temperature, and the like. As a result, a large variation in an output signal becomes a problem. In particular, when a large input signal is input at the time of reset, an output level of the reset goes out of a readable voltage range and becomes unstable.

Here, Patent Document 1 described above discloses suppressing variations in element characteristics, power supply, temperature, and the like by feeding back an output level to an input at the time of reset and determining an initial FD potential, for each pixel. A potential level of the floating diffusion region (FD) at the time of reset is determined according to a proportion of on-resistors of a current transistor, a readout transistor, and a load MOS transistor. Then, when sizes and drive currents of these transistors are determined, the potential level is almost uniquely determined.

In particular, the readout transistor is a transistor arranged in the pixel that configures the pixel array unit, and it is difficult to freely adjust the size thereof and it is generally difficult to control the initial FD potential setting for achieving both the charge transfer from the photodiode and the amplitude of the output voltage of the pixel.

Figure 5:
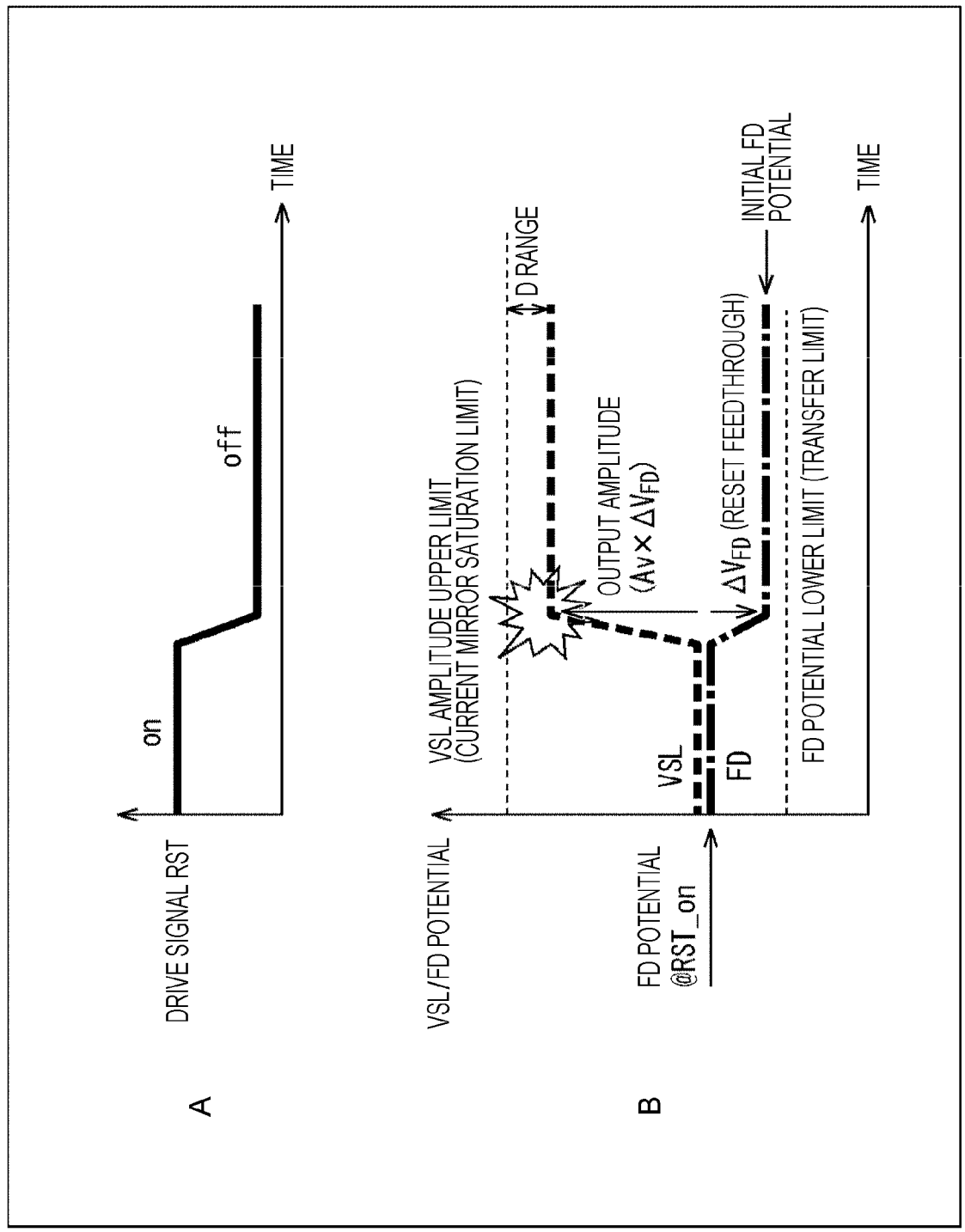
FIG. 5 is a diagram illustrating a problem of reset feed-through and a differential operating point.

Meanwhile, as illustrated in FIG. 5A, in the differential amplification readout, when a reset operation is completed and a reset transistor 913 is turned off according to a drive signal RST, the FD potential and the VSL potential have the relationship as illustrated in FIG. 5B.

That is, when the reset transistor 913 is turned off, the floating diffusion region (FD) 921 is electrically cut off from external wiring and becomes a floating state (floating state). The FD potential of the floating diffusion region (FD) 921 is pushed down to a low level side mainly by capacitive coupling with a gate electrode of the reset transistor 913. A variation amount ΔV of the FD potential when the reset transistor 913 is switched between the on state and the off state is called a reset feedthrough FD.

Then, in the case of the differential amplification readout, when the reset feedthrough amounts on the readout side and the reference side are significantly different, the difference is amplified to a gain multiple and output to the vertical signal line (VSL) 922.

Therefore, the output level goes out of the readable voltage range and the initial signal level becomes unstable.

As described above, in the differential amplification readout configuration, not only out of readable range of the reset level due to reset feedthrough needs to be suppressed but also an optimum initial FD potential needs to be determined while realizing high conversion efficiency (amplification factor). This is the first problem.

Secondly, in the differential amplification readout configuration, the final sum of noise becomes large by the amount of noise generated by the amplification transistor in the pixel because of addition of a transistor on the reference side of the differential pair.

Here, focusing on the noise Vn_pix, ηfd becomes e/Cfd both in the expression (4) in the source-follower readout configuration in FIG. 1 and the expression (7) in the differential amplification readout configuration in FIG. 4, and thus there is no difference in ηfd.

However, in the differential amplification readout configuration in FIG. 4, the noise generated by the reference-side amplification transistor is also superimposed. Therefore, the noise is doubled accordingly. As described above, the differential amplification readout configuration is disadvantageous in terms of noise because the Vn_pix component is doubled as the total noise, as compared with the source-follower readout configuration. This is the second problem.

The technology according to the present disclosure (the present technology) proposes means for solving such a first problem and a second problem.

That is, for the first problem, in the differential amplification readout configuration, a configuration in which a reset voltage of a reference pixel is externally applied, and a reset voltage of a readout pixel is negatively fed back from a vertical signal line is adopted, thereby not only suppressing out of readable range of a reset level due to reset feedthrough but also controlling an FD potential of a readout pixel at the time of reset to a desired value while realizing high conversion efficiency (amplification factor).

Furthermore, for the second problem, in the differential amplification readout configuration, nodes on source sides, drain sides, or both of the source sides and the drain sides of amplification transistors of reference pixels are connected (connected by wire) among columns of a pixel array unit, thereby suppressing an increase in noise while realizing high conversion efficiency (amplification factor).

Hereinafter, specific content of the present technology will be described with reference to the first embodiment and the second embodiment. That is, the first embodiment will be described as a first means for solving the first problem, and the second embodiment will be described as a second means for solving the second problem.

Note that the first means for solving the first problem and the second means for solving the second problem may solve the problems by the respective means alone, or one of the means may be combined with the other means.

That is, by combining the first means with the second means, not only the first problem but also the second problem can be solved, and as a result, both effects can be obtained. Similarly, by combining the second means with the first means, the first problem can also be solved, and as a result, both effects can be obtained.

2. Configuration of Solid-State Imaging Device (Configuration Example of Solid-State Imaging Device)
FIG. 6 is a diagram illustrating a configuration example of an embodiment of a solid-state imaging device to which the present technology is applied.

Figure 6:
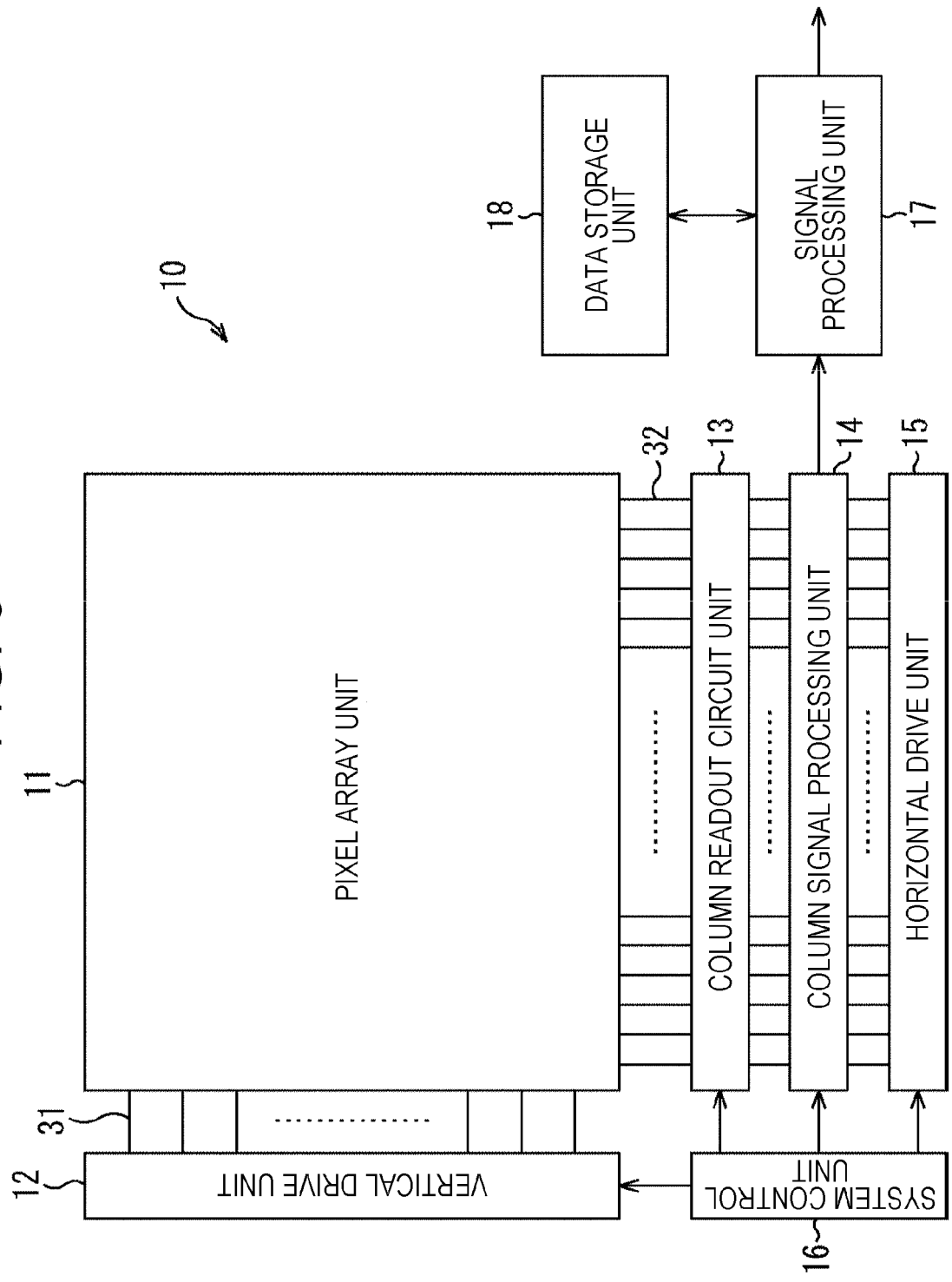
FIG. 6 is a diagram illustrating a configuration example of an embodiment of a solid-state imaging device to which the present technology is applied.

A CMOS image sensor 10 in FIG. 6 is an example of a solid-state imaging device using a complementary metal oxide semiconductor (CMOS). The CMOS image sensor 10 takes in incident light (image light) from an object via an optical lens system (not illustrated), converts an amount of the incident light imaged on an imaging surface into an electrical signal on a pixel basis, and outputs the electrical signal as a pixel signal.

In FIG. 6, the CMOS image sensor 10 includes a pixel array unit 11, a vertical drive unit 12, a column readout circuit unit 13, a column signal processing unit 14, a horizontal drive unit 15, a system control unit 16, a signal processing unit 17, and a data storage unit 18.

The pixel array unit 11, the vertical drive unit 12, the column readout circuit unit 13, the column signal processing unit 14, the horizontal drive unit 15, the system control unit 16, the signal processing unit 17, and the data storage unit 18 are formed on the same semiconductor substrate (chip) or on a plurality of electrically connected stacked semiconductor substrates (chips).

In the pixel array unit 11, unit pixels (pixels) each including a photoelectric conversion unit (for example, a photodiode) are two-dimensionally arranged in a matrix manner, the photoelectric conversion unit being capable of photoelectrically converting and accumulating a charge amount according to the incident light amount, and outputting the charge amount as a signal.

Note that the pixel array unit 11 may include, in addition to effective pixels (effective pixels), a region where dummy pixels and light-shielding pixels are two dimensionally arranged in a matrix manner, the dummy pixel having a structure not including a photodiode for performing photoelectric conversion, and the light-shielding pixel being equivalent to an effective pixel except for shielding a light-receiving surface from light incidence from an outside.

Furthermore, in the following description, a photocharge of a charge amount according to the incident light amount may be simply described as "charge", and the unit pixel may be simply described as "pixel".

Furthermore, in the pixel array unit 11, a pixel drive line 31 is formed for each row in a right-left direction in FIG. 6 (a pixel array direction of a pixel row) and vertical pixel wiring 32 is formed for each column in an up-down direction in FIG. 6 (a pixel array direction of a pixel column) with respect to the pixel array in the matrix manner. One end of the pixel drive line 31 is connected to an output end corresponding to each row of the vertical drive unit 12.

The column readout circuit unit 13 includes at least a circuit that supplies a constant current to selected row pixels in the pixel array unit 11 for each column, a current mirror circuit configuring a high gain amplifier, and a readout mode changeover switch. The column readout circuit unit 13 configures an amplifier together with a transistor in a selected pixel in the pixel array unit 11, and converts a photocharge signal into a voltage signal and outputs the voltage signal to the vertical pixel wiring 32.

The vertical drive unit 12 is a pixel drive unit configured by a shift register, an address decoder, and the like, and drives all of pixels of the pixel array unit 11 at the same time or drives the pixels of the pixel array unit 11 on a row basis, or the like. Although a specific configuration of the vertical drive unit 12 is not illustrated, the vertical drive unit 12 has a configuration including a readout scanning system, a sweep-out scanning system or batch sweeping, and batch transfer.

The readout scanning system sequentially selects and scans the pixels of the pixel array unit 11 on a row basis in order to read signals from the pixels. In a case of row drive (rolling shutter operation), for sweep-out, the sweep-out scanning is performed prior to the readout scanning by the readout scanning system by a shutter speed time.

Furthermore, in a case of global exposure (global shutter operation), batch sweeping is performed prior to batch transfer by the shutter speed time. By this sweep-out, unnecessary charges are swept (reset) from photoelectric conversion elements of the pixels on the readout row. Then, by sweeping out (resetting) the unnecessary charges, a so-called electronic shutter operation is performed.

Here, the electronic shutter operation refers to an operation of discarding unnecessary photocharges previously accumulated in the photoelectric conversion element and starting new exposure (starting accumulation of photocharges). The signal read by the readout operation by the readout scanning system corresponds to the light amount incident on or after the immediately preceding readout operation or the electronic shutter operation.

In the case of row drive, a period from readout timing by the immediately preceding readout operation or from sweep-out timing by the electronic shutter operation to readout timing by the current readout operation is an accumulation time (exposure time) of photocharges in a pixel. In the case of global exposure, a time from the batch sweeping to the batch transfer is an accumulation time (exposure time).

The pixel signal output from each pixel in a pixel row selectively scanned by the vertical drive unit 12 is supplied to the column signal processing unit 14 through each of the vertical pixel wiring 32. For each pixel column of the pixel array unit 11, the column signal processing unit 14 performs predetermined signal processing for the pixel signal output from each pixel in the selected row through the vertical pixel wiring 32, and temporarily stores the pixel signal after the signal processing.

Specifically, the column signal processing unit 14 performs at least noise removal processing, for example, correlated double sampling (CDS) processing, as the signal processing. For example, the CDS processing by the column signal processing unit 14 removes reset noise and pixel-specific fixed pattern noise such as threshold variation of the amplification transistor. Note that the column signal processing unit 14 can have, for example, an analog-digital (AD) conversion function, and output a signal level as a digital signal, in addition to the noise removal processing.

The horizontal drive unit 15 is configured by a shift register, an address decoder, and the like, and sequentially selects a unit circuit corresponding to the pixel column of the column signal processing unit 14. By the selective scanning by the horizontal drive unit 15, the pixel signals processed in the column signal processing unit 14 are sequentially output to the signal processing unit 17.

The system control unit 16 is configured by a timing generator that generates various timing signals, and the like, and drives and controls the vertical drive unit 12, the column signal processing unit 14, the horizontal drive unit 15, and the like, on the basis of various timing signals generated by the timing generator.

The CMOS image sensor 10 further includes the signal processing unit 17 and the data storage unit 18. The signal processing unit 17 has at least an addition processing function and performs various types of signal processing such as addition processing for the pixel signal output from the column signal processing unit 14.

The data storage unit 18 temporarily stores data necessary for the signal processing in the signal processing unit 17.

The processing by the signal processing unit 17 and the data storage unit 18 may be performed by an external signal processing unit provided on a separate substrate from the CMOS image sensor 10 or may be performed, for example, by a digital signal processor (DSP) or by software, or the signal processing unit 17 and the data storage unit 18 may be mounted on the same substrate as the CMOS image sensor 10.

(Configuration Example of Pixel)

Next, a circuit configuration example of one of pixels 100 two-dimensionally arranged in a matrix manner in the pixel array unit 11 in FIG. 6 will be described with reference to FIG. 7.

Figure 7:
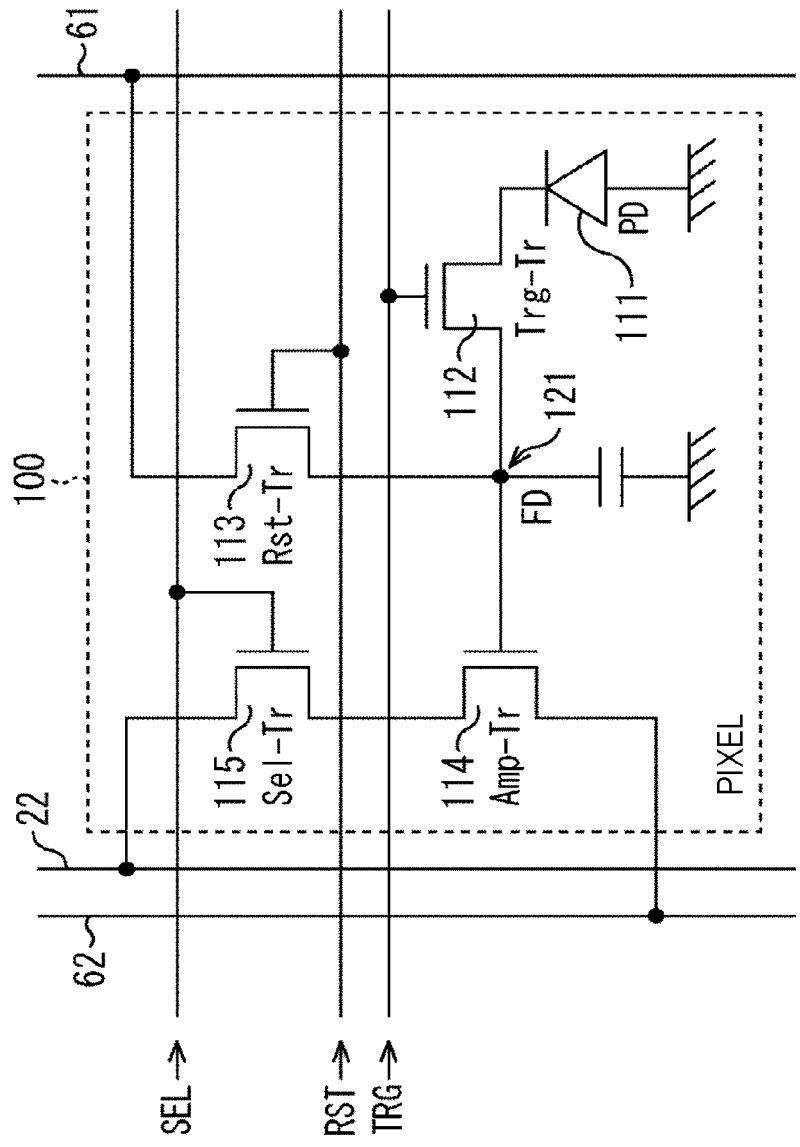
FIG. 7 is a circuit diagram illustrating a configuration example of a pixel.

In FIG. 7, the pixel 100 includes a photoelectric conversion unit 111, a transfer transistor 112, a reset transistor 113, an amplification transistor 114, and a selection transistor 115. Furthermore, in the pixel 100, a floating diffusion region (FD) 121 is formed.

Furthermore, in the pixel 100, a SEL drive line, an RST drive line, and a TRG drive line, which are the pixel drive lines 31 having one ends connected to the vertical drive unit 12, and a vertical signal line 22, a vertical reset input line 61, and a vertical current supply line 62, which are the vertical pixel wiring 32 having one ends connected to the column readout circuit unit 13, are connected.

An anode of the photodiode serving as the photoelectric conversion unit 111 is grounded, and a cathode of the photodiode is connected to a source of the transfer transistor 112. A drain of the transfer transistor 112 is connected to a source of the reset transistor 113 and a gate of the amplification transistor 114, and a connection point configures the floating diffusion region (FD) 121.

Furthermore, a drain of the reset transistor 113 is connected to the vertical reset input line 61, and a source of the amplification transistor 114 is connected to the vertical current supply line 62. A drain of the amplification transistor 114 is connected to a source of the selection transistor 115, and a drain of the selection transistor 115 is connected to the vertical signal line (VSL) 22.

A gate of the transfer transistor 112, a gate of the reset transistor 113, and a gate of the selection transistor 15 are connected to the vertical drive unit 12 (FIG. 6) via the pixel drive lines 31 (TRG drive line, RST drive line, and SEL drive line), respectively, and pulses as drive signals are respectively supplied thereto.

Next, a basic function of the pixel 100 illustrated in FIG. 7 will be described.

The reset transistor 113 turns on and off discharge of charges accumulated in the floating diffusion region (FD) 121 according to the drive signal RST supplied from the vertical drive unit 12 (FIG. 6).

For example, when the high (H)-level drive signal RST is supplied to the reset transistor 113, the floating diffusion region (FD) 121 is clamped to the voltage applied through the vertical reset input line 61, and the reset transistor 113 discharges (resets) the charges accumulated in the floating diffusion region (FD) 121. Furthermore, when the low (L)-level drive signal RST is supplied to the reset transistor 113, the floating diffusion region (FD) 121 is electrically disconnected from the vertical reset input line 61 and enters a floating state.

Meanwhile, the photoelectric conversion unit 111 photoelectrically converts incident light to generate a charge according to the amount of light, and accumulates the charge. The transfer transistor 112 turns on and off transfer of charges from the photoelectric conversion unit 111 to the floating diffusion region (FD) 121 according to a drive signal TRG supplied from the vertical drive unit 12 (FIG. 6).

For example, the transfer transistor 112 transfers the charges accumulated in the photoelectric conversion unit 111 to the floating diffusion region (FD) 121 when the H-level drive signal TRG is supplied, and stops the transfer of the charges when the L-level drive signal TRG is supplied. Note that the photoelectrically converted charges are accumulated in the photoelectric conversion unit 111 while the transfer transistor 112 stops the transfer of the charges to the floating diffusion region (FD) 121.

The floating diffusion region (FD) 121 has a function to accumulate the charges transferred from the photoelectric conversion unit 111 via the transfer transistor 112, and the potential of the floating diffusion region (FD) 121 is modulated according to the accumulated charge amount in the floating state where the reset transistor 113 is off.

The amplification transistor 114 functions as an amplifier having the potential variation of the floating diffusion region (FD) 121 connected to the gate as an input signal, and outputs an output voltage signal to the vertical signal line 22 via the selection transistor 115.

The selection transistor 115 turns on and off the output of the voltage signal from the amplification transistor 114 to the vertical signal line 22 according to a drive signal SEL supplied from the vertical drive unit 12 (FIG. 6).

For example, the selection transistor 115 outputs the voltage signal to the vertical signal line 22 when the H-level drive signal SEL is supplied, and stops the output of the voltage signal when the L-level drive signal SEL is supplied. Thereby, only the output of the selected pixel 100 can be taken out in the vertical signal line 22 to which a plurality of the pixels 100 is connected.

As described above, the pixel 100 is driven according to the drive signals (TRG, RST, and SEL) supplied from the vertical drive unit 12 (FIG. 6).

3. First Embodiment

Next, a configuration of not only suppressing out of a readable range of a reset level due to reset feedthrough but also controlling an FD potential of a readout pixel at the time of reset to a desired value while realizing high conversion efficiency (amplification factor) by the differential amplification readout will be described with reference to FIGS. 8 to 24 as a first embodiment.
(Configuration Example of Differential Pixel Readout Circuit)

Figure 8:
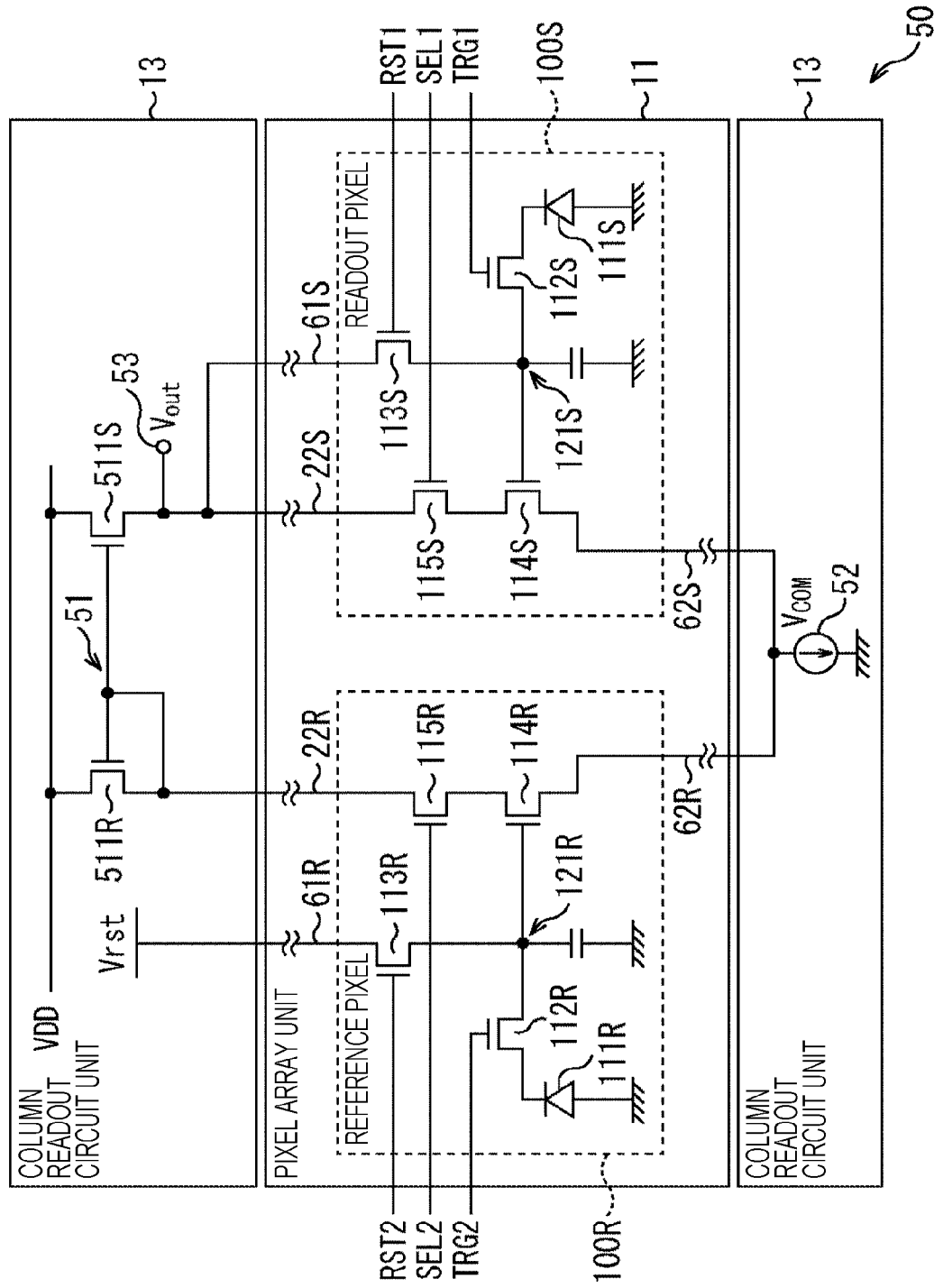
FIG. 8 is a circuit diagram illustrating a configuration example of a differential pixel readout circuit according to the first embodiment.

FIG. 8 is a circuit diagram illustrating a configuration example of a differential pixel readout circuit according to the first embodiment.

In FIG. 8, a differential pixel readout circuit 50 includes a readout pixel 100S for reading a signal charge, a reference pixel 100R for giving a reference voltage without a signal charge, a current mirror circuit 51 including a PMOS transistor, and a load MOS circuit 52 for supplying a constant current to a pixel.

The readout pixel 100S includes four pixel transistors of a transfer transistor 112S, a reset transistor 113S, an amplification transistor 114S, and a selection transistor 115S, for example, in addition to a photoelectric conversion unit 111S such as a photodiode (PD).

An anode electrode as one end of the photodiode as the photoelectric conversion unit 111S is grounded, and a cathode electrode as the other end of the photodiode is connected to a source of the transfer transistor 112S. A drain of the transfer transistor 112S is connected to a source of the reset transistor 113S and a gate of the amplification transistor 114S, and a connection point configures the floating diffusion region (FD) 121S.

A drain of the reset transistor 113S is connected to a readout-side vertical reset input line 61S. A source of the amplification transistor 114S is connected to a readout-side vertical current supply line 62S. A drain of the amplification transistor 114S is connected to a source of the selection transistor 115S, and a drain of the selection transistor 115S is connected to a readout-side vertical signal line 22S.

A gate of the transfer transistor 112S, a gate of the reset transistor 113S, and a gate of the selection transistor 115S are connected to the vertical drive unit 12 (FIG. 6) via the pixel drive lines 31 (FIG. 6), and pulses as drive signals (TRG1, RST1, and SEL1) are respectively supplied thereto.

Here, the readout-side vertical signal line 22S is connected to the readout-side vertical reset input line 61S, a drain of a readout-side PMOS transistor 511S of the current mirror circuit 51, and an output terminal 53 of the differential pixel readout circuit 50.

Furthermore, the readout-side vertical reset input line 61S is connected to the readout-side vertical signal line 22S, and is connected to a floating diffusion region 121S of the selected readout pixel 100S, that is, to an input terminal of the amplification transistor 114S. An output signal of the differential pixel readout circuit 50 is negatively fed back when the reset transistor 113S is on.

The reference pixel 100R includes four pixel transistors of a transfer transistor 112R, a reset transistor 113R, an amplification transistor 114R, and a selection transistor 115R, for example, in addition to a photoelectric conversion unit 111R such as a photodiode (PD).

An anode electrode as one end of the photodiode as the photoelectric conversion unit 111R is grounded, and a cathode electrode as the other end of the photodiode is connected to a source of the transfer transistor 112R. A drain of the transfer transistor 112R is connected to a source of the reset transistor 113R and a gate of the amplification transistor 114R, and a connection point configures a floating diffusion region (FD) 121R.

A drain of the reset transistor 113R is connected to a reference-side vertical reset input line 61R. A source of the amplification transistor 114R is connected to a reference-side vertical current supply line 62R. A drain of the amplification transistor 114R is connected to a source of the selection transistor 115R, and a drain of the selection transistor 115R is connected to a reference-side vertical signal line 22R.

A gate of the transfer transistor 112R, a gate of the reset transistor 113R, and a gate of the selection transistor 115R are connected to the vertical drive unit 12 (FIG. 6) via the pixel drive lines 31 (FIG. 6), and pulses as drive signals (TRG2, RST2, and SEL2) are respectively supplied thereto.

Here, the reference-side vertical signal line 22R is connected to a drain and a gate of a reference-side PMOS transistor 511R of the current mirror circuit 51 and a gate of the readout-side PMOS transistor 511S.

Furthermore, the reference-side vertical reset input line 61R is connected to a power supply Vrst. At the time of reset, an arbitrary input voltage signal is applied to the floating diffusion region 121R of the reference pixel 100R selected through the reference-side vertical reset input line 61R, that is, to an input terminal of the amplification transistor 114R.

The readout-side vertical current supply line 62S and the reference-side vertical current supply line 62R are connected to each other at a connection point (Vcom) and are then connected to the load MOS circuit 52 as a constant current source.

In the differential pixel readout circuit 50 having the above configuration, the amplification transistor 114S of the readout pixel 100S and the amplification transistor 114R of the reference pixel 100R configure a differential amplifier (differential amplification circuit), whereby the voltage signal according to the signal charges detected in the photoelectric conversion unit 111S of the readout pixel 100S is output via the output terminal 53.

(Example of Driving Differential Pixels)

Next, an example of driving pixels configuring the differential pixel readout circuit 50 illustrated in FIG. 8 will be described with reference to the timing chart in FIG. 9.

Figure 9:
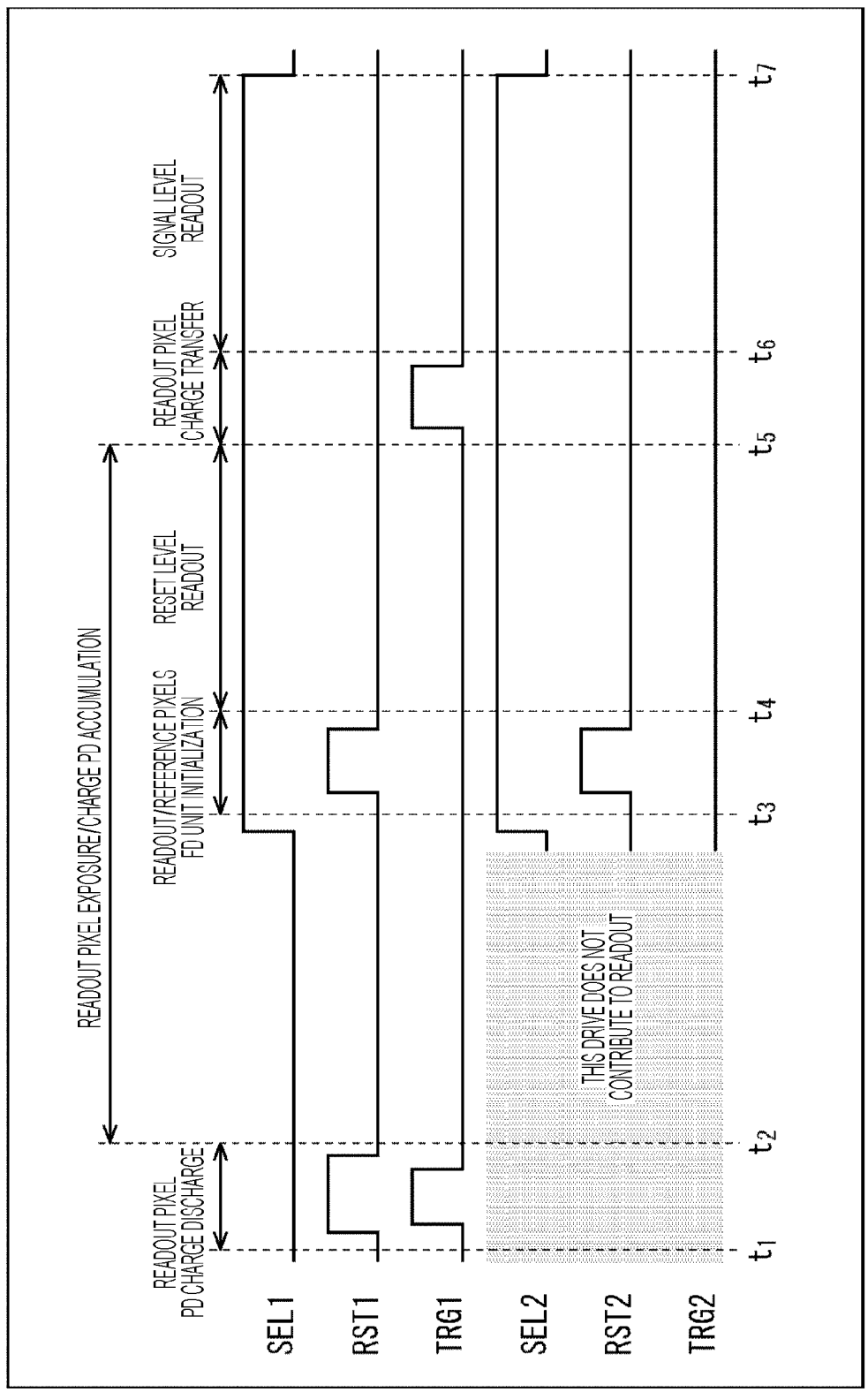
FIG. 9 is a timing chart illustrating an example of driving pixels configuring the differential pixel readout circuit.

Note that the upper part in FIG. 9 illustrates a timing chart of the drive signals SEL1, RST1, and TRG1 respectively applied to the gates of the selection transistor 115S, the reset transistor 113S, and the transfer transistor 112S in the readout pixel 100S.

Furthermore, the lower part in FIG. 9 illustrates a timing chart of the drive signals TRG2, RST2, and SEL2 respectively applied to the gates of the selection transistor 115R, the reset transistor 113R, and the transfer transistor 112R in the reference pixel 100R. Note that the direction of time goes from the left side to the right side in FIG. 9.

First, in the period from time t1 to time t2, when H-level pulses are applied as the drive signal RST1 and the drive signal TRG1, the charges accumulated in the photoelectric conversion unit 111S and the floating diffusion region 121S of the readout pixel 100S are discharged by the reset transistor 113S.

Thereby, the charges accumulated in the photoelectric conversion unit 111S so far are swept out, and in the period from time t to time t25, charges newly obtained from light of an object are accumulated in the photoelectric conversion unit 111S.

Next, in the period from time t3 to time t7, when the drive signals SEL1 and SEL2 are switched from the L level to the H level in the selected readout pixel 100S and reference pixel 100R, the load MOS circuit 52 supplies a current from the sources to the drains of the amplification transistor 114S and the amplification transistor 114R.

Thereby, the differential amplification circuit having the FD potential of the floating diffusion region 121S of the selected readout pixel 100S as an input voltage signal operates, and an amplified voltage signal is output to the readout-side vertical signal line 22S. This state continues until the drive signals SEL1 and SEL2 are switched from the H level to the L level at time t7.

Note that, in the period from time t1 to time t3, the drive signals SEL2, RST2, and TRG2 of the reference pixel 100R do not contribute to signal readout of the readout pixel 100S.

Moreover, in the period from time t3 to time t4, when H-level pulses are applied as the drive signal RST1 and the drive signal RST2, the charges accumulated in the floating diffusion region 121S and the floating diffusion region 121R are discharged and the signal levels are initialized (reset) in the readout pixel 100S and the reference pixel 100R.

At this time, the output terminal 53 of the differential pixel readout circuit 50 is electrically connected to the floating diffusion region 121S of the readout pixel 100S, which is one of inputs of the differential pixel readout circuit 50, through the readout-side vertical reset input line 61S and the reset transistor 113S.

As a result, in the differential pixel readout circuit 50, the output terminal 53 is negatively fed back to the one input-side floating diffusion region 121S and enters a virtual ground state. Therefore, the other input-side floating diffusion region 121R fixed to the power supply Vrst by external application, and the floating diffusion region 121S and the output terminal 53 have the same potential.

Next, in the period from time t4 to time t5, when L-level pulses are applied as the drive signal RST1 and the drive signal RST2, the floating diffusion region 121S is electrically disconnected from the readout-side vertical reset input line 61S, and the floating diffusion region 121R is electrically disconnected from the reference-side vertical reset input line 61R, and the floating diffusion regions enter the floating state, in the readout pixel 100S and the reference pixel 100R.

At this time, since the floating diffusion region 121S of the readout pixel 100S and the floating diffusion region 121R of the reference pixel 100R have almost an equivalent structure, the potential variation (reset feedthrough) at the time of reset off is almost the same, and the FD potential of the floating diffusion region 121S and the FD potential of the floating diffusion region 121R perform almost the same movement.

Therefore, the output from the output terminal 53 of the differential pixel readout circuit 50 hardly changes from the voltage Vrst at the time of reset on, and this state becomes a reset state (initial state) in the differential amplification readout, and an output level in the reset state becomes a reset level (initial level). This reset state continues until the signal charge is transferred at time t5, and the voltage as the reset level is read.

Next, in the period from time t5 to time t6, when the drive signal TRG1 of the readout pixel 100S is applied in a pulse manner, the charge accumulated in the photoelectric conversion unit 111S of the readout pixel 100S is transferred to the floating diffusion region 121S by the transfer transistor 112S.

Then, in the readout pixel 100S, the floating diffusion region 121S is modulated by the transferred charge, and when the charge is input to the gate of the amplification transistor 114S as the voltage signal, the voltage signal according to the accumulated charge amount is output to the readout-side vertical signal line 22S. This signal readout state continues until the drive signals SEL1 and SEL2 become the L level at time t7, and during the state, the voltage as the signal level is read.

Note that the column signal processing unit 14 (FIG. 6) performs correlated double sampling processing of removing noise by taking a difference between the reset level and the signal level read as described above, and reads the pixel signal from which noise has been removed.

(Another Circuit Configuration Example of Differential Pixel Readout Circuit)

(A) Arranging a Readout Pixel and a Reference Pixel in the Same Row

Figure 10:
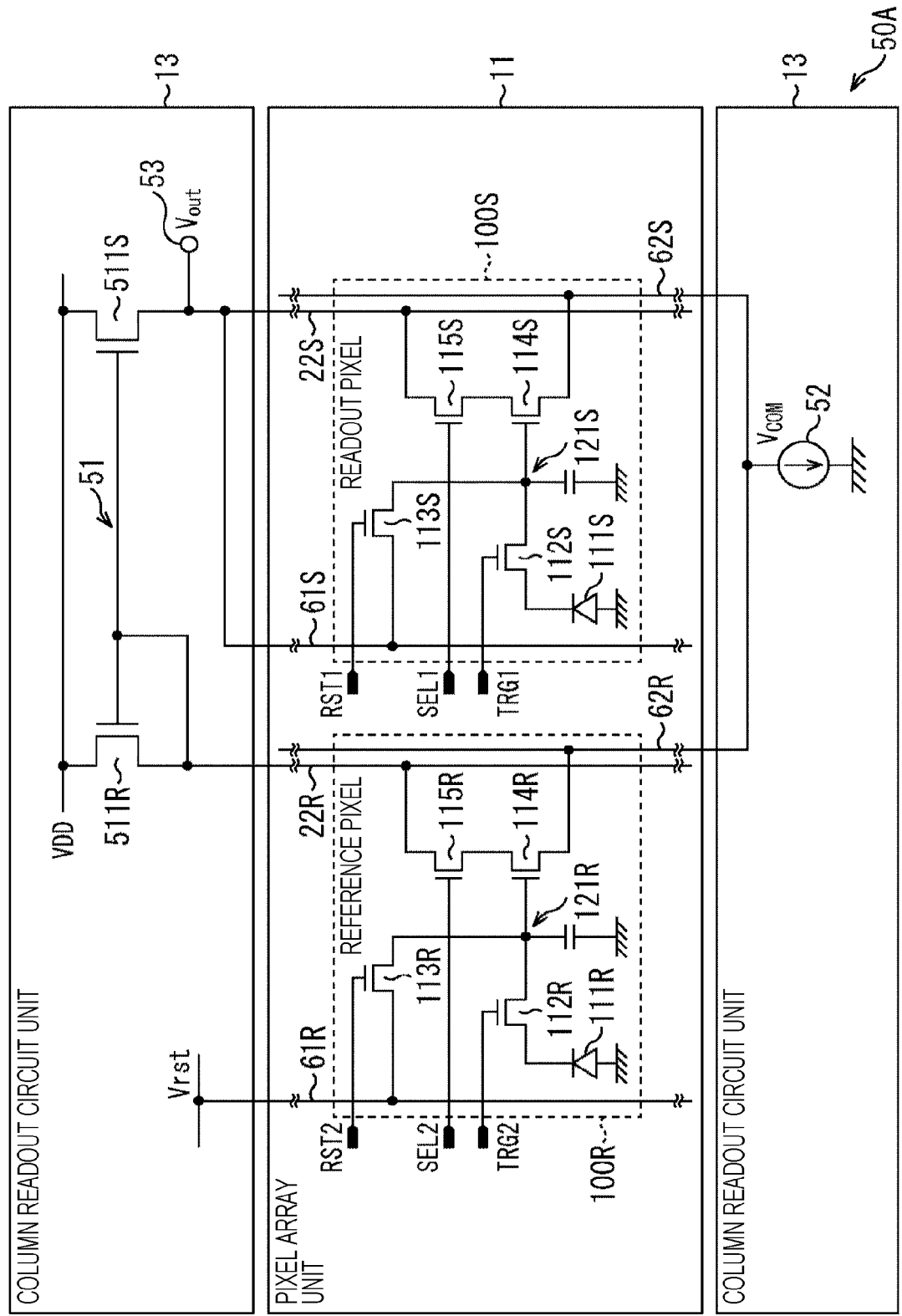
FIG. 10 is a circuit diagram illustrating a configuration in a case of arranging a readout pixel and a reference pixel in the same row.

FIG. 10 is a circuit diagram illustrating a configuration in a case of arranging a readout pixel and a reference pixel in the same row.

FIG. 10 illustrates an example of using an effective pixel that reads and accumulates a signal obtained from an object at the time of imaging, the effective pixel being a pixel in the same row and close to the readout pixel 100S, as the reference pixel 100R arranged in the pixel array unit 11 in a differential pixel readout circuit 50A.

At this time, the effective pixel can be switched to the reference pixel 100R, in addition to the signal accumulation and readout, and for example, an address can be scanned and all the effective pixels two-dimensionally arranged in the pixel array unit 11 can be read while interchanging the pixel pair of the readout pixel 100S and the reference pixel 100R by a changeover switch for the pixel drive line 31 (FIG. 6) and the column readout circuit unit 13 (FIG. 6), for example.

Note that, in the pixel array unit 11 in FIG. 10, the readout pixel 100S and the reference pixel 100R are horizontally arranged adjacent to each other in the same row. However, a pixel irrelevant to differential drive may be inserted between the readout pixel 100S and the reference pixel 100R.

In this case, the number of through vertical wiring (the vertical signal line 22, the vertical reset input line 61, and vertical current supply line 62) per column and the number of AD converters can be reduced. However, it is necessary to increase the number of pixel drive lines 31 crossing the pixel array unit 11 per row from the necessity of independently driving the drive signals (TRG and RST) of two pixels in the same row.

Furthermore, in the pixel array unit 11 in FIG. 10, the readout pixel 100S and the reference pixel 100R horizontally adjacent to each other in the same row may be interchanged.

(B) Arranging a Readout Pixel and a Reference Pixel in the Same Column

Figure 11:
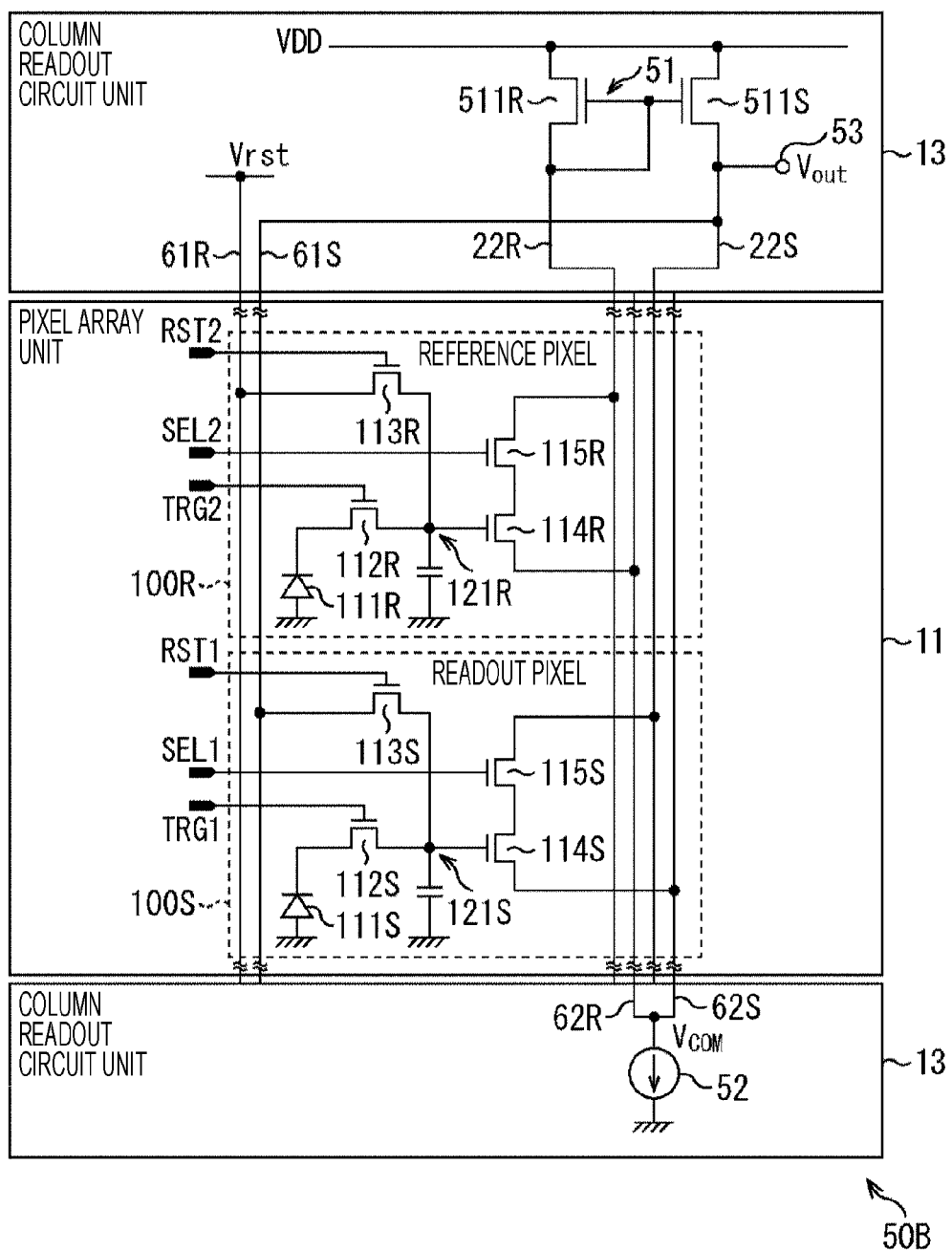
FIG. 11 is a circuit diagram illustrating a configuration in a case of arranging a readout pixel and a reference pixel in the same column.

FIG. 11 is a circuit diagram illustrating a configuration in a case of arranging a readout pixel and a reference pixel in the same column.

FIG. 11 illustrates an example of using an effective pixel that reads and accumulates a signal obtained from an object at the time of imaging, the effective pixel being a pixel in the same column and close to the readout pixel 100S, as the reference pixel 100R arranged in the pixel array unit 11 in a differential pixel readout circuit 50B.

At this time, the effective pixel can be switched to the reference pixel 100R, in addition to the signal accumulation and readout, and for example, an address can be scanned and all the effective pixels two-dimensionally arranged in the pixel array unit 11 can be read while interchanging the pixel pair of the readout pixel 100S and the reference pixel 100R by a changeover switch for the pixel drive line 31 (FIG. 6) and the column readout circuit unit 13 (FIG. 6), for example.

Note that, in the pixel array unit 11 in FIG. 11, the readout pixel 100S and the reference pixel 100R are vertically arranged adjacent to each other in the same column. However, a pixel irrelevant to differential drive may be inserted between the readout pixel 100S and the reference pixel 100R.

In this case, the number of pixel drive lines 31 crossing the pixel array unit 11 per row does not increase but it is necessary to increase the number of through vertical wiring (the vertical signal line 22, the vertical reset input line 61, and the vertical current supply line 62) per column and the number of AD converters.

Furthermore, in the pixel array unit 11 in FIG. 11, the readout pixel 100S and the reference pixel 100R vertically adjacent to each other in the same column may be interchanged.

Figure 12:
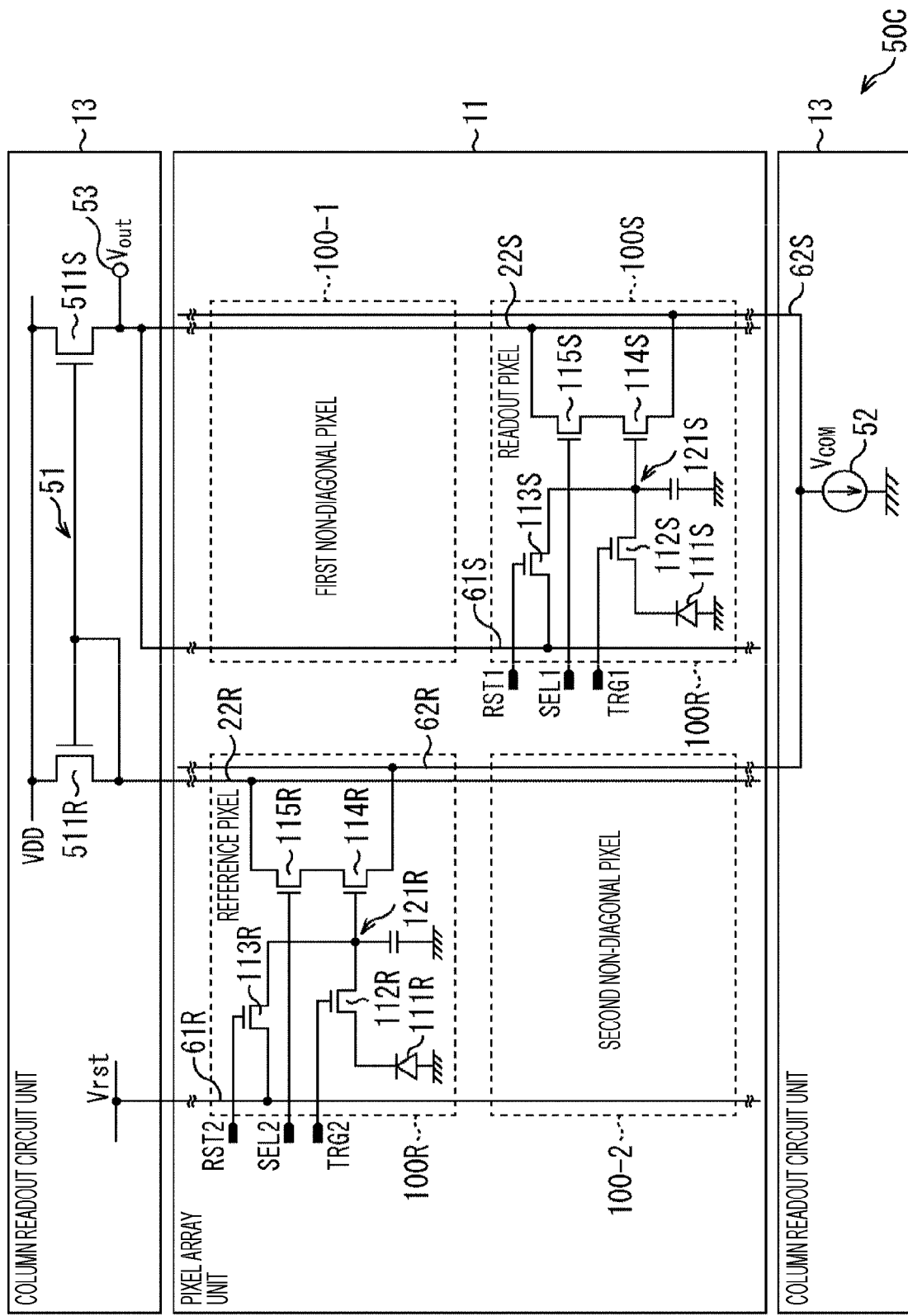
FIG. 12 is a circuit diagram illustrating a configuration in a case where a readout pixel and a reference pixel are close to each other but are arranged in different rows and columns.

(C) Arranging a Readout Pixel and a Reference Pixel in Different Rows and Columns FIG. 12 is a circuit diagram illustrating a configuration in a case where a readout pixel and a reference pixel are close to each other but are arranged in different rows and columns.

FIG. 12 illustrates an example of using an effective pixel that reads and accumulates a signal obtained from an object at the time of imaging, the effective pixel being a pixel in different row and column but close to the readout pixel 100S, as the reference pixel 100R arranged in the pixel array unit 11 in a differential pixel readout circuit 50C.

At this time, the effective pixel can be switched to the reference pixel 100R, in addition to the signal accumulation and readout, and for example, an address can be scanned and all the effective pixels two-dimensionally arranged in the pixel array unit 11 can be read while interchanging the pixel pair of the readout pixel 100S and the reference pixel 100R by a changeover switch for the pixel drive line 31 (FIG. 6) and the column readout circuit unit 13 (FIG. 6), for example.

Note that, in the pixel array unit 11 in FIG. 12, the readout pixel 100S and the reference pixel 100R are diagonally arranged closest to each other. However, a pixel irrelevant to differential drive may be inserted between the readout pixel 100S and the reference pixel 100R.

In this case, the through vertical wiring (the vertical signal line 22, the vertical reset input line 61, and the vertical current supply line 62) per column is similar to the configuration illustrated in FIG. 10. However, it is necessary to increase the number of pixel drive lines 31 crossing the pixel array unit 11 per row from the necessity of independently driving a pixel pair of a first non-diagonal pixel 100-1 and a second non-diagonal pixel 100-2, that is, a pixel pair of inactive non-diagonal pixels, and the drive signals (SEL, TRG, and RST) of the readout pixel 100S and the reference pixel 100R.

Furthermore, in the pixel array unit 11 in FIG. 12, the readout pixel 100S and the reference pixel 100R adjacent while rows and columns are different may be interchanged.

(D) Arranging a Pixel for Reference Only for Each Column

Figure 13:
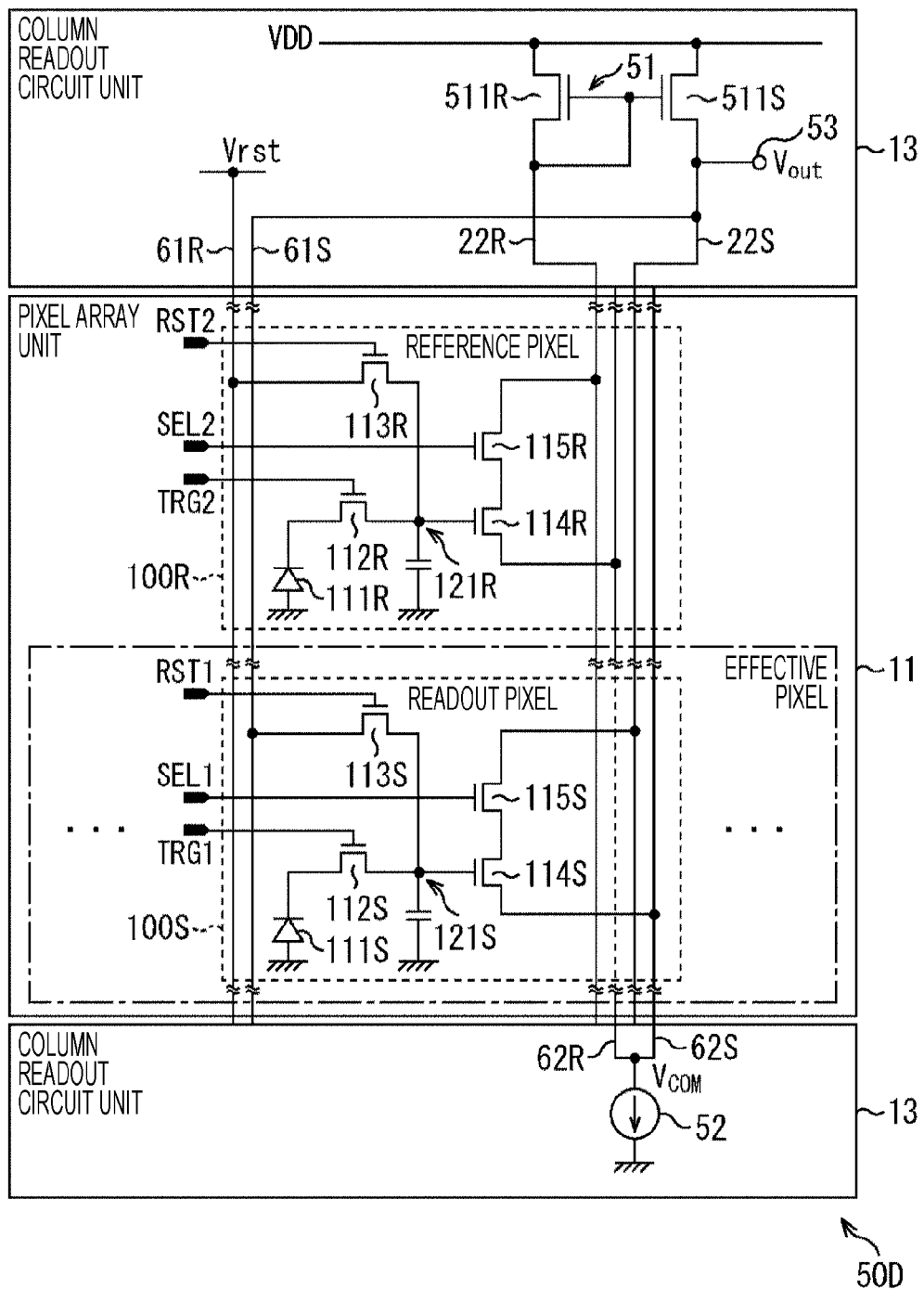
FIG. 13 is a circuit diagram illustrating a configuration in a case of arranging a pixel for reference only for each column.

FIG. 13 is a circuit diagram illustrating a configuration in a case of arranging a pixel for reference only for each column.

FIG. 13 illustrates an example of configuring a pixel pair (differential pair) using a pixel for reference only arranged for each column, as the reference pixel 100R arranged in the pixel array unit 11, and an effective pixel for reading a signal two-dimensionally arranged, in a differential pixel readout circuit 50D.

Here, in the pixel array unit 11, the reference pixel 100R is a pixel for reference only and is a pixel equivalent to an effective pixel arranged for each column. Furthermore, in the pixel array unit 11, all the two-dimensionally arranged effective pixels are scanned only as the readout pixels 100S by the pixel drive line 31 and signals are read.

(E) Arranging a Dummy Pixel for Reference Only for Each Column

Figure 14:
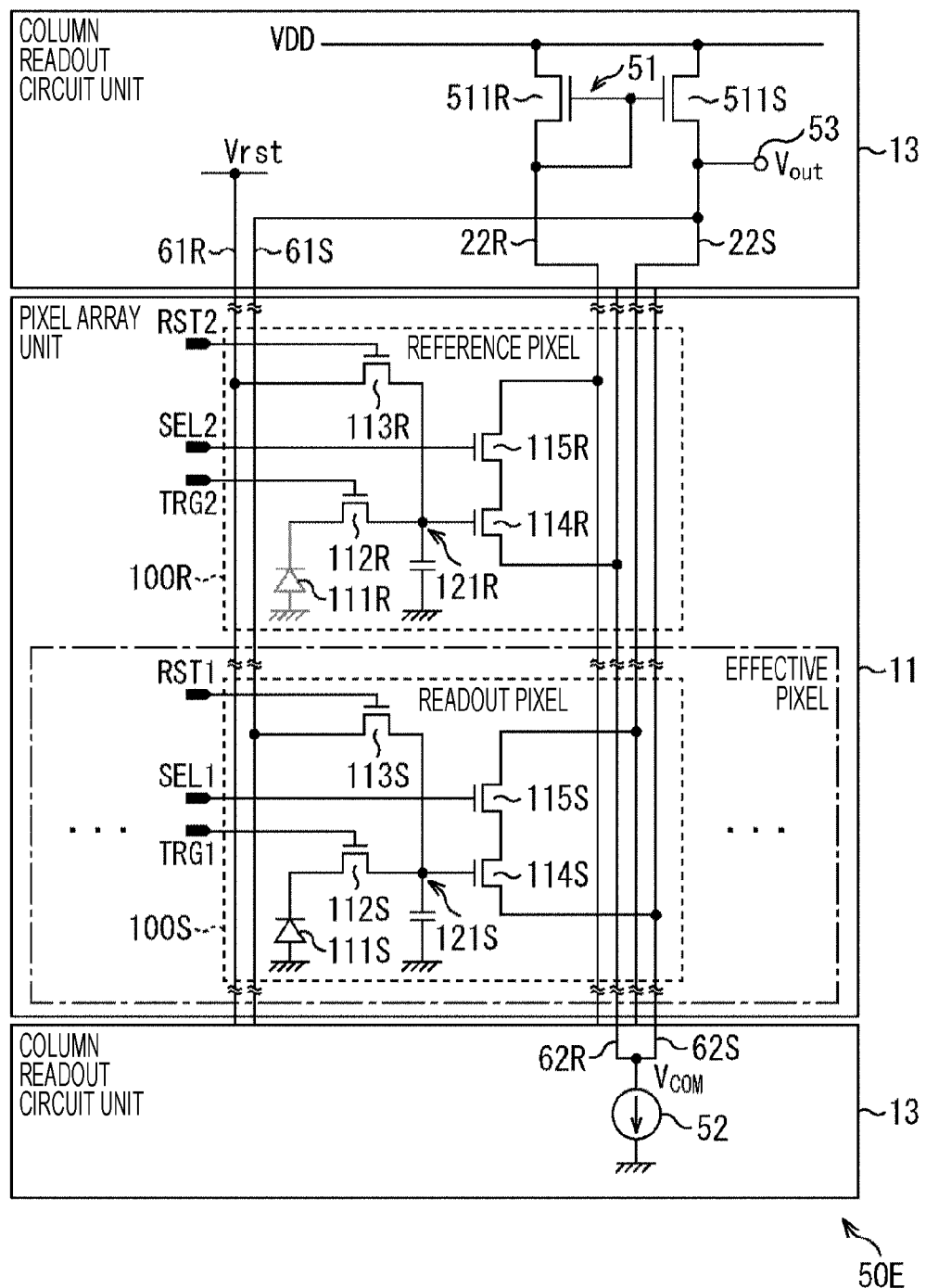
FIG. 14 is a circuit diagram illustrating a configuration in a case of arranging a dummy pixel for reference only for each column.

FIG. 14 is a circuit diagram illustrating a configuration in a case of arranging a dummy pixel for reference only for each column.

FIG. 14 illustrates an example of configuring a pixel pair (differential pair) using a dummy pixel for reference only arranged for each column, as the reference pixel 100R arranged in the pixel array unit 11, and an effective pixel for reading a signal two-dimensionally arranged, in a differential pixel readout circuit 50E.

Here, in the pixel array unit 11, the reference pixel 100R is a dummy pixel for reference only and is a pseudo pixel indicating a reset feedthrough characteristic similar to effective pixels arranged around the dummy pixel and for each column. Furthermore, in the pixel array unit 11, all the two-dimensionally arranged effective pixels are scanned only as the readout pixels 100S by the pixel drive line 31 and signals are read.

Here, in the reference pixel 100R, the dummy pixel for reference only can be, for example, a pixel obtained by applying light-shielding to an effective pixel, or a pixel not having the photoelectric conversion unit 111R such as a photodiode.

Note that, as the reference pixel 100R, the configuration other than applying light-shielding to an effective pixel or not having the photoelectric conversion unit 111R can be the configuration of a pixel having the same layout configuration as the readout pixel 100S as an effective pixel. Furthermore, the reference pixel 100R can be a pseudo pixel adjusted to have the same reset feedthrough characteristic as the readout pixel 100S although the layout configuration is different from that of the readout pixel 100S as an effective pixel.

(F) Configuration Using a Cascode Current Mirror Circuit

Figure 15:
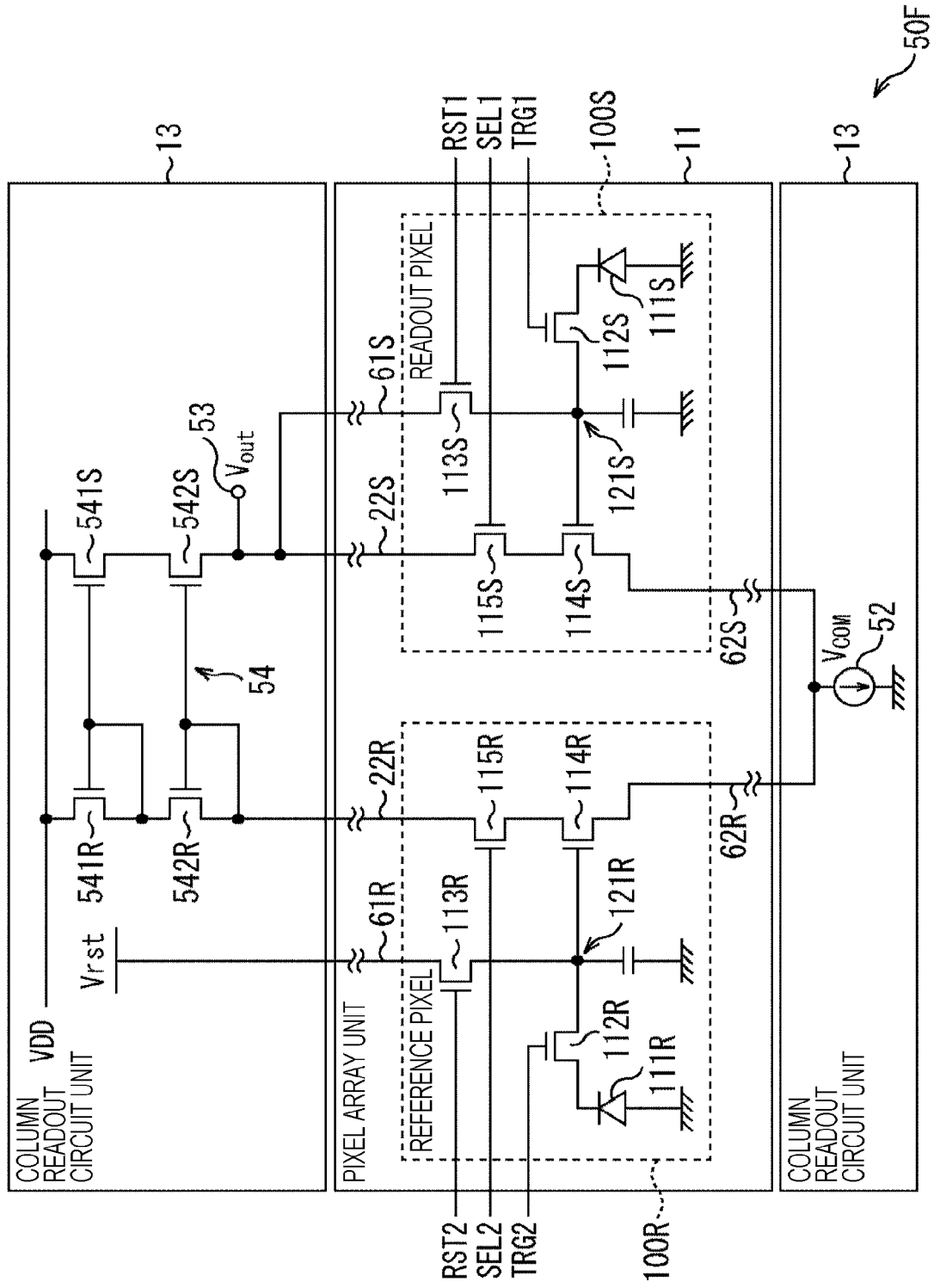
FIG. 15 is a circuit diagram illustrating a configuration using a cascode current mirror circuit.

FIG. 15 is a circuit diagram illustrating a configuration using a cascode current mirror circuit.

FIG. 15 illustrates an example in which a cascode current mirror circuit 54 is configured as a current mirror circuit of the column readout circuit unit 13 in a differential pixel readout circuit 50F.

In the differential pixel readout circuit 50F in FIG. 15, the cascode current mirror circuit 54 is provided instead of the current mirror circuit 51 in the upper column readout circuit unit 13, as compared with the differential pixel readout circuit 50 illustrated in FIG. 8.

In the cascode current mirror circuit 54, a pair of a readout-side PMOS transistor 541S and a reference-side PMOS transistor 541R, and a pair of a readout-side PMOS transistor 542S and a reference-side PMOS transistor 542R are provided and configure a cascode current mirror circuit.

That is, a drain of the readout-side PMOS transistor 541S and a source of the readout-side PMOS transistor 542S are connected, and a drain of the readout-side PMOS transistor 542S is connected to the output terminal 53 and the readout-side vertical signal line 22S.

Meanwhile, a drain of the reference-side PMOS transistor 541R is connected to a gate of the reference-side PMOS transistor 541R, a gate of the readout-side PMOS transistor 541S, and a source of the reference-side PMOS transistor 542R. Furthermore, a drain of the reference-side PMOS transistor 542R is connected to a gate of the reference-side PMOS transistor 542R, a gate of the readout-side PMOS transistor 542S, and the reference-side vertical signal line 22R.

(G) Configuration Capable of Switching a Readout Pixel and a Reference Pixel

Figure 16:
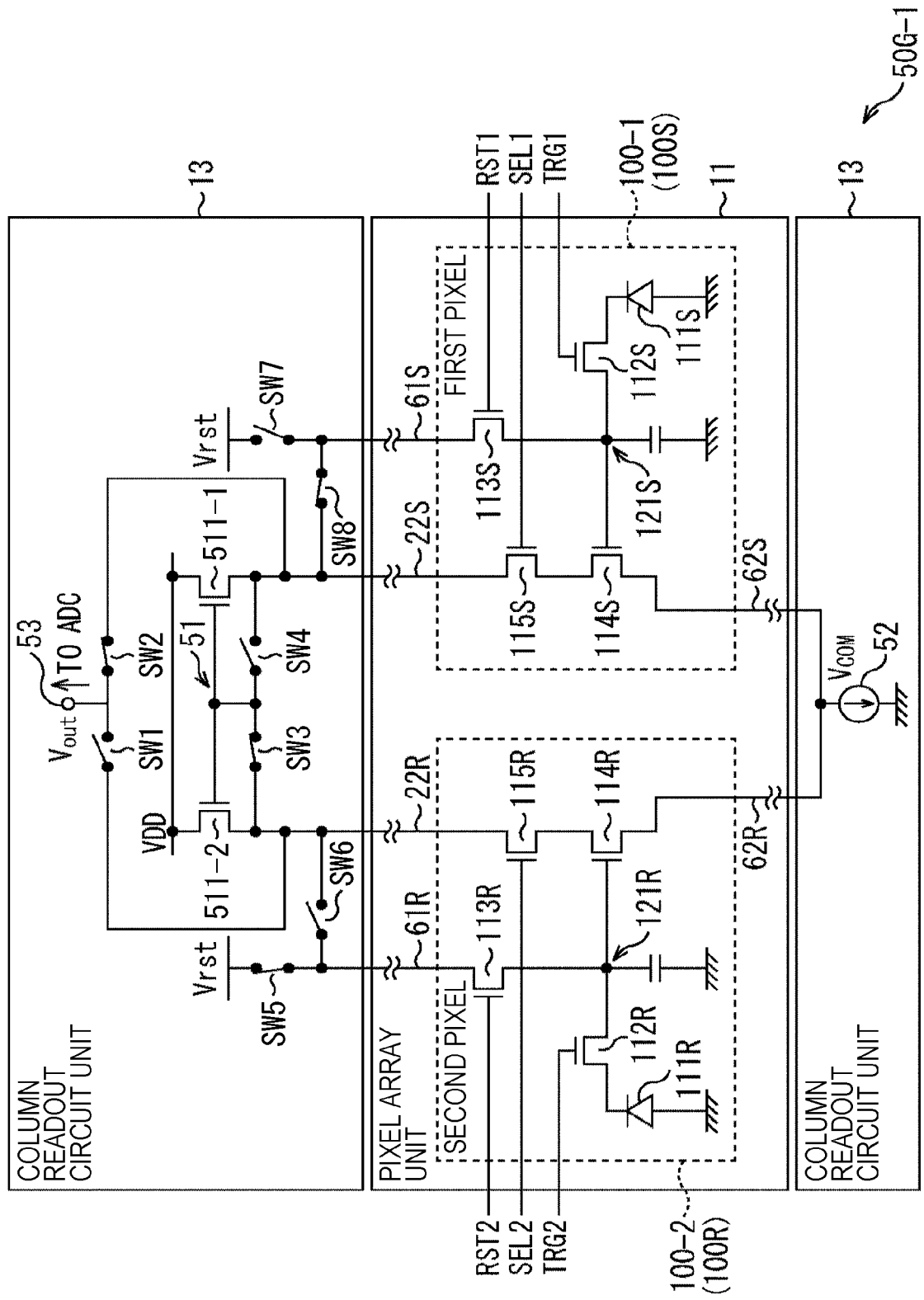
FIG. 16 is a circuit diagram illustrating a configuration in which a readout pixel and a reference pixel are switchable.
Figure 17:
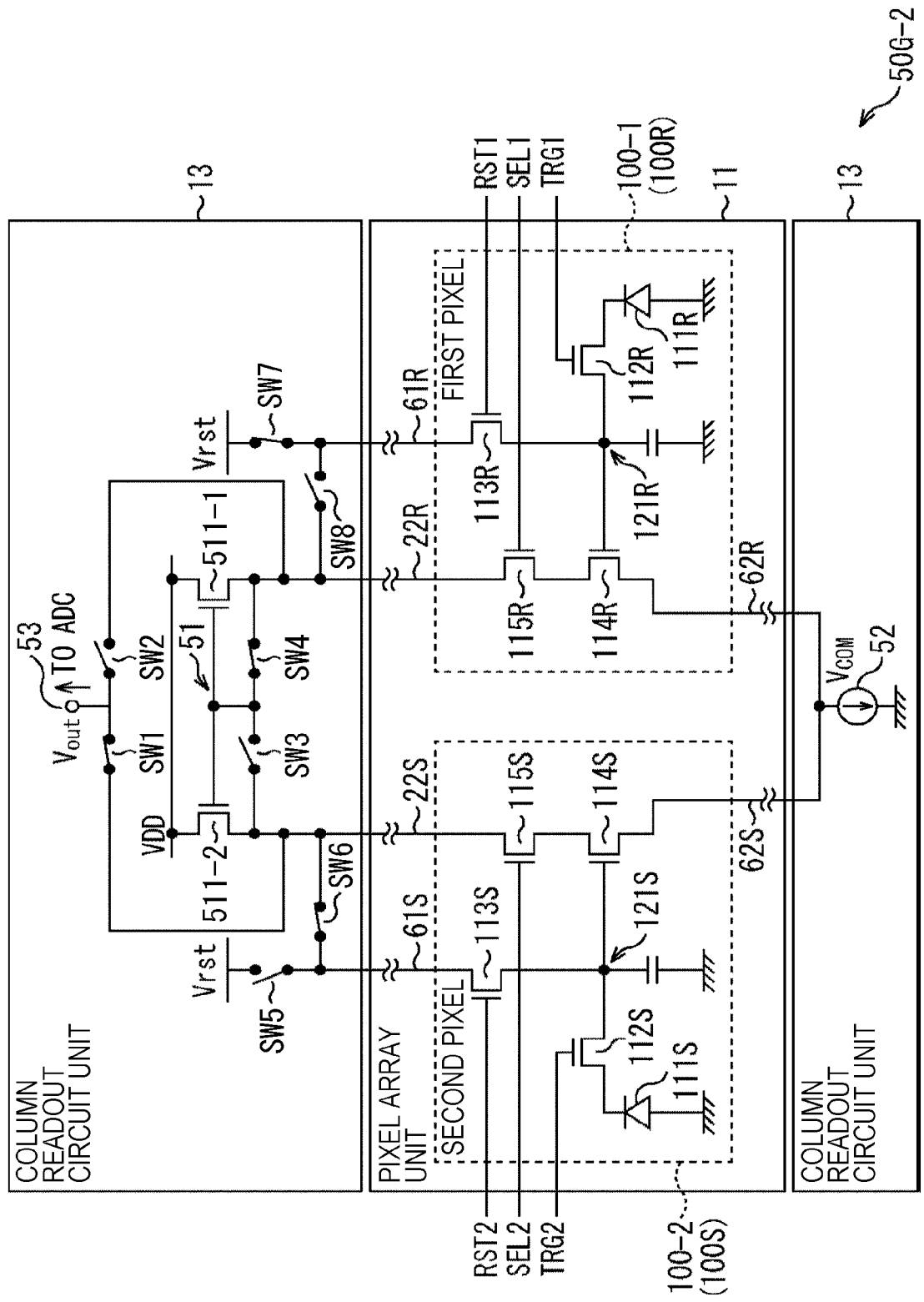
FIG. 17 is a circuit diagram illustrating a configuration in which a readout pixel and a reference pixel can be switched.

FIGS. 16 and 17 are circuit diagrams illustrating a configuration in which a readout pixel and a reference pixel can be switched.

FIG. 16 illustrates an example of configurations of pixels arranged in the pixel array unit 11 before switching by a switch SW of the column readout circuit unit 13, as a differential pixel readout circuit 50G-1. Meanwhile, FIG. 17 illustrates an example of configurations of pixels arranged in the pixel array unit 11 after switching by the switch SW of the column readout circuit unit 13, as a differential pixel readout circuit 50G-2.

In the differential pixel readout circuit 50G-1 in FIG. 16, a first pixel 100-1 and a second pixel 100-2 arranged adjacent to each other in the same row, of two-dimensionally arranged pixels, are illustrated in the pixel array unit 11. Furthermore, in the upper column readout circuit unit 13, switches SW1 to SW8 perform switching operations, so that the first pixel 100-1 serves as the readout pixel 100S and the second pixel 100-2 serves as the reference pixel 100R in the pixel array unit 11.

Meanwhile, in the differential pixel readout circuit 50G-2 in FIG. 17, in the upper column readout circuit unit 13, the switches SW1 to SW8 perform switching operations, so that the first pixel 100-1 serves as the reference pixel 100R and the second pixel 100-2 serves as the readout pixel 100S in the pixel array unit 11.

That is, in the differential pixel readout circuit 50G, the switches SW1 to SW8 of the upper column readout circuit unit 13 perform the switching operations, so that the first pixel 100-1 is switched from the readout pixel 100S (FIG. 16) to the reference pixel 100R (FIG. 17) and the second pixel 100-2 is switched from the reference pixel 100R (FIG. 16) to the readout pixel 100S (FIG. 17) in the pixel array unit 11.

In other words, it can be said that, in the differential pixel readout circuit 50G, the configuration of the readout pixel 100S and the configuration of the reference pixel 100R are interchanged although the relationship of the pixel pair (differential pair) constituting a differential pair is the same, by switching the switches SW1 to SW8 provided in the upper column readout circuit unit 13.

(Example of Driving Switchable Pixels)

Here, an example of driving switchable pixels illustrated in FIGS. 16 and 17 will be described with reference to the timing chart in FIG. 18.

Figure 18:
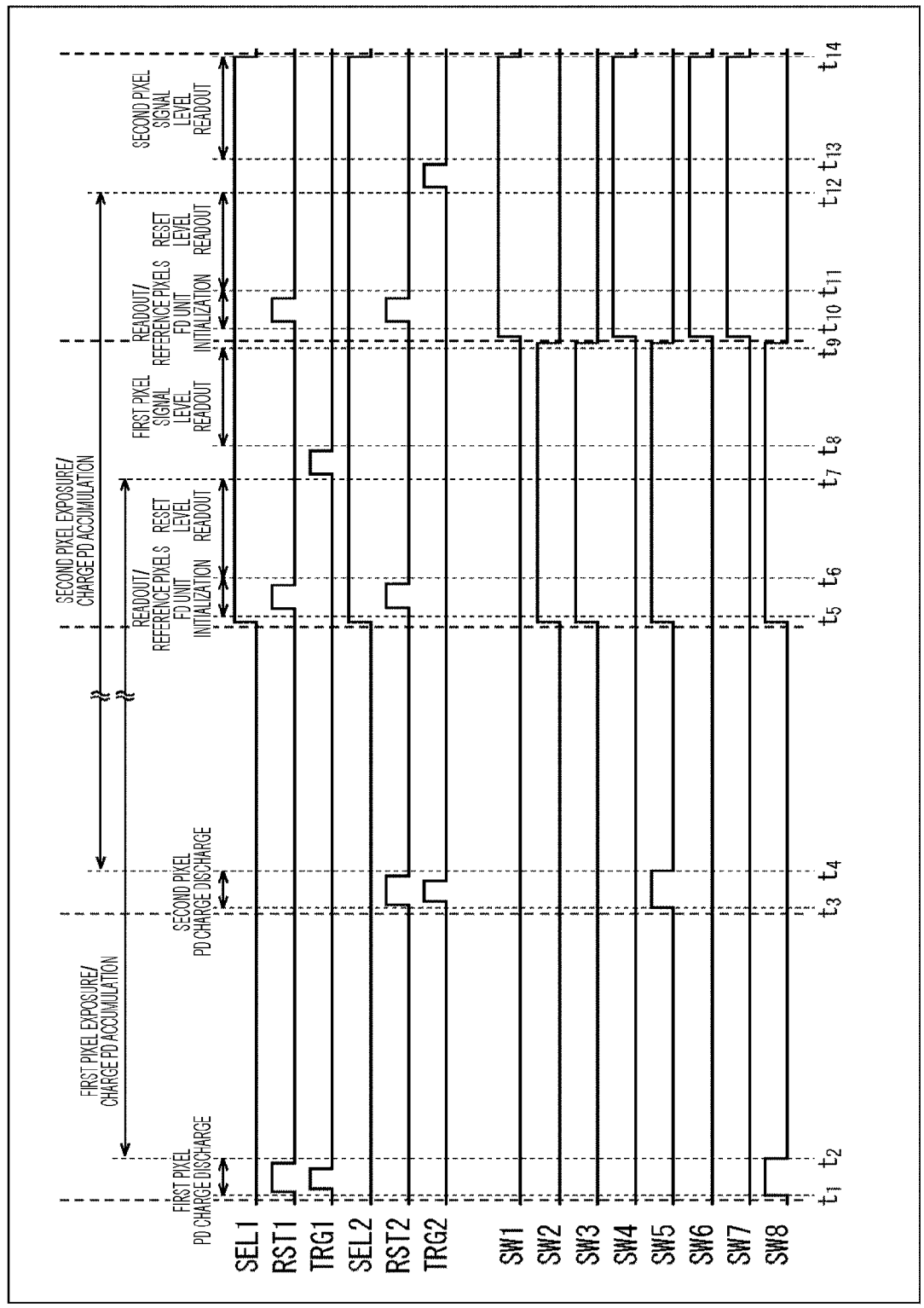
FIG. 18 is a timing chart illustrating an example of driving pixels that can be switched between a readout pixel and a reference pixel.

Note that the upper part in FIG. 18 illustrates timing charts of drive signals SEL1, RST1, and TRG1 and the drive signals SEL2, RST2, and TRG2 respectively applied to the gates of the selection transistors 115, the reset transistors 113, and the transfer transistors 112 in the first pixel 100-1 and the second pixel 100-2.

Meanwhile, the lower part in FIG. 18 illustrates timing charts of the switches SW1 to SW8 indicating on/off timing of SW1 to SW8 in the upper column readout circuit unit 13. Note that the direction of time goes from the left side to the right side in FIG. 18.

First, in the period from time t1 to time t2, the switch SW8 is in the on state, and moreover, when the H-level pulses are applied as the drive signal RST1 and the drive signal TRG1, charges accumulated in the photoelectric conversion unit 111 and the floating diffusion region 121 of the first pixel 100-1 are discharged.

Thereby, in the first pixel 100-1, the charges accumulated in the photoelectric conversion unit 111 so far are swept out, and in the period from time t1 to time t7, charges newly obtained from light of an object are accumulated in the photoelectric conversion unit 111.

Next, in the period from time t3 to time t4, the switch SW5 is in the on state, and when the H-level pulses are applied as the drive signal RST2 and the drive signal TRG2, signal charges accumulated in the photoelectric conversion unit 111 and the floating diffusion region 121 of the second pixel 100-2 are discharged.

Thereby, in the second pixel 100-2, the charges accumulated in the photoelectric conversion unit 111 so far are swept out, and in the period from time t4 to time t12, charges newly obtained from light of an object are accumulated in the photoelectric conversion unit 111.

Next, in the period from time t5 to time t14, when the drive signals SEL1 and SEL2 are switched from the L level to the H level in the selected first pixel 100-1 and second pixel 100-2, the current is supplied from the load MOS circuit 52 from the sources to the drains of the amplification transistors 114 of the first pixel 100-1 and the second pixel 100-2.

Moreover, in the period from time t5 to time t9, when the switches SW2, SW3, SW5, and SW8 are in the on state, the selected first pixel 100-1 and second pixel 100-2, and the current mirror circuit 51 of the column readout circuit unit 13 become equivalent to the differential pixel readout circuit (for example, the differential pixel readout circuit 50 in FIG. 8) having the first pixel 100-1 as the readout pixel 100S and the second pixel 100-2 as the reference pixel 100R.

As a result, the FD potential difference between the floating diffusion regions 121 of the selected first pixel 100-1 and second pixel 100-2 is amplified as an input voltage signal and the amplified input voltage signal is output to the vertical signal line 22.

Next, in the period from time t5 to time t6, when the H-level pulses are applied as the drive signal RST1 and the drive signal RST2, the charges accumulated in the floating diffusion regions 121 are discharged and the signal levels are initialized (reset) in the first pixel 100-1 and the second pixel 100-2.

This reset state continues until time t7, and during the state, the voltage as the reset level of the first pixel 100-1 is read.

In the period from time t7 to time t8, when the H-level pulse is applied as the drive signal TRG1, the charge accumulated in the photoelectric conversion unit 111 is transferred to the floating diffusion region 121 by the transfer transistor 112 in the first pixel 100-1.

Then, in the first pixel 100-1, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until the switches SW2, SW3, SW5, and SW8 are turned off at time t9, and during the state, the voltage as the signal level of the first pixel 100-1 is read.

Next, in the period from time t10 to time t14, when the switches SW1, SW4, SW6, and SW7 are in the on state, the selected first pixel 100-1 and second pixel 100-2, and the current mirror circuit 51 of the column readout circuit unit 13 become equivalent to the differential pixel readout circuit (for example, the differential pixel readout circuit 50 in FIG. 8) having the second pixel 100-2 as the readout pixel 100S and the second pixel 100-2 as the reference pixel 100R.

As a result, the FD potential difference between the floating diffusion regions 121 of the selected first pixel 100-1 and second pixel 100-2 is amplified as an input voltage signal and the amplified input voltage signal is output to the vertical signal line 22.

Next, in the period from time t10 to time t11, when the H-level pulses are applied as the drive signal RST1 and the drive signal RST2, the charges accumulated in the floating diffusion regions 121 are discharged and the signal levels are initialized (reset) in the first pixel 100-1 and the second pixel 100-2.

This reset state continues until time t12, and during the state, the voltage as the reset level of the second pixel 100-2 is read.

In the period from time t12 to time t13, when the H-level pulse is applied as the drive signal TRG2, the charge accumulated in the photoelectric conversion unit 111 is transferred to the floating diffusion region 121 by the transfer transistor 112 in the second pixel 100-2.

Then, in the first pixel 100-2, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until the switches SW1, SW4, SW6, and SW7 are turned off at time t14, and during the state, the voltage as the signal level of the second pixel 100-2 is read.

Note that the column signal processing unit 14 (FIG. 6) performs, for each of the first pixel 100-1 and the second pixel 100-2, correlated double sampling processing of removing noise by taking a difference between the reset level and the signal level read as described above, and reads the pixel signal from which noise has been removed.

(H) Configuration Capable of Switching SF Mode and Differential Mode

By the way, high conversion efficiency can be obtained in the differential amplification readout. Therefore, it is desirable to perform readout by the source-follower readout having a large dynamic range at the time of light, for example. That is, there are some cases where more appropriate readout can be performed by appropriately switching the source-follower readout (hereinafter referred to as an SF mode) and the differential amplification readout (hereinafter referred to as differential mode).

Figure 19:
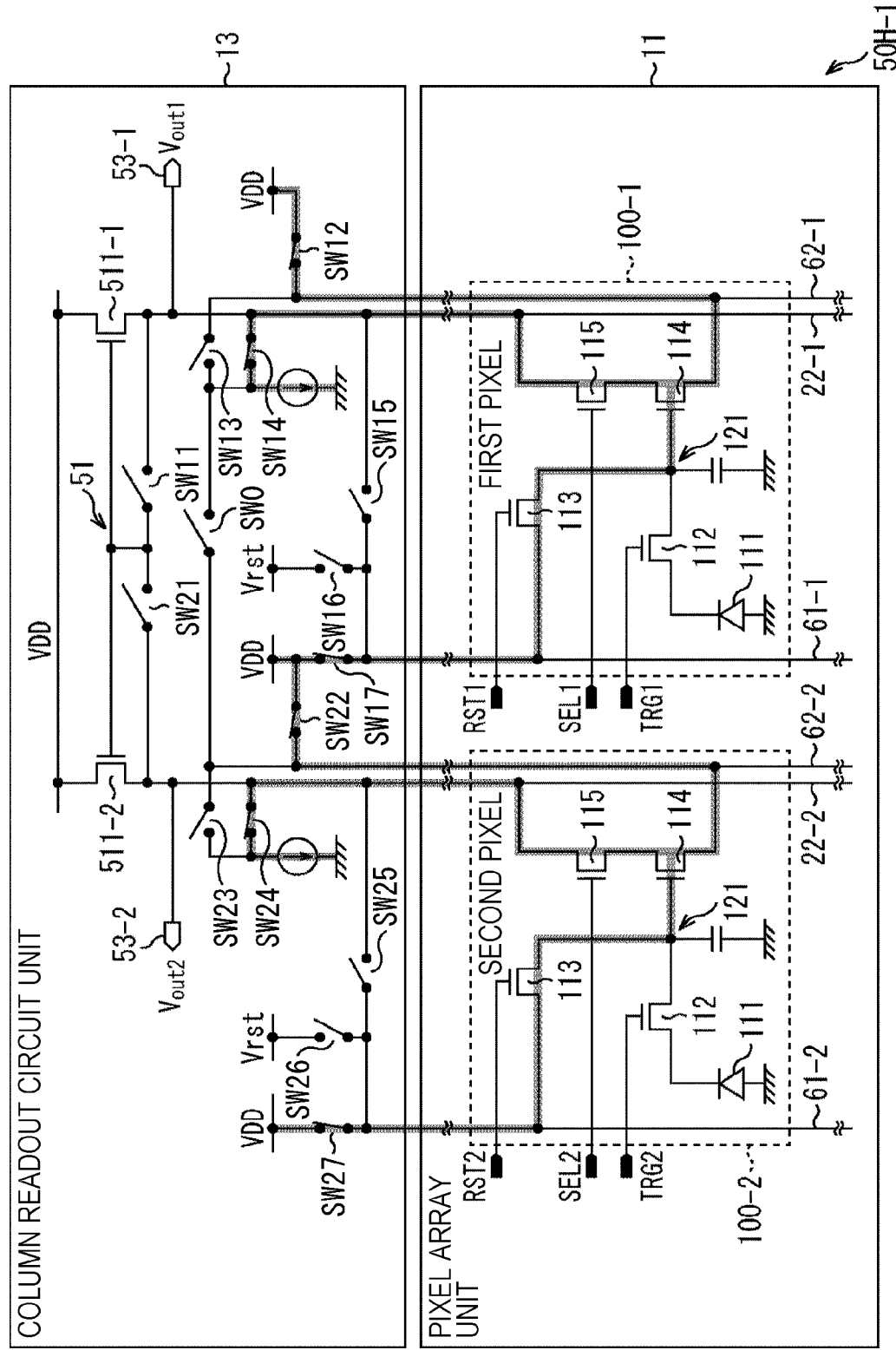
FIG. 19 is a circuit diagram illustrating a configuration of pixels switched to an SF mode.
Figure 20:
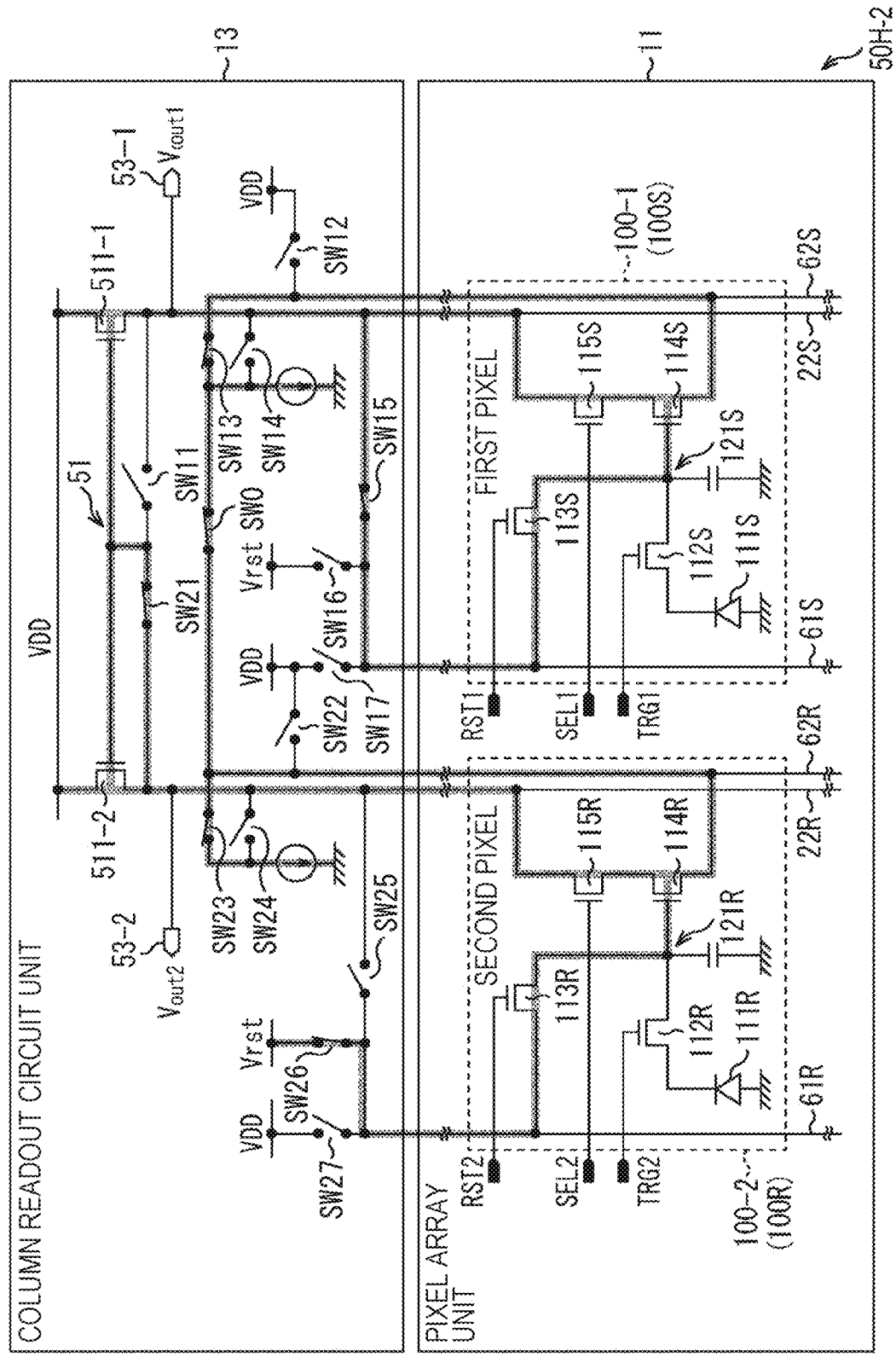
FIG. 20 is a circuit diagram illustrating a configuration of pixels switched to a differential mode.
Figure 21:
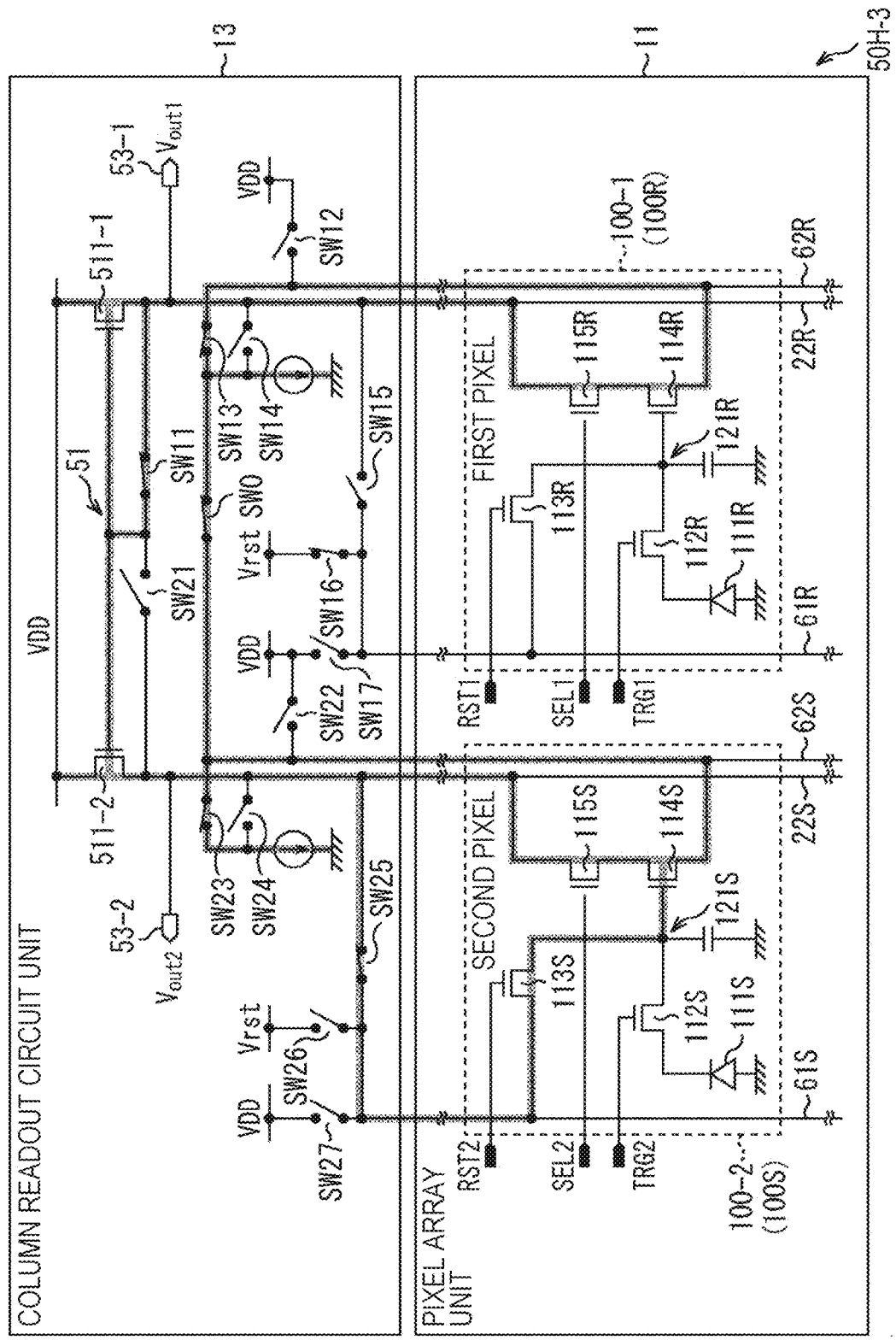
FIG. 21 is a circuit diagram illustrating a configuration of pixels switched to the differential mode.

FIGS. 19 to 21 are circuit diagrams illustrating a configuration in which an SF mode and a differential mode can be switched.

FIG. 19 illustrates an example of a configuration of pixels arranged in the pixel array unit 11 switched to the SF mode by the switch SW of the column readout circuit unit 13, as a pixel readout circuit 50H-1. Meanwhile, FIGS. 20 and 21 illustrate examples of configurations of pixels arranged in the pixel array unit 11 switched to the differential mode by the switch SW of the column readout circuit unit 13, as pixel readout circuits 50H-2 and 50H-3.

In the differential pixel readout circuit 50H-1 in FIG. 19, the first pixel 100-1 and the second pixel 100-2 arranged adjacent to each other in the same row, of two-dimensionally arranged pixels, are illustrated in the pixel array unit 11.

In the pixel readout circuit 50H-1 in FIG. 19, when switches SW0, SW11 to SW17, and SW21 to SW27 of the column readout circuit unit 13 perform the switching operations and the readout mode is transitioned to the SF mode, the source-follower readout is independently performed for the first pixel 100-1 and the second pixel 100-2.

Note that, in the pixel readout circuit 50H-1 in FIG. 19, the portions emphasized with the bold lines, of the wiring of the circuit, are effective portions at the time of operation in the SF mode.

Meanwhile, in the pixel readout circuit 50H-2 in FIG. 20, when the switches SW0, SW11 to SW17, and SW21 to SW27 of the column readout circuit unit 13 perform the switching operations and the readout mode is transitioned to the differential mode, the differential amplification readout of the first pixel 100-1 is performed in the pixel array unit 11, having the first pixel 100-1 as the readout pixel 100S and the second pixel 100-2 as the reference pixel 100R.

Note that, in the pixel readout circuit 50H-2 in FIG. 20, the portions emphasized with the bold lines, of the wiring of the circuit, are effective portions at the time of operation in the differential mode.

Furthermore, in the pixel readout circuit 50H-3 in FIG. 21, when the switches SW0, SW11 to SW17, and SW21 to SW27 of the column readout circuit unit 13 perform the switching operations and the readout mode is transitioned to the differential mode, the differential amplification readout of the second pixel 100-2 is performed in the pixel array unit 11, having the first pixel 100-1 as the reference pixel 100R and the second pixel 100-2 as the readout pixel 100S.

Note that, in the pixel readout circuit 50H-3 in FIG. 21, the portions emphasized with the bold lines, of the wiring of the circuit, are effective portions at the time of operation in the differential mode.

As described above, in the pixel readout circuit 50H, the switches SW0, SW11 to SW17, and SW21 to SW27 of the column readout circuit unit 13 perform the switching operations, so that the first pixel 100-1 is switched to the readout pixel 100S (FIG. 20) or the reference pixel 100R (FIG. 21) corresponding to the differential mode, in addition to the pixel (FIG. 19) corresponding to the SF mode, and the second pixel 100-2 is switched to the reference pixel 100R (FIG. 20) or the readout pixel 100S (FIG. 21) corresponding to the differential mode, in addition to the pixel (FIG. 19) corresponding to the SF mode, in the pixel array unit 11.

In other words, by switching the switches SW0, SW11 to SW17, and SW21 to SW27 provided in the column readout circuit unit 13, the pixel readout circuit 50H can not only perform the source-follower readout but also interchange the configurations of the pixel pair forming the differential pair (differential pair) in performing the differential amplification readout.

(Drive Example in SF Mode)

Here, an example of driving pixels switched to the SF mode illustrated in FIG. 19 will be described with reference to the timing chart in FIG. 22.

Figure 22:
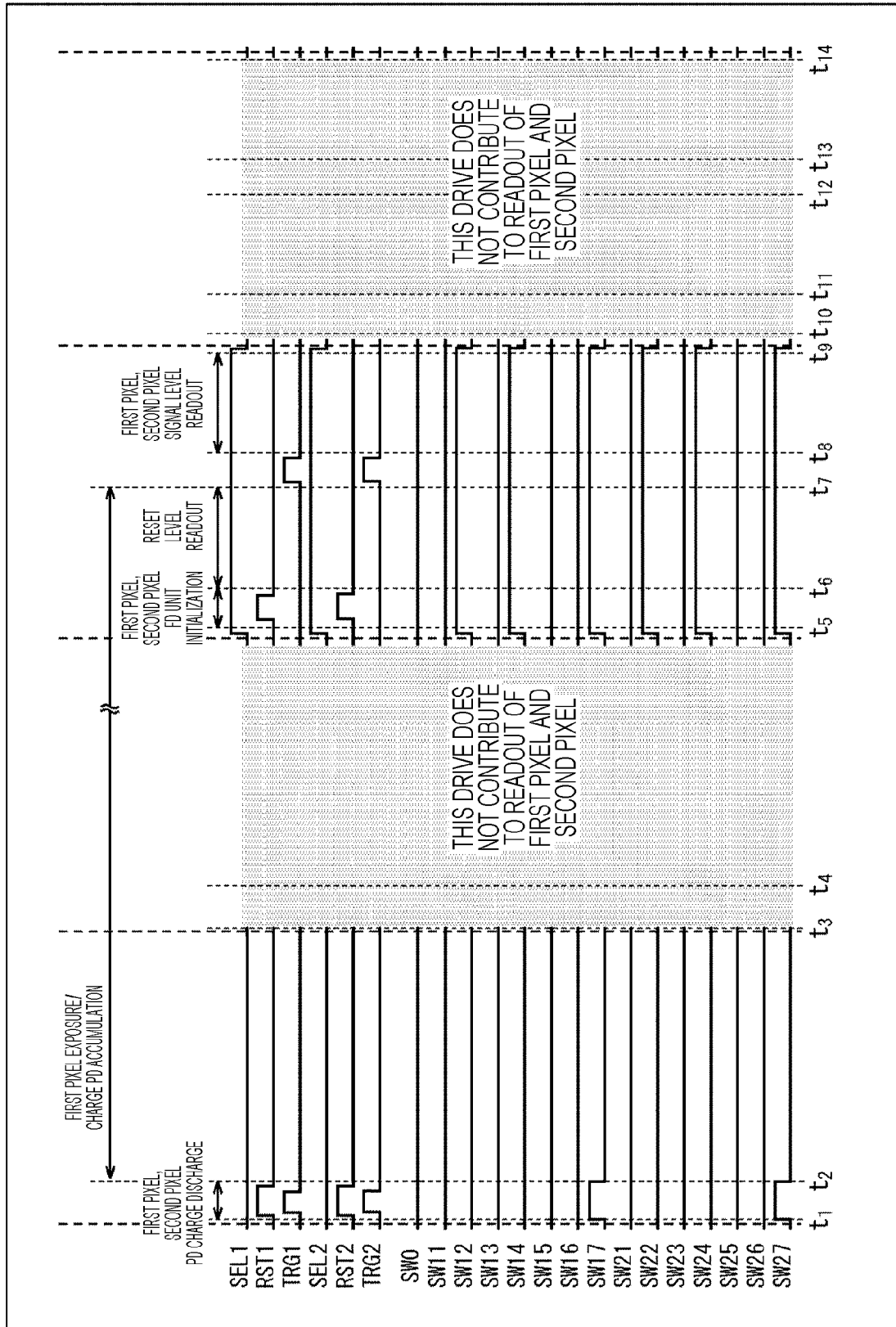
FIG. 22 is a timing chart illustrating an example of driving pixels switched to the SF mode.

Note that the upper part in FIG. 22 illustrates timing charts of drive signals SEL1, RST1, and TRG1 and the drive signals SEL2, RST2, and TRG2 respectively applied to the gates of the selection transistors 115, the reset transistors 113, and the transfer transistors 112 in the first pixel 100-1 and the second pixel 100-2.

Meanwhile, the lower part in FIG. 22 illustrates timing charts of the switches SW0, SW11 to SW17, and SW21 to SW27, indicating on/off timing of SW0, SW11 to SW17, and SW21 to SW27 in the column readout circuit unit 13. Note that the direction of time goes from the left side to the right side in FIG. 22.

Note that, for convenience of description, the timing charts in FIG. 22 are illustrated basically corresponding to the timing charts illustrated in FIG. 18 described above. However, the drive example in FIG. 22 is different from the drive example in FIG. 18, especially in that the drive in the period from time t to time t35 and the period from time t10 to time t14 does not contribute to the readout of the first pixel 100-1 and the second pixel 100-2.

First, in the period from time t1 to time t2, the switches SW17 and SW27 are in the on state, and moreover, when the H-level pulses are applied as the drive signals RST1 and RST2 and the drive signals TRG1 and TRG2, charges accumulated in the photoelectric conversion units 111 and the floating diffusion regions 121 of the first pixel 100-1 and the second pixel 100-2 are discharged.

Thereby, in the first pixel 100-1 and the second pixel 100-2, the charges accumulated in the photoelectric conversion units 111 so far are swept out, and in the period from time t1 to time t7, charges newly obtained from light of an object are accumulated in the photoelectric conversion units 111.

Next, in the period from time t5 to time t9, when the drive signals SEL1 and SEL2 are switched from the L level to the H level in the selected first pixel 100-1 and second pixel 100-2, the current is supplied from the load MOS circuit 52 from the sources to the drains of the amplification transistors 114 of the first pixel 100-1 and the second pixel 100-2.

Moreover, in the period from time t5 to time t9, when the switches SW12, SW14, and SW17, and the switches SW22, SW24, and SW27 are turned on, and the other switches SW are turned off, the readout circuits of the selected first pixel 100-1 and second pixel 100-2 become equivalent to a source-follower readout circuit.

As a result, in the selected first pixel 100-1 and second pixel 100-2, the FD potentials of the floating diffusion regions 121 are amplified as input voltage signals and the amplified input voltage signals are output to the vertical signal line 22.

Next, in the period from time t5 to time t6, when the H-level pulses are applied as the drive signal RST1 and the drive signal RST2, the charges accumulated in the floating diffusion regions 121 are discharged and the signal levels are initialized (reset) in the first pixel 100-1 and the second pixel 100-2.

This reset state continues until time t7, and during the state, the voltages as the reset level of the first pixel 100-1 and the second pixel 100-2 are read.

In the period from time t7 to time t8, when the H-level pulses are applied as the drive signals TRG1 and TRG2, the charges accumulated in the photoelectric conversion units 111 are transferred to the floating diffusion regions 121 by the transfer transistors 112 in the first pixel 100-1 and the second pixel 100-2.

Then, in the first pixel 100-1 and the second pixel 100-2, the floating diffusion regions 121 are modulated by the transferred charges, and when the charges are input to the gates of the amplification transistors 114 as the voltage signals, the voltage signals according to the accumulated charge amounts are output to the vertical signal line 22.

This signal readout state continues until the switches SW12, SW14, and SW17 and the switches SW22, SW24, and SW27 are turned off at time t9, and during the state, the voltage as the signal level of the first pixel 100-1 and the second pixel 100-2 is read.

Note that the column signal processing unit 14 (FIG. 6) performs, for each of the first pixel 100-1 and the second pixel 100-2, correlated double sampling processing of removing noise by taking a difference between the reset level and the signal level read as described above, and reads the pixel signal from which noise has been removed.

(Drive Example in Differential Mode)

Next, an example of driving pixels switched to the differential mode illustrated in FIGS. 20 and 21 will be described with reference to the timing chart in FIG. 23.

Figure 23:
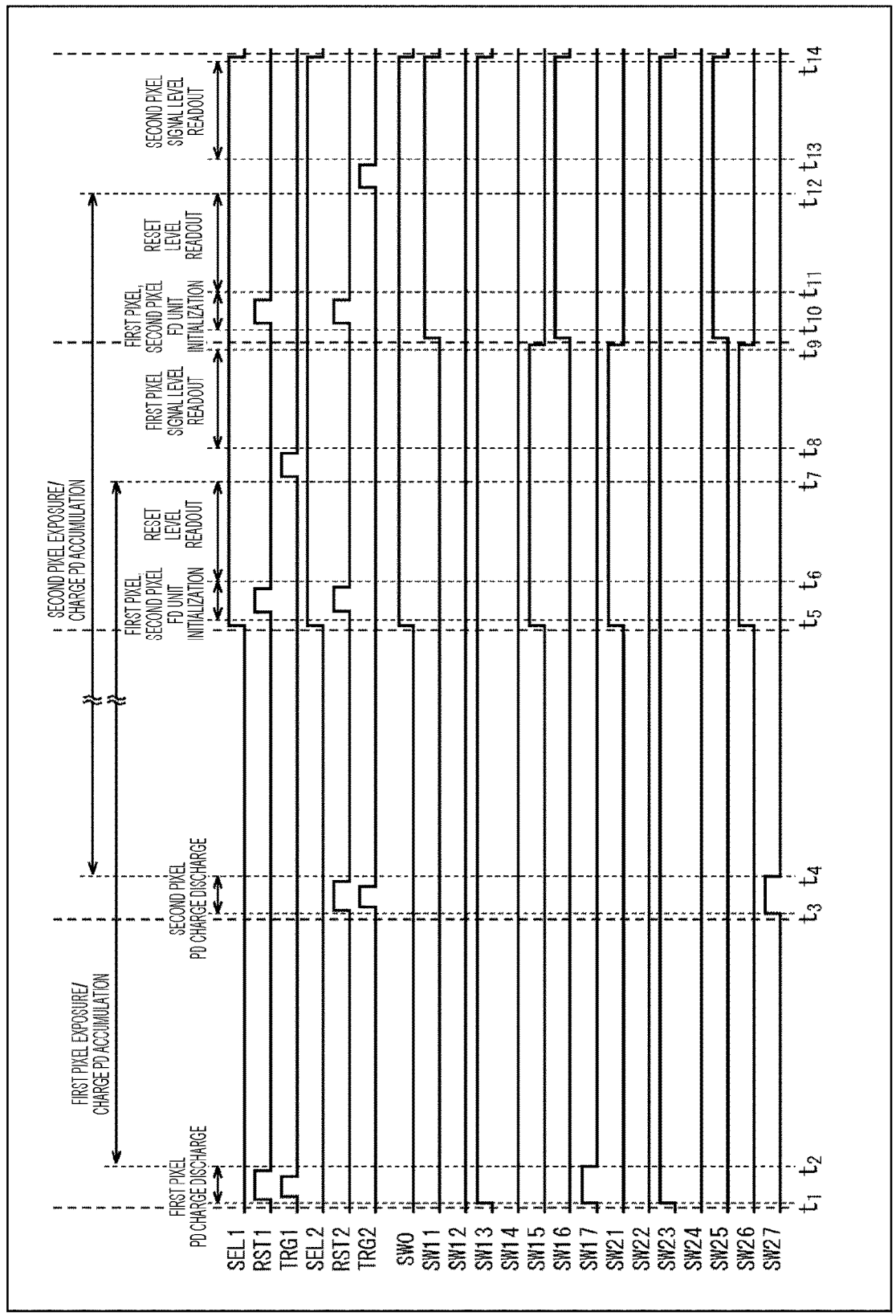
FIG. 23 is a timing chart illustrating an example of driving pixels switched to the differential mode.

Note that the upper part in FIG. 23 illustrates timing charts of drive signals SEL1, RST1, and TRG1 and the drive signals SEL2, RST2, and TRG2 respectively applied to the gates of the selection transistors 115, the reset transistors 113, and the transfer transistors 112 in the first pixel 100-1 and the second pixel 100-2.

Meanwhile, the lower part in FIG. 23 illustrates timing charts of the switches SW0, SW11 to SW17, and SW21 to SW27, indicating on/off timing of SW0, SW11 to SW17, and SW21 to SW27 in the column readout circuit unit 13. Note that the direction of time goes from the left side to the right side in FIG. 23.

Note that, for convenience of description, the timing charts in FIG. 23 are illustrated basically corresponding to the timing charts illustrated in FIG. 18 described above. However, the drive example in FIG. 23 requires not only switching of the readout pixel 100S and the reference pixel 100R but also switching of the SF mode and the differential mode, and thus has a large number of switches SW and different switching control, as compared with the drive example in FIG. 18.

That is, in the timing charts in FIG. 23, the timing to apply the H-level pulses as the drive signals SEL1, RST1, and TRG1 and the drive signals SEL2, RST2, and TRG2 is similar to the timing charts in FIG. 18.

Meanwhile, in the timing charts in FIG. 23, in the period from time t5 to time t9, the switches SW0, SW13, SW15, SW21, SW23, and SW26 are in the on state and the other switches SW are in the off state, of the switches SW0, SW11 to SW17, and SW21 to SW27. Thereby, in the pixel array unit 11, the differential amplification readout of the first pixel 100-1 is performed, having the first pixel 100-1 as the readout pixel 100S and the second pixel 100-2 as the reference pixel 100R.

Furthermore, in the timing charts in FIG. 23, in the period from time t10 to time t14, the switches SW0, SW11, SW13, SW16, SW23, and SW25 are in the on state and the other switches SW are in the off state, of the switches SW0, SW11 to SW17, and SW21 to SW27. Thereby, in the pixel array unit 11, the differential amplification readout of the second pixel 100-2 is performed, having the first pixel 100-1 as the reference pixel 100R and the second pixel 100-2 as the readout pixel 100S.

As described above, in the pixel readout circuit 50H, the switches SW0, SW11 to SW17, and SW21 to SW27 perform the switching operations in the column readout circuit unit 13, thereby easily switching the readout in the differential mode and the readout in the SF mode. Therefore, for example, at the time of light, readout can be switched to the source-follower readout having a large dynamic range.

(Effects Obtained with Configuration of First Embodiment)

Next, effects obtained by adopting the configuration of setting the reset voltage by external application and negative feedback as the first embodiment will be described with reference to FIG. 24.

Figure 24:
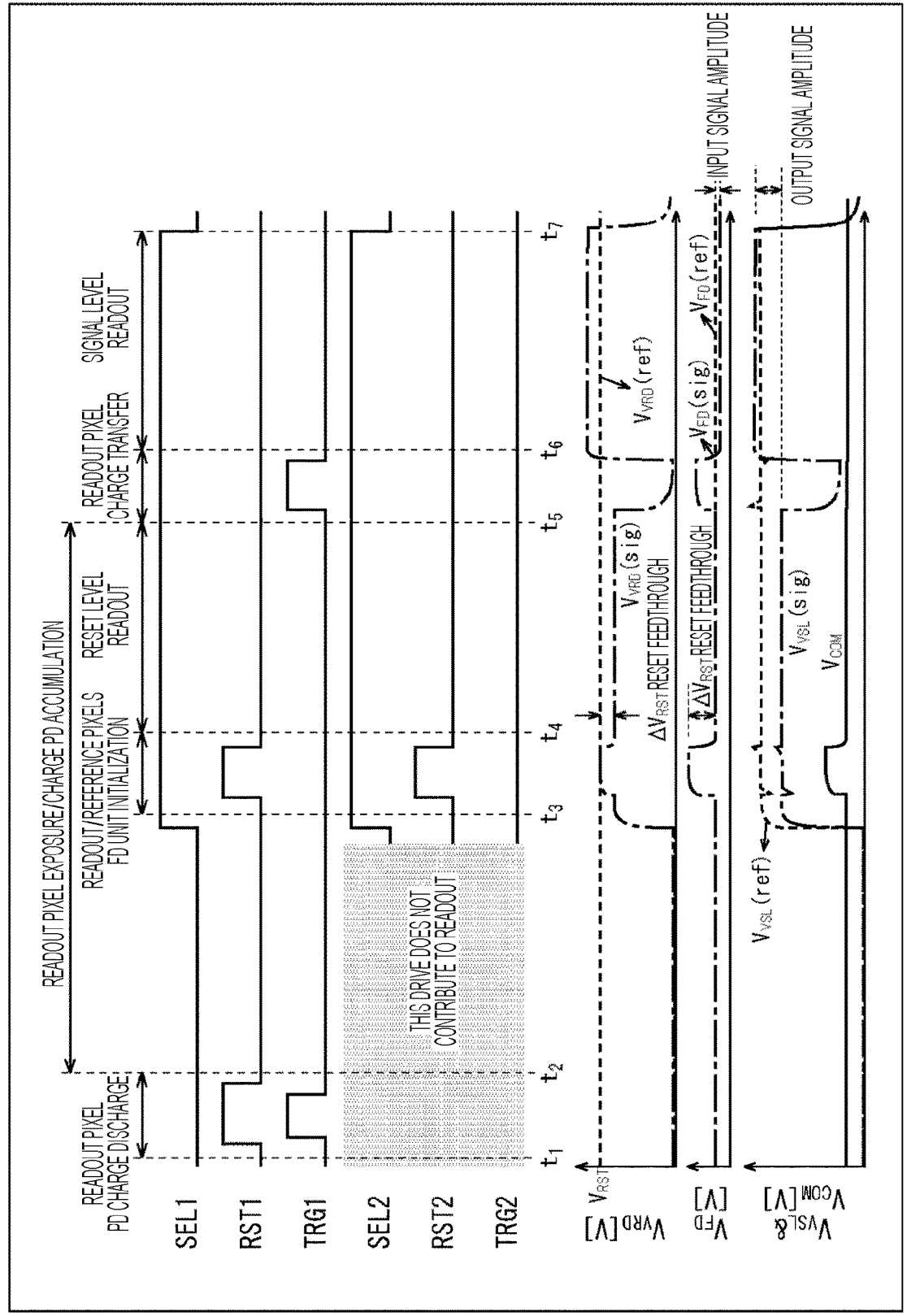
FIG. 24 is a diagram for describing an effect obtained by adopting the first embodiment.

Note that the upper part in FIG. 24 illustrates timing charts of the drive signals SEL1, RST1, and TRG1 respectively applied to the gates of the selection transistor 115S, the reset transistor 113S, and the transfer transistor 112S in the readout pixel 100S.

Furthermore, the middle part in FIG. 24 illustrates timing charts of the drive signals TRG2, RST2, and SEL2 respectively applied to the gates of the selection transistor 115R, the reset transistor 113R, and the transfer transistor 112R in the reference pixel 100R.

Since the upper and middle timing charts in FIG. 24 are similar to the timing charts illustrated in FIG. 9, description thereof is appropriately omitted. However, the lower part in FIG. 24 illustrates timing charts of voltage waveforms of VVRD, VFD, VVSL, and VCOM.

Note that VVRD represents the waveform of the voltage applied to the vertical reset input line (VRD) 61, V represents the waveform of the FD voltage (FD potential) of the floating diffusion region (FFDD) 121, VVSL represents the waveform of the voltage (VSL potential) applied to the vertical signal line (VSL) 22 connected to the output terminal 53, and VCOM represents the waveform of the voltage applied to the vertical current supply line 62 connected to the load MOS circuit 52.

Here, focusing on the period from time t3 to time t4, when H-level pulses are applied as the drive signal RST1 and the drive signal RST2, the charges accumulated in the floating diffusion region 121S and the floating diffusion region 121R are discharged and the signal levels are initialized (reset) in the readout pixel 100S and the reference pixel 100R.

At this time, in the differential pixel readout circuit 50, the output terminal 53 is electrically connected to the floating diffusion region 121S through the readout-side vertical reset input line 61S and the reset transistor 113S. As a result, in the differential pixel readout circuit 50, the output terminal 53 is negatively fed back to the one input-side floating diffusion region 121S and enters a virtual ground state. Therefore, the other input-side floating diffusion region 121R fixed to the power supply Vrst by external application, and the floating diffusion region 121S and the output terminal 53 have the same potential.

Thereafter, in the period from time t4 to time t5, when L-level pulses are applied as the drive signal RST1 and the drive signal RST2, the floating diffusion region 121S is electrically disconnected from the readout-side vertical reset input line 61S, and the floating diffusion region 121R is electrically disconnected from the reference-side vertical reset input line 61R, and the floating diffusion regions enter the floating state, in the readout pixel 100S and the reference pixel 100R.

At this time, since the floating diffusion region 121S of the readout pixel 100S and the floating diffusion region 121R of the reference pixel 100R have almost an equivalent structure, the potential variation (reset feedthrough) at the time of reset off is almost the same, and the FD potential of the floating diffusion region 121S and the FD potential of the floating diffusion region 121R perform almost the same movement.

Therefore, the output from the output terminal 53 of the differential pixel readout circuit 50 hardly changes from the voltage Vrst at the time of reset on, and this state becomes a reset state (initial state) in the differential amplification readout, and an output level in the reset state becomes a reset level (initial level). This reset state continues until the signal charge is transferred at time t5, and the voltage as the reset level is read.

As described above, the differential amplification readout enables suppressing out of the readable range of the reset level due to reset feedthrough while realizing high conversion efficiency (amplification factor). Moreover, in the first embodiment, the configuration of setting the reset voltage by external application and negative feedback is adopted, whereby the FD potential (FD voltage) of the readout pixel 100S at the time of reset can be controlled to the desired value.

For example, it is known that an operating point is disadvantageous for transfer in an amplifier circuit with high conversion efficiency (amplification factor). However, by controlling the FD potential of the readout pixel 100S to a desired value, it becomes possible to transfer charges from the photoelectric conversion unit 111S and to set the initial FD voltage at which large amplitude of the output voltage of the pixel can be obtained.

The first embodiment has been described above.

4. Second Embodiment

Next, a configuration for suppressing an increase in noise while realizing high conversion efficiency (amplification factor) by differential amplification readout will be described with reference to FIGS. 25 to 32, as a second embodiment.

(Configuration Example of Pixel Readout Circuit)

Figure 25:
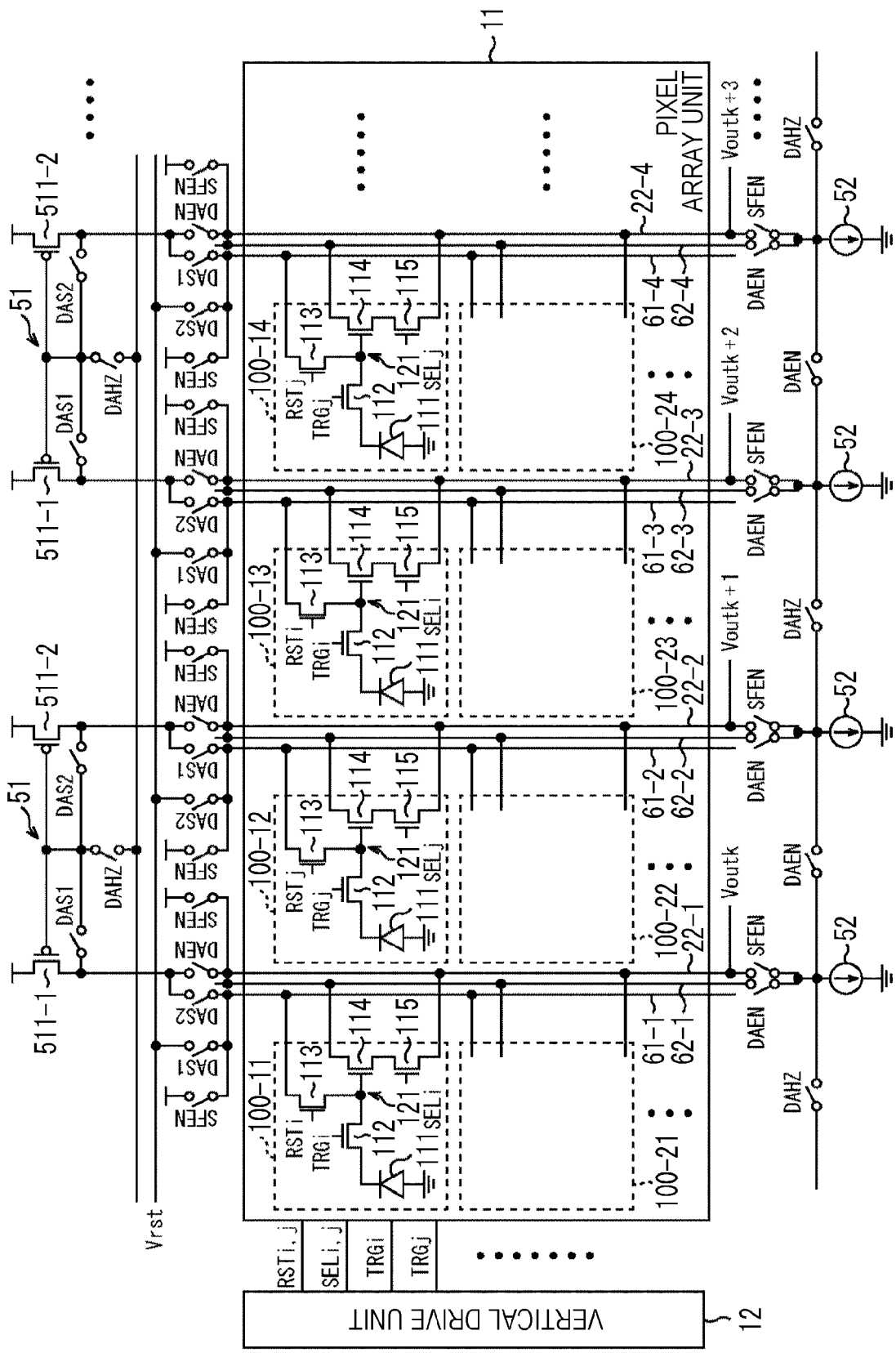
FIG. 25 is a circuit diagram illustrating a configuration example of a pixel readout circuit according to a second embodiment.

FIG. 25 is a circuit diagram illustrating a configuration example of a pixel readout circuit according to the second embodiment.

In FIG. 25, the pixel readout circuit includes a pixel 100 arranged in a pixel array unit 11, a current mirror circuit 51 including a PMOS transistor 511, and a load MOS circuit 52 that supplies a constant current to the pixel.

In the pixel array unit 11, when i-th row and j-th column of the pixel 100 is represented as pixel 100-ij, a pixel 100-11 includes four pixel transistors of a transfer transistor 112, a reset transistor 113, an amplification transistor 114, and a selection transistor 115, for example, in addition to a photoelectric conversion unit 111 such as a photodiode (PD).

In the pixel 100-11, a drain of the reset transistor 113 is connected to a reset input line 61-1. A source of the amplification transistor 114 is connected to a vertical current supply line 62-1. A drain of the amplification transistor 114 is connected to a source of the selection transistor 115S, and a drain of the selection transistor 115 is connected to a vertical signal line 22-1.

A gate of the transfer transistor 112, a gate of the reset transistor 113, and a gate of the selection transistor 115 are connected to a vertical drive unit 12 via pixel drive lines 31 (FIG. 6), and pulses as drive signals (TRGi, RSTi, and SELi) are respectively supplied thereto.

Furthermore, the pixel 100-12 includes four pixel transistors in addition to the photoelectric conversion unit 111, similarly to the pixel 100-11, but is different from the pixel 100-11 in that drive signals (TRGj, RSTj, and SELj) are supplied to the gates of the transfer transistor 112, the reset transistor 113, and the selection transistor 115.

That is, in the pixel array unit 11, the pixels 100 have a similar configuration, but the drive signals supplied to the gates of the transfer transistor 112, the reset transistor 113, and the selection transistor 115 are different between odd-column pixels and even-column pixels, for example.

More specifically, the drive signals (TRGi, RSTi, and SELi) are supplied to the odd-column pixels 100-11 and 100-13, whereas the drive signals (TRGj, RSTj, and SELj) are supplied to the even-column pixels 100-12 and 100-14.

Here, the pixel readout circuit in FIG. 25 is provided with switches SFEN, DAEN, DAS1, and DAS2, and these switches perform on/off switching operations, thereby switching an SF mode and a differential mode.

Furthermore, the pixel readout circuit in FIG. 25 is provided with switches DAHZ in the upper part and lower part. When the upper switch DAHZ is turned on, bias voltages of the current mirror circuits 51 each including a pair of the PMOS transistors 511 are laterally connected. Meanwhile, when the lower switch DAHZ is turned on, constant current source nodes by the load MOS circuits 52 each including an NMOS transistor and the like are laterally connected.

Note that the configuration of the pixel readout circuit in the case of switching the readout mode to the differential mode will be described with reference to the circuit diagrams in FIGS. 26 and 27 to be described below, and a drive example thereof will be described with reference to the timing chart in FIG. 29 to be described below. Furthermore, the configuration of the pixel readout circuit in the case of switching the readout mode to the SF mode will be described with reference to the circuit diagram in FIG. 28, and a drive example thereof will be described with reference to the timing chart in FIG. 30 to be described below.

(Configuration of Differential Mode)

Figure 26:
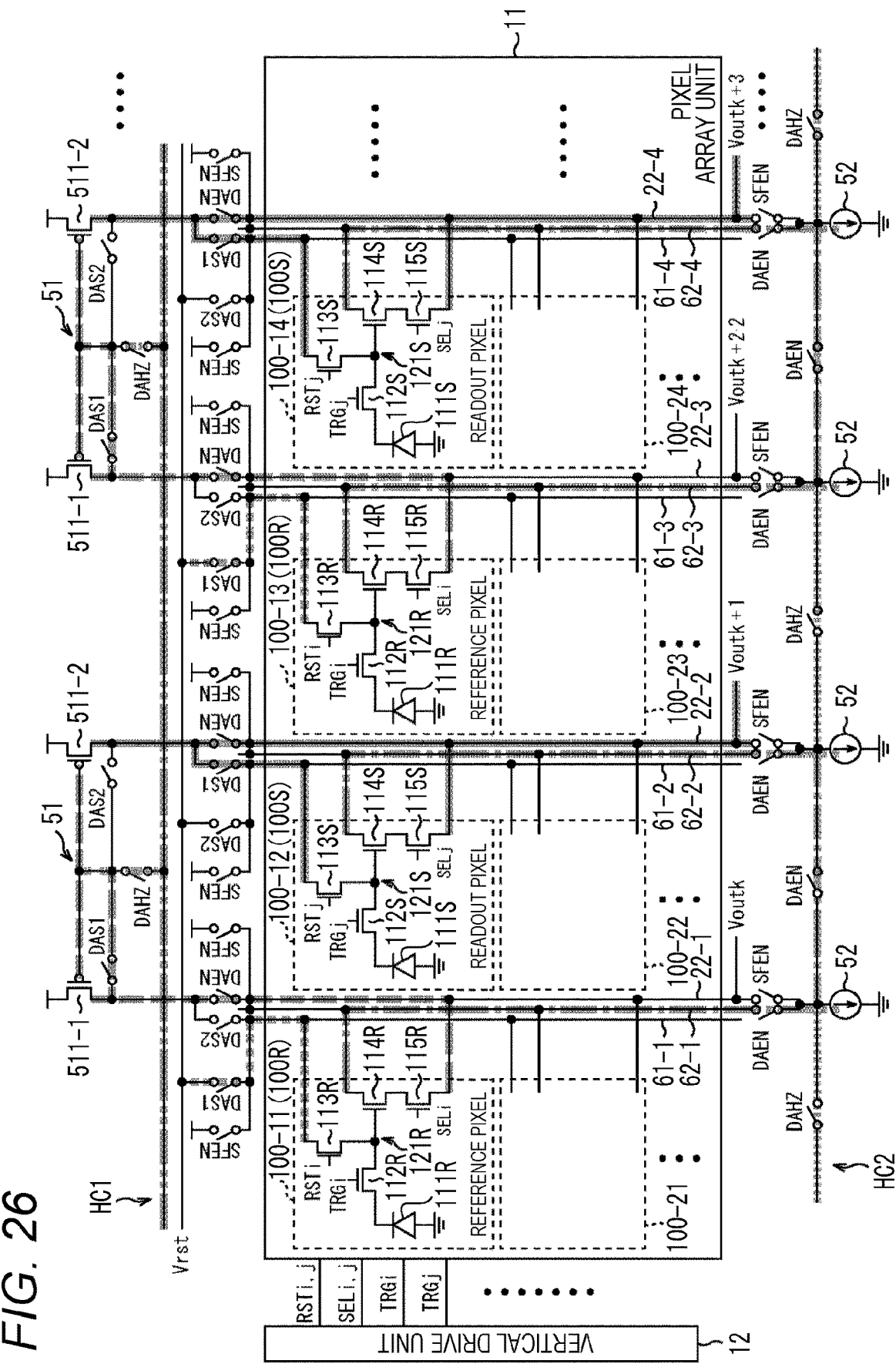
FIG. 26 is a circuit diagram illustrating a configuration example of the pixel readout circuit in a differential mode.
Figure 27:
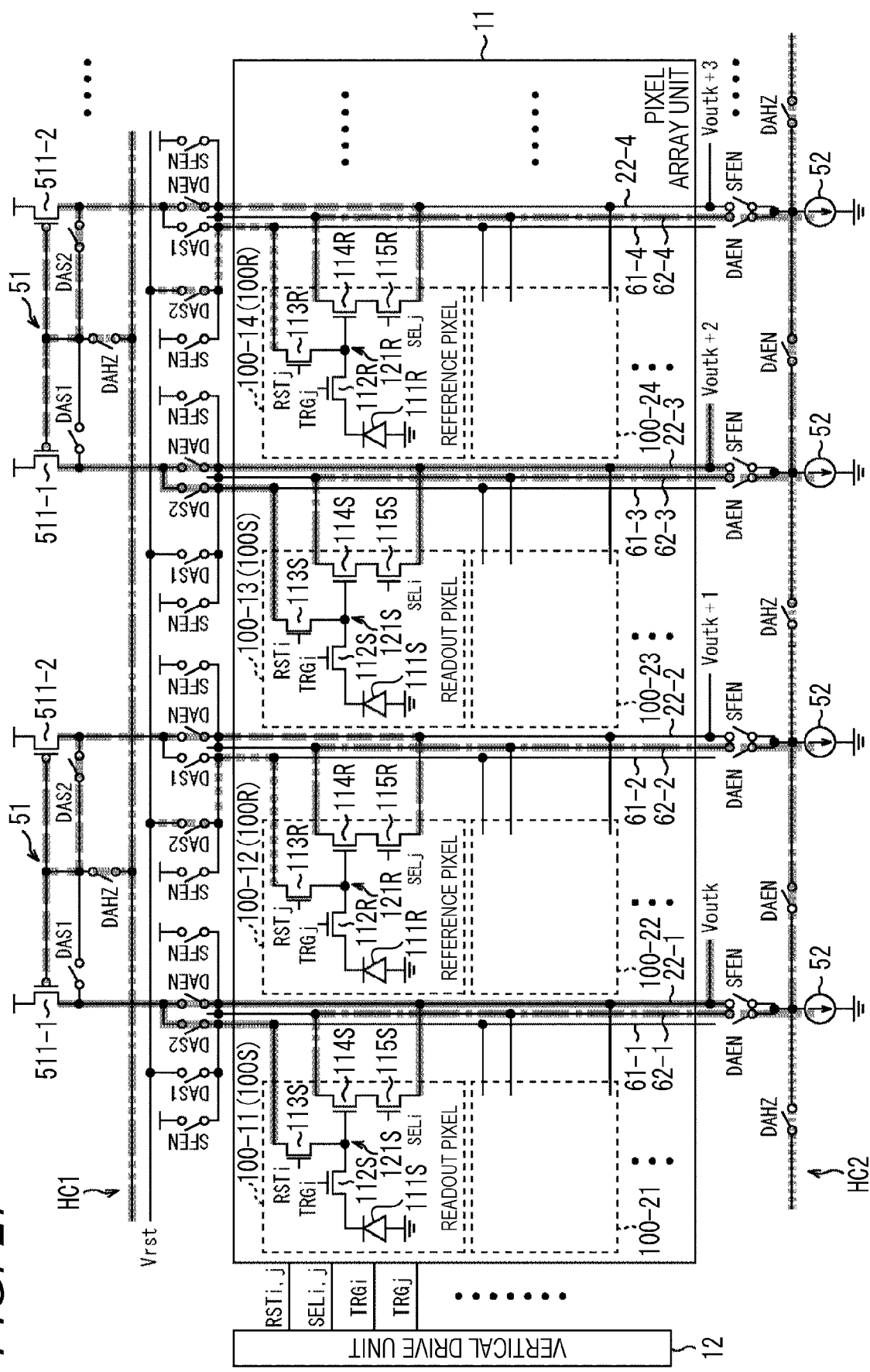
FIG. 27 is a circuit diagram illustrating a configuration example of the pixel readout circuit in the differential mode.

FIGS. 26 and 27 are circuit diagrams illustrating a configuration in which a readout pixel and a reference pixel can be switched in the differential mode.

FIGS. 26 and 27 illustrate examples of a configuration of pixels arranged in the pixel array unit 11 switched to the differential mode by turning off the switch SFEN and turning on the switch DAEN, as the pixel readout circuit.

Furthermore, in the pixel readout circuit in FIG. 26, by turning on the switch DAS1 and turning off the switch DAS2, the odd-column pixels 100-11 and 100-13 are set to reference pixels 100R and the even-column pixels 100-12 and 100-14 are set to readout pixels 100S, for example, among the pixels arranged in the pixel array unit 11. Thereby, differential amplification readout is performed.

Meanwhile, in the pixel readout circuit in FIG. 27, by turning off the switch DAS1 and turning on the switch DAS2, the odd-column pixels 100-11 and 100-13 are set to the readout pixels 100S and the even-column pixels 100-12 and 100-14 are set to the reference pixels 100R, for example, among the pixels arranged in the pixel array unit 11. Thereby, differential amplification readout is performed.

Here, in the pixel readout circuits in FIGS. 26 and 27, the upper switch DAHZ is turned on, and the bias voltages of the current mirror circuits 51 each including the pair of PMOS transistors 511 are laterally connected (HC1 in FIGS. 26 and 27). Furthermore, the lower switch DAHZ is turned on, and the constant current source nodes of the load MOS circuits 52 each including the NMOS transistor and the like are laterally connected (HC2 in FIGS. 26 and 27).

By performing such lateral connection, both the source side and the drain side of the amplification transistors 114R of the reference pixels 100R are connected, and noise generated at the laterally connected nodes is suppressed according to the number of lateral connections.

Here, the noise generated at the laterally connected nodes can be suppressed by laterally connecting at least one of the lateral connection HC1 or the lateral connection HC2. However, the noise suppression effect can be further enhanced by performing both the lateral connection HC1 and the lateral connection HC2.

Furthermore, the noise generated at the laterally connected nodes can be suppressed by not only a case where all the upper switches DAHZ for realizing the lateral connection HC1 are turned on but also a case where some of the switches DAHZ are turned on. However, the noise suppression effect can be further enhanced as the number of lateral connections HC1 is larger. Similarly, the noise generated at the laterally connected nodes can be suppressed when all or some of the upper switches DAHZ for realizing the lateral connection HC2 are turned on.

That is, the noise suppression effect becomes larger as the number of columns as a unit of lateral connection is larger. However, the noise reduction effect can be obtained by not only a case where all the pixel pairs (differential pairs) of the pixel array arranged in the pixel array unit 11 are connected but also a case where the pixel pairs are connected in units of two or more columns.

For example, the pixels may be separated by colors of red (R), green (G), and blue (B), and laterally connected, or a plurality of regions may be laterally connected according to angles of view and these regions may be switched according to a mode. The upper or lower switch DAHZ performs the switching operation according to a DAHZ signal supplied to each switch and can arbitrarily disconnect the lateral connection.

As described above, in the pixel readout circuit, source sides, drain sides, or both of the source sides and the drain sides of all or some of the amplification transistors 114R of the reference pixels 100R can be connected by wire.

Note that, in the pixel readout circuit in FIG. 26, the vertical signal line 22 is connected to the drain and the gate of the PMOS transistor 511-1 and the gate of the PMOS transistor 511-2 of the current mirror circuit 51 in the reference pixel 100R such as the pixel 100-11, the pixel 100-13, or the like.

In the reference pixel 100R in FIG. 26, the vertical reset input line 61 is connected to a power supply Vrst. At the time of reset, an arbitrary input voltage signal is applied to a floating diffusion region 121 selected through the vertical reset input line 61, that is, to an input terminal of the amplification transistor 114.

Furthermore, in the pixel readout circuit in FIG. 26, the vertical signal line 22 is connected to the vertical reset input line 61, the drain of the PMOS transistor 511-2 of the current mirror circuit 51, and an output terminal Vout in the readout pixel 100S such as the pixel 100-12, the pixel 100-14, or the like.

In the readout pixel 100S in FIG. 26, the vertical reset input line 61 is connected to the vertical signal line 22, and is connected to the floating diffusion region 121 of the selected readout pixel 100, that is, to an input terminal of the amplification transistor 114. An output signal of the pixel readout circuit is negatively fed back when the reset transistor 113 is on.

Meanwhile, in the pixel readout circuit in FIG. 27, the vertical signal line 22 is connected to the vertical reset input line 61, the drain of the PMOS transistor 511-2 of the current mirror circuit 51, and an output terminal Vout in the readout pixel 100S such as the pixel 100-11, the pixel 100-13, or the like.

In the readout pixel 100S in FIG. 27, the vertical reset input line 61 is connected to the vertical signal line 22, and is connected to the floating diffusion region 121 of the selected readout pixel 100, that is, to an input terminal of the amplification transistor 114. An output signal of the pixel readout circuit is negatively fed back when the reset transistor 113 is on.

Furthermore, in the pixel readout circuit in FIG. 27, the vertical signal line 22 is connected to the drain and the gate of the PMOS transistor 511-2 and the gate of the PMOS transistor 511-1 of the current mirror circuit 51 in the reference pixel 100R such as the pixel 100-12, the pixel 100-14, or the like.

In the reference pixel 100R in FIG. 27, the vertical reset input line 61 is connected to a power supply Vrst. At the time of reset, an arbitrary input voltage signal is applied to the floating diffusion region 121 of the reference pixel 100R selected through the vertical reset input line 61, that is, to an input terminal of the amplification transistor 114.

That is, the pixel readout circuits in FIGS. 26 and 27 have similar configurations to the differential pixel readout circuit (for example, the differential pixel readout circuit 50 in FIG. 8) according to the above-described first embodiment, and can not only suppress out of a readable range of a reset level due to reset feedthrough but also control an FD potential of the readout pixel 100S at the time of reset to a desired value while realizing high conversion efficiency by the differential amplification readout (Configuration of SF Mode)

Figure 28:
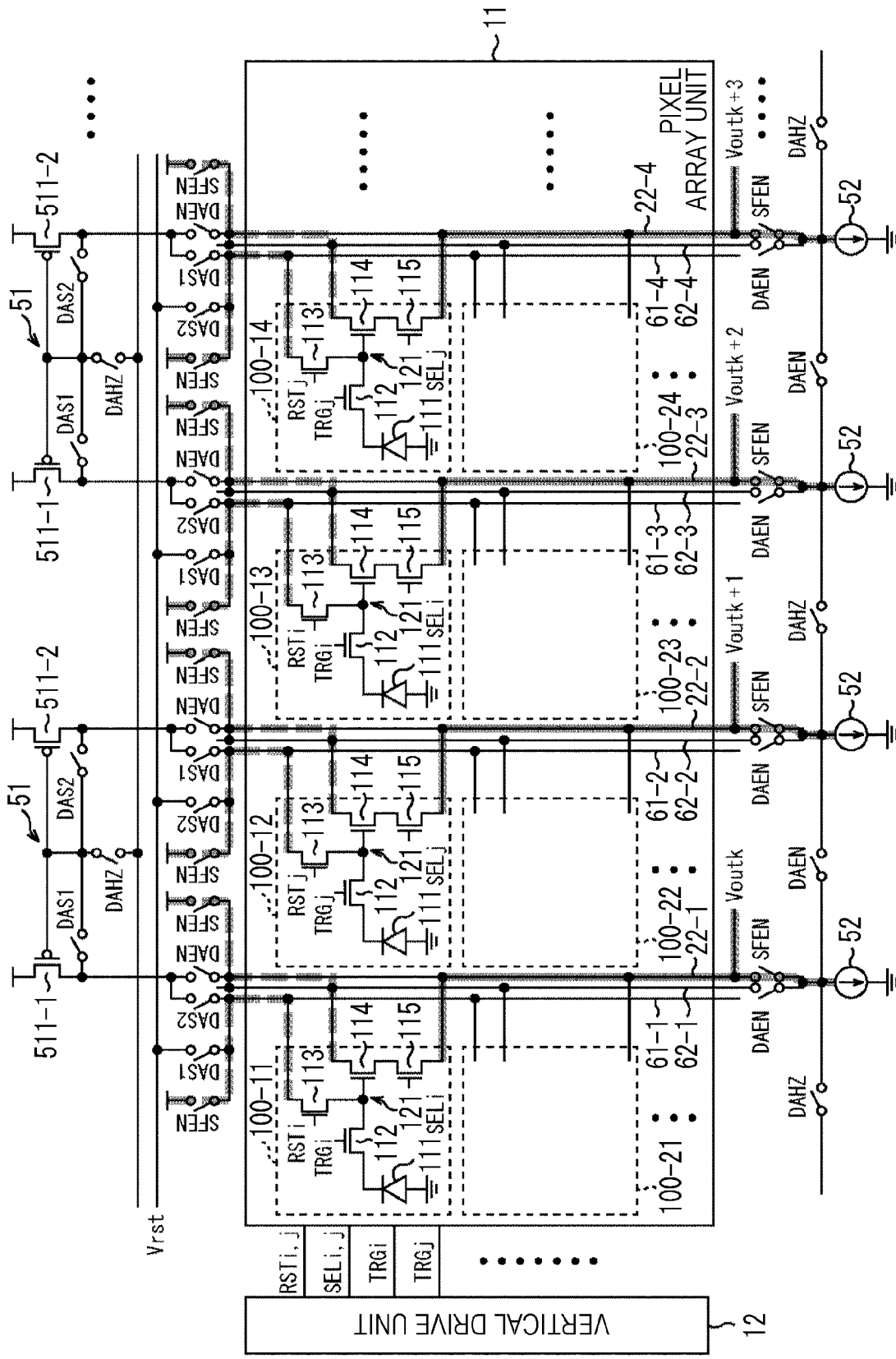
FIG. 28 is a circuit diagram illustrating a configuration example of the pixel readout circuit in an SF mode.

FIG. 28 is a circuit diagram illustrating a configuration example of the pixel readout circuit in an SF mode.

FIG. 28 illustrates an example of a configuration of pixels arranged in the pixel array unit 11 switched to the SF mode by turning on the switch SFEN and turning off the switches DAEN, DAS1, and DAS2, as a pixel readout circuit.

In the pixel readout circuit in FIG. 28, when the switch SFEN is turned on and the switches DAEN, DAS1, and DAS2 are turned off, source-follower readout is independently performed for all the pixels arranged in the pixel array unit 11, that is, for the pixels 100-11 to 100-14, for example.

Note that, in the pixel readout circuit in FIG. 28, lateral connection like the case of the differential mode is not performed where the upper and lower switches DAHZ are turned off.

(Drive Example in Differential Mode)

Here, an example of driving pixels switched to the differential mode illustrated in FIGS. 26 and 27 will be described with reference to the timing chart in FIG. 29.

Figure 29:
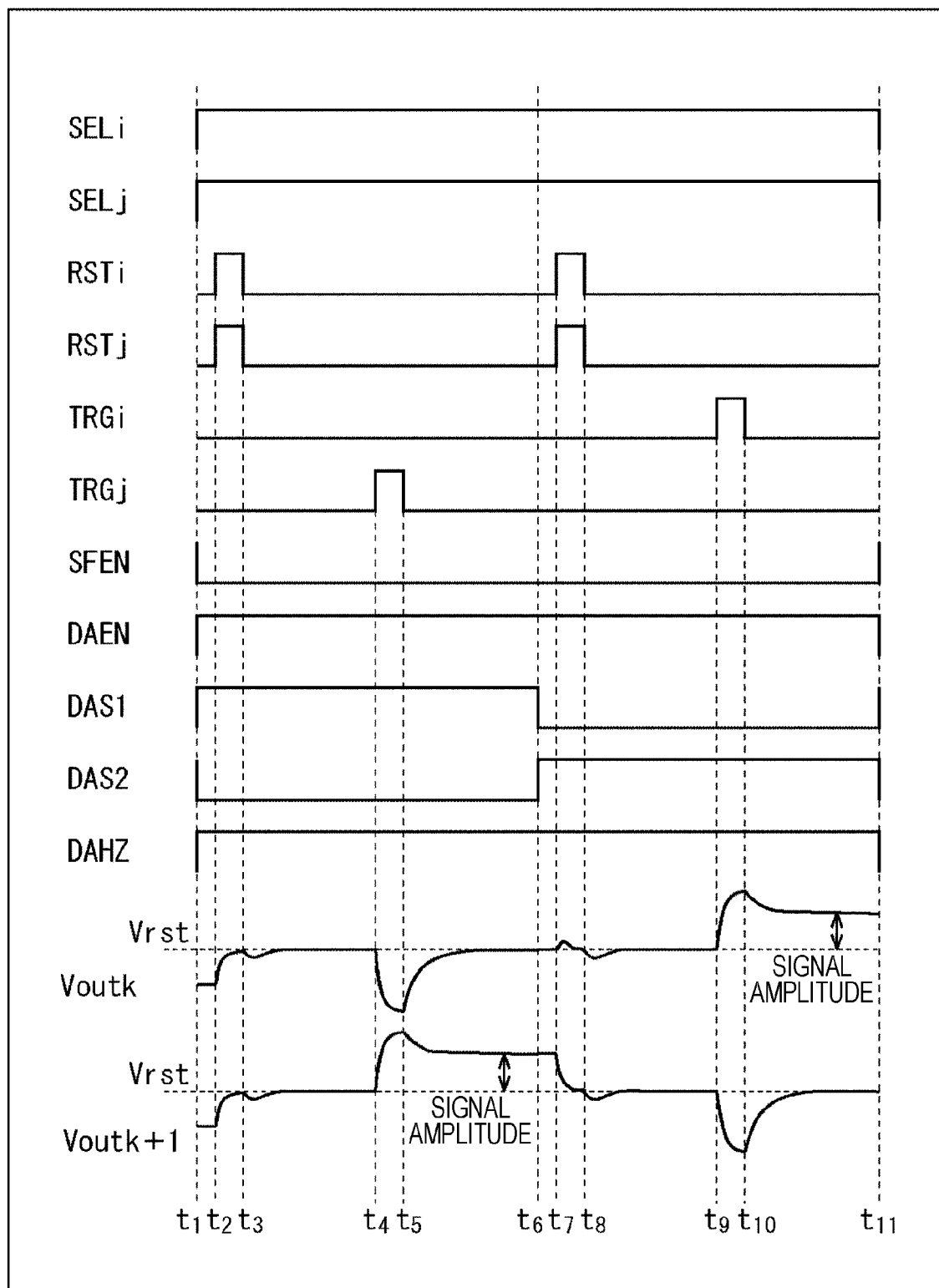
FIG. 29 is a timing chart illustrating an example of driving pixels switched to the differential mode.

Note that the upper part in FIG. 29 illustrates timing charts of drive signals SELi, RSTi, and TRGi and the drive signals SELj, RSTj, and TRGj respectively applied to the gates of the selection transistors 115, the reset transistors 113, and the transfer transistors 112 in the pixels 100-11 and 100-12.

Furthermore, the middle part in FIG. 29 illustrates timing charts of the switches SFEN, DAEN, DAS1, DAS2, and DAEN, illustrating on/off timing of SFEN, DAEN, DAS1, DAS2, and DAHZ. Moreover, the lower part in FIG. 29 illustrates timing charts of voltage waveforms of output terminals Voutk and Voutk+1. Note that the direction of time goes from the left side to the right side in FIG. 29.

Note that, in the timing charts in FIG. 29, the operations in the period from time t1 to time t5 of the timing charts in FIGS. 18 and 23 are omitted. However, in reality, operations similar to the operations in the period from time t1 to time t5 are performed.

In the period from time t1 to time t11, when the drive signals SELi and SELj are switched to the H level in the pixels 100-11 and 100-12, the current is supplied from the load MOS circuits 52 from the sources to the drains of the amplification transistors 114 of the pixels 100-11 and 100-12.

Moreover, in the period from time t1 to time t6, when the switches DAEN and DAS1 are turned on, the selected pixels 100-11 and 100-12 and the current mirror circuit 51 become equivalent to a differential pixel readout circuit having the pixel 100-12 as the readout pixel 100S and the pixel 100-11 as the reference pixel 100R.

As a result, the FD potential difference between the floating diffusion regions 121 of the selected pixels 100-11 and 100-12 is amplified as an input voltage signal and the amplified input voltage signal is output to the vertical signal line 22.

Next, in the period from time t2 to time t3, when the H-level pulses are applied as the drive signal RSTi and the drive signal RSTj, the charges accumulated in the floating diffusion regions 121 are discharged and the signal levels are initialized (reset) in the pixels 100-11 and 100-12.

This reset state continues until time t4, and during the state, the voltage as the reset level of the pixel 100-12 is read.

In the period from time t4 to time t5, when the H-level pulse is applied as the drive signal TRGj, the charge accumulated in the photoelectric conversion unit 111 is transferred to the floating diffusion region 121 by the transfer transistor 112 in the pixel 100-12.

Then, in the pixel 100-12, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until the switch DAS1 is turned off at time t6, and during the state, the voltage as the signal level of the pixel 100-12 is read (the voltage waveform of Voutk+1 in FIG. 29).

Next, in the period from time t6 to time t11, when the switch DAS2 is turned on and the switches DAEN and DAS2 are turned on, instead of the switch DAS1 being turned off, the selected pixels 100-11 and 100-12 and the current mirror circuit 51 become equivalent to a differential pixel readout circuit having the pixel 100-12 as the reference pixel 100R and the pixel 100-11 as the readout pixel 100S.

As a result, the FD potential difference between the floating diffusion regions 121 of the selected pixels 100-11 and 100-12 is amplified as an input voltage signal and the amplified input voltage signal is output to the vertical signal line 22.

Next, in the period from time t7 to time t8, when the H-level pulses are applied as the drive signal RSTi and the drive signal RSTj, the charges accumulated in the floating diffusion regions 121 are discharged and the signal levels are initialized (reset) in the pixels 100-11 and 100-12.

This reset state continues until time t9, and during the state, the voltage as the reset level of the pixel 100-11 is read.

In the period from time t9 to time t10, when the H-level pulse is applied as the drive signal TRGi, the charge accumulated in the photoelectric conversion unit 111 is transferred to the floating diffusion region 121 by the transfer transistor 112 in the pixel 100-11.

Then, in the pixel 100-12, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until the switch DAS2 is turned off at time t11, and during the state, the voltage as the signal level of the pixel 100-12 is read (the voltage waveform of Voutk in FIG. 29).

Here, in the period from time t1 to time t11, the switch DAHZ is always on, the bias voltages of the current mirror circuits 51 each including the pair of PMOS transistors 511 are laterally connected, and moreover, the constant current source nodes by the load MOS circuits 52 each including an NMOS transistor and the like are laterally connected. Therefore, the noise generated at the laterally connected nodes is suppressed according to the number of lateral connections.

Note that the column signal processing unit 14 (FIG. 6) performs, for each of the pixels 100-11 and 100-12, correlated double sampling processing of removing noise by taking a difference between the reset level and the signal level read as described above, and reads the pixel signal from which noise has been removed.

By turning off the switch SFEN and turning on the switch DAEN, as described above, the readout mode is switched to the differential mode, and the differential amplification readout is performed. Furthermore, by exclusively switching on/off of the switch DAS1 and the switch DAS2, readout while alternately switching the readout pixel 100S and the reference pixel 100R becomes possible.

Furthermore, when the switch DAHZ is turned on, the bias voltages of the current mirror circuits 51 each including the pair of PMOS transistors 511 are laterally connected, and the constant current source nodes serving as a common voltage of the pixel pair (differential pair) of the readout pixel 100S and the reference pixel 100R are laterally connected, whereby the noise generated at the laterally connected nodes can be suppressed according to the number of lateral connections.

(Drive Example in SF Mode)

Next, an example of driving pixels switched to the SF mode illustrated in FIG. 28 will be described with reference to the timing chart in FIG. 30.

Figure 30:
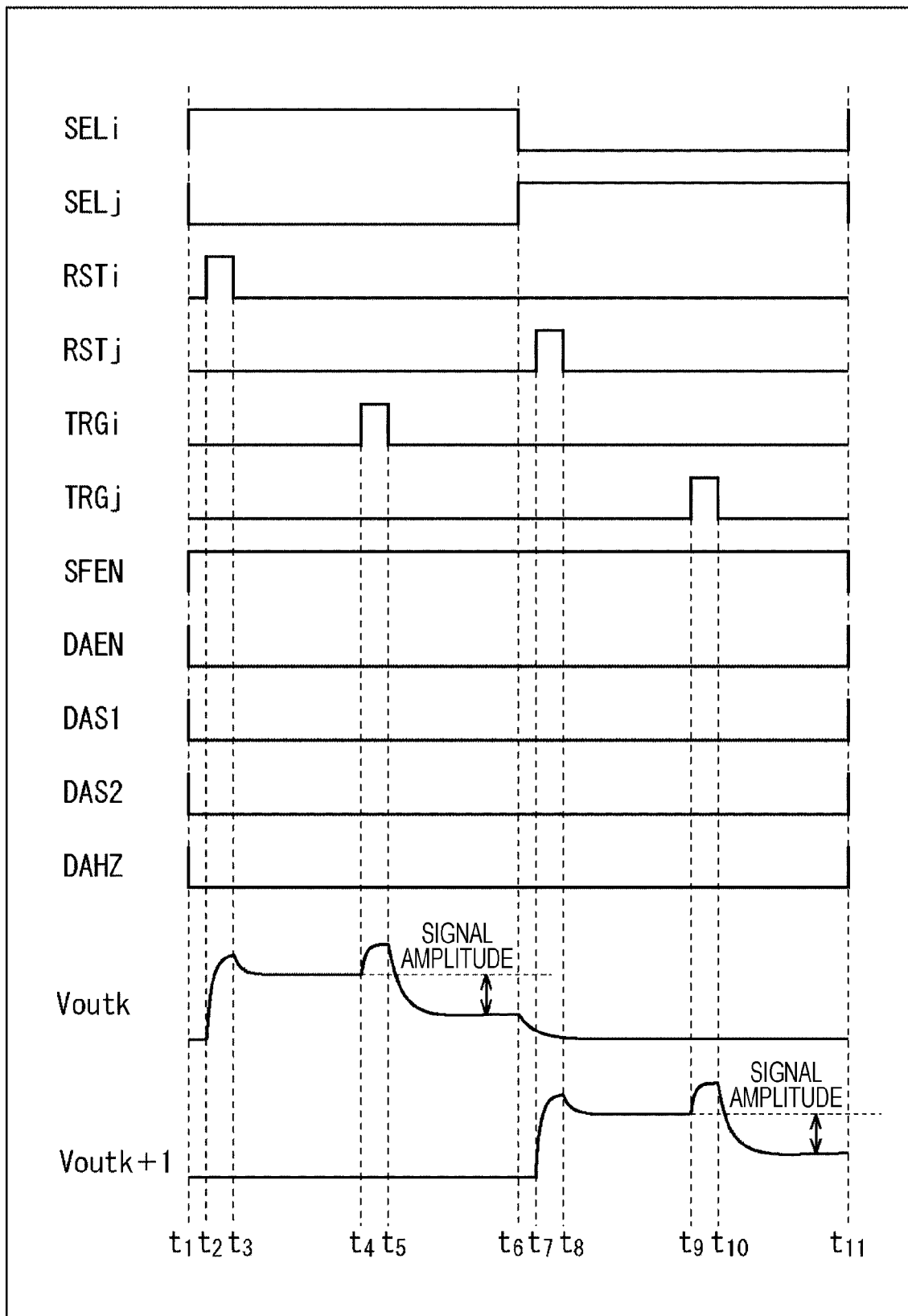
FIG. 30 is a timing chart illustrating an example of driving pixels switched to the SF mode.

Note that in FIG. 30, the timing charts of the Drive signals SELi, RSTi, and TRGi, the Drive signals SELj, RSTj, and TRGj, the switches SFEN, DAEN, DAS1, DAS2, and DAHZ, and the output waveforms of the output terminals Voutk, Voutk+1 correspond to the timing charts illustrated in FIG. 29.

In the period from time t1 to time t6, when the drive signal SELi is switched to the H level, the current is supplied from the load MOS circuit 52 from the source to the drain of the amplification transistor 114 of the pixel 100-11.

Note that, in the period from time t1 to time t6, when the switch SFFN is turned on and the switches DAEN, DAS1, and DAS2 are turned off, the readout circuit of the selected pixel 100-11 becomes equivalent to a source-follower readout circuit. As a result, the FD potential of the floating diffusion region 121 is amplified as an input voltage signal and the amplified input voltage signal is output to the vertical signal line 22 in the selected pixel 100-11.

In the period from time t2 to time t3, when the H-level H-level pulse is applied as the drive signal RSTi, the charge accumulated in the floating diffusion region 121 is discharged and the signal level is initialized (reset) in the pixel 100-11.

This reset state continues until time t4, and during the state, the voltage as the reset level of the pixel 100-11 is read.

In the period from time t4 to time t5, when the H-level pulse is applied as the drive signal TRGi, the charge accumulated in the photoelectric conversion unit 111 is transferred to the floating diffusion region 121 by the transfer transistor 112 in the pixel 100-11.

Then, in the pixel 100-11, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until time t6, and during the state, the voltage as the signal level of the pixel 100-11 is read (the voltage waveform of Voutk in FIG. 30).

Next, in the period from time t6 to time t11, when the drive signal SELi is switched to the L level and the drive signal SELj is further switched to the H level, the current is supplied from the load MOS circuit 52 from the source to the drain of the amplification transistor 114 of the pixel 100-12.

Note that, in the period from time t6 to time t11, the state where the switch SFFN is on and the switches DAEN, DAS1, and DAS2 are off continues, similarly to the period from time t1 to t6. Therefore, the readout circuit of the selected pixel 100-12 becomes equivalent to the source-follower readout circuit.

Next, in the period from time t7 to time t8, when the H-level pulse is applied as the drive signal RSTj, the charge accumulated in the floating diffusion region 121 is discharged and the signal level is initialized (reset) in the pixel 100-12.

This reset state continues until time t9, and during the state, the voltage as the reset level of the pixel 100-12 is read.

In the period from time t9 to time t10, when the H-level pulse is applied as the drive signal TRGj, the charge accumulated in the photoelectric conversion unit 111 is transferred to the floating diffusion region 121 by the transfer transistor 112 in the pixel 100-12.

Then, in the pixel 100-12, the floating diffusion region 121 is modulated by the transferred charge, and when the charge is input to the gate of the amplification transistor 114 as the voltage signal, the voltage signal according to the accumulated charge amount is output to the vertical signal line 22.

This signal readout state continues until time t11, and during the state, the voltage as the signal level of the pixel 100-12 is read (the voltage waveform of Voutk+1 in FIG. 30).

Note that, in the case of driving in the SF mode, in the period from time t1 to time t11 in FIG. 30, the switch DAHZ is off. Therefore, no lateral connection is performed for the bias voltage of the current mirror circuit 51 and the constant current source node by the load MOS circuit 52.

Furthermore, the column signal processing unit 14 (FIG. 6) performs, for each of the pixels 100-11 and 100-12, correlated double sampling processing of removing noise by taking a difference between the reset level and the signal level read as described above, and reads the pixel signal from which noise has been removed.

(Another Configuration of Differential Mode)

Figure 31:
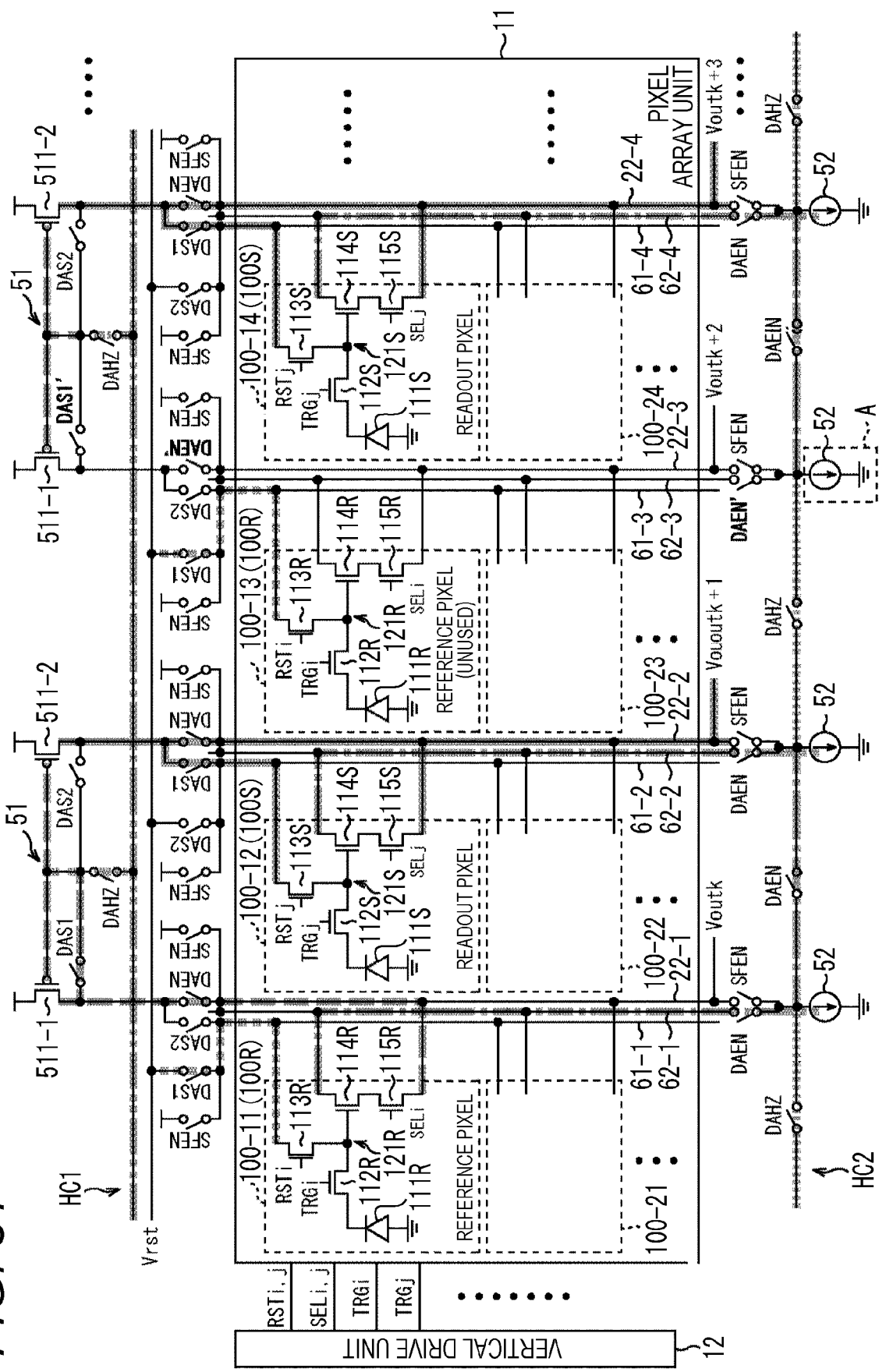
FIG. 31 is a circuit diagram illustrating a configuration in a case where the numbers of readout pixels and reference pixels are different in the differential mode.

FIG. 31 is a circuit diagram illustrating a configuration in a case where the numbers of readout pixels and reference pixels are different in the differential mode.

In the differential mode configurations illustrated in FIGS. 26 and 27, the numbers of the readout pixels 100S and the reference pixels 100R are in a 1:1 relationship. Here, in the case of laterally connecting the reference pixels 100R, the number of reference pixels 100R is not necessarily the same as the number of readout pixels 100S.

For example, in FIG. 31, the odd-column pixels such as the pixel 100-11 and the pixel 100-13 are the reference pixels 100R. Here, the reference pixel 100-13 is made unused, so that the number of reference pixels 100R becomes different from the number of readout pixels 100S.

To achieve such a configuration, for example, the following control is performed. That is, in the configuration in FIG. 31, when the switches DAEN and DAS1 for the pixels 100 other than the reference pixel 100-13 are on, the switches DAEN' and DAS1' for the reference pixel 100-13 are turned off, where the switches DAEN and DAS1 for the reference pixel 100-13, of the switches DAEN and DAS1, are represented as switches DAEN' and DAS1', so that the reference pixel 100-13 becomes unused and can be disconnected from lateral connection.

Note that, in FIG. 31, the number of switches DAEN' for the reference pixel 100-13 is two and the number of switches DAS1' for the reference pixel 100-13 is one. Furthermore, when the reference pixel 100-13 is made unused, the load MOS circuit 52 for the reference pixel 100-13 (the load MOS circuit 52 in the dotted frame A in FIG. 31) is turned off.

As described above, by making some of the reference pixels 100R unused, the number of reference pixels 100R can be reduced by disconnecting some of the laterally connected reference pixels 100R. At this time, the number of load MOS circuits 52 can be turned off by the number of unused reference pixels 100R, and the power consumption can be reduced.

Furthermore, at this time, since the noise reduction effect of the reference pixel 100R is $1/\sqrt{N}$ times the number N of the reference pixels 100R, the noise reduction effect is reduced. However, if a sufficient number of reference pixels 100R is connected, the noise of the reference pixels 100R is not dominant and the power reduction effect can be obtained.

(Effects Obtained with Configuration of Second Embodiment)

Next, effects obtained by adopting the lateral connection configuration as the second embodiment will be described with reference to FIG. 32.

In the second embodiment, the switch DAHZ is turned on, and the bias voltages of the current mirror circuits 51 and the constant current source nodes by the load MOS circuits 52 are laterally connected, thereby suppressing the noise generated at the laterally connected nodes according to the number of lateral connections. The reason therefor is as follows.

The structure of the second embodiment is capable of amplifying the voltage amplitude of the vertical signal line (VSL) 22 per electron and reducing the noise component generated on and after the vertical signal line 22 by input conversion (input conversion per signal electron) by the differential amplification readout while obtaining the effect of suppressing the increase in noise by the amplification transistor 114 of the differential pair.

Since the random noises generated in the amplification transistors 114 of the reference pixels 100R are uncorrelated to each other, the noises cancel each other and can be suppressed by connecting the laterally connected nodes.

This can also be said to be equivalent to using a large transistor by the number of amplification transistors 114 on the reference pixel 100R side, which are made common and connected, whereby the noise caused by the reference pixel 100R is suppressed.

Here, assuming that the number of connected reference pixels 100R is Npix_ref, the noise caused by the reference pixels 100R is suppressed to $1/\sqrt{\text{Npix\_ref}}$ times.

For example, in the case where 1920×1080 pixels are arranged in the pixel array unit 11, and in the case where signal pixels are read from columns in parallel, and there are reference pixels 100R that make a pair in each column, $1/\sqrt{1920} \approx 0.02$ is obtained, and Vn_pix becomes 21.02 in the above-described expression (7). The double coefficient is 1.02.

At this time, since the noise is $1/\sqrt{(1.02 \times \text{Vn\_pix}2n\_\text{pix}}$ is satisfied)≈1.01×V, the effect can be suppressed to 1% or less, and moreover, since the noise is the root mean square of Vn_adc and Vn_afe, the influence of the reference pixels 100R becomes an ignorable level.

Figure 32:
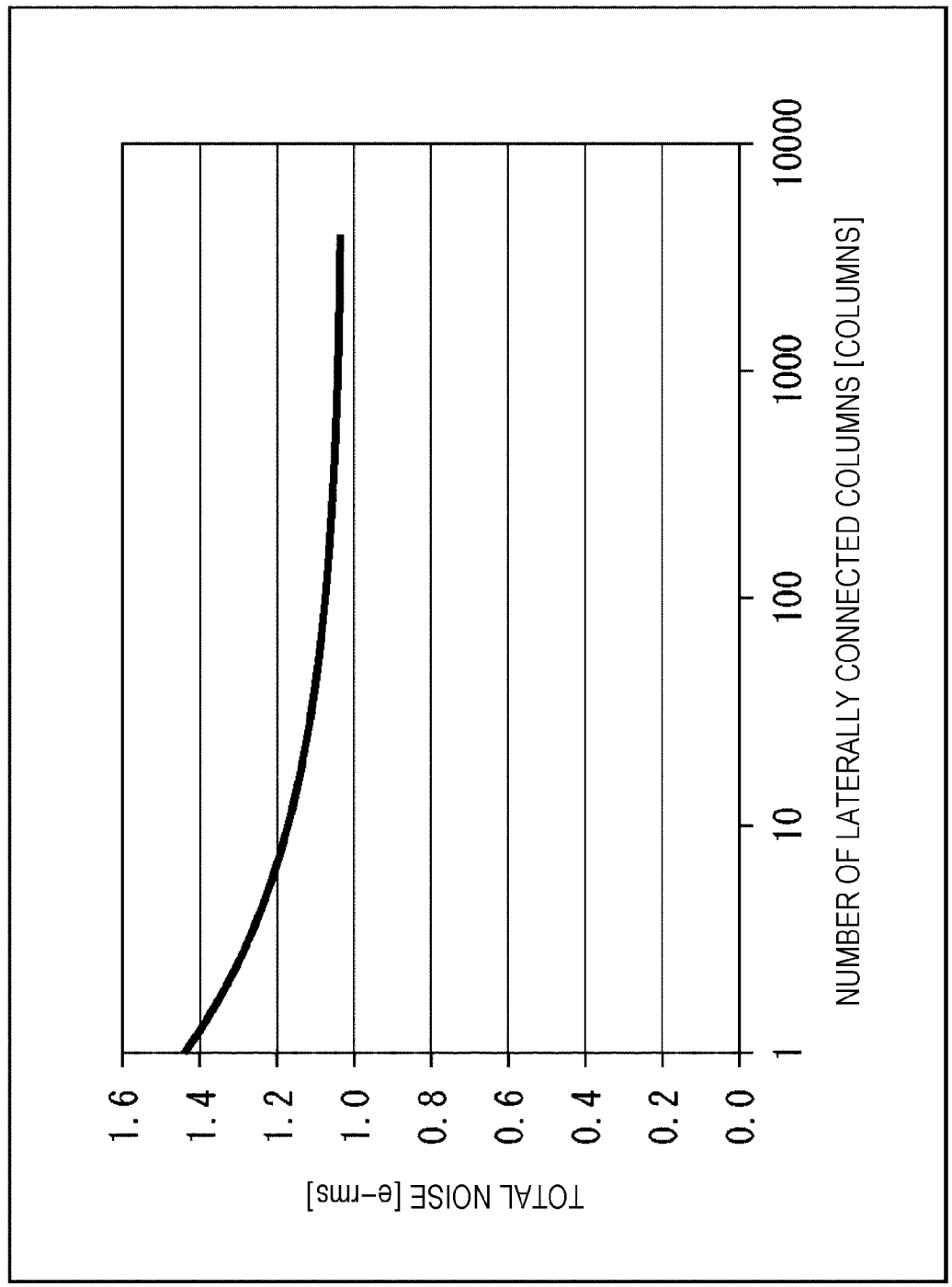
FIG. 32 is a diagram for describing an effect obtained by adopting the second embodiment.

FIG. 32 illustrates a relationship between the number of connected reference pixels 100R and the total noise Vn_total, where the sum of Vn_adc and Vn_afe is 100 (μVrms), Vn_pix is 100 (μVrms), ηfd is 100 (μV/e−), and ηvsl is 400 (μV/e−), in the case where the vertical axis represents the total noise (e-rms) and the horizontal axis represents the number of laterally connected columns (columns). It is clear that the noise suppression effect becomes larger as the number of connected reference pixels 100R is larger from the relationship illustrated in FIG. 32.

The second embodiment has been described above.

5. Third Embodiment

In the above-described first embodiment, the CMOS image sensor 10 has moved the row of the reference pixel as the readout row to be read moves and has always used a pixel near the readout pixel as the reference pixel. Pixels in an effective region have characteristic variations due to dimensional variations in manufacturing, for example. However, an effect of eliminating, for example, characteristic variations in conversion efficiency or the like and an in-plane difference due to the topology of the effective pixel region can be obtained by always using a pixel near a readout pixel as the reference pixel. In the third embodiment, a specific example of a positional relationship between a readout pixel and a reference pixel when a pixel near the readout pixel is used as the reference pixel will be illustrated.

Figure 33:
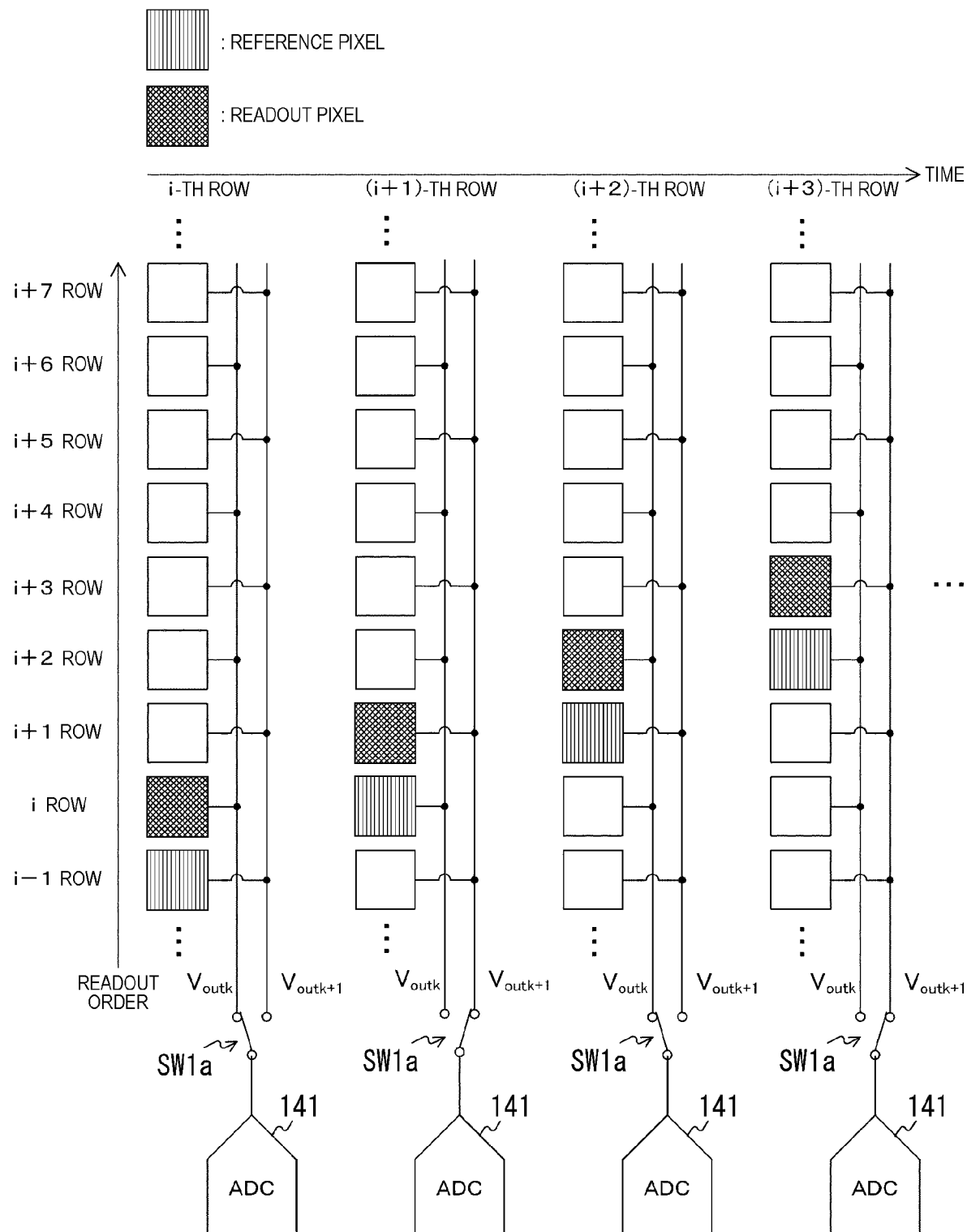
FIG. 33 is a diagram illustrating an example of a positional relationship between a readout pixel and a reference pixel in a differential mode according to a third embodiment of the present technology.

FIG. 33 is a diagram illustrating an example of a positional relationship between a readout pixel and a reference pixel in a differential mode according to the third embodiment of the present technology. FIG. 33 illustrates an access order in units of readout row time per column of pixels. FIG. 33 illustrates a case where the reference pixel is in the effective pixel region of the same column as the readout pixel illustrated in FIG. 11. Furthermore, in FIG. 33, one switch SW1a of two inputs and one output corresponds to the switches SW1 and SW2 illustrated in FIG. 16. Furthermore, a column signal processing unit 14 is provided with an ADC 141 for each column.

The readout pixel is located at a row address one row before the reference pixel, and the reference pixel is accessed to maintain a relative positional relationship between the readout pixel and the reference pixel with rolling readout of the readout pixel. In this example, a pixel for which readout has been completed at one-row previous timing is selected as the reference pixel. The access to a pixel is controlled by a system control unit 16, and a drive signal is transmitted by a vertical drive unit 12.

Hereinafter, a row including effective pixels is referred to as an "effective pixel row". Furthermore, a row including readout pixels is referred to as a "readout row", and a row including reference pixels is referred to as a "reference row". The vertical drive unit 12 sequentially selects an effective pixel row as a readout row and selects a row adjacent to the readout row as a reference row. A signal obtained by amplifying a difference between the readout row and the reference row is read by a column readout circuit unit 13.

Figure 34:
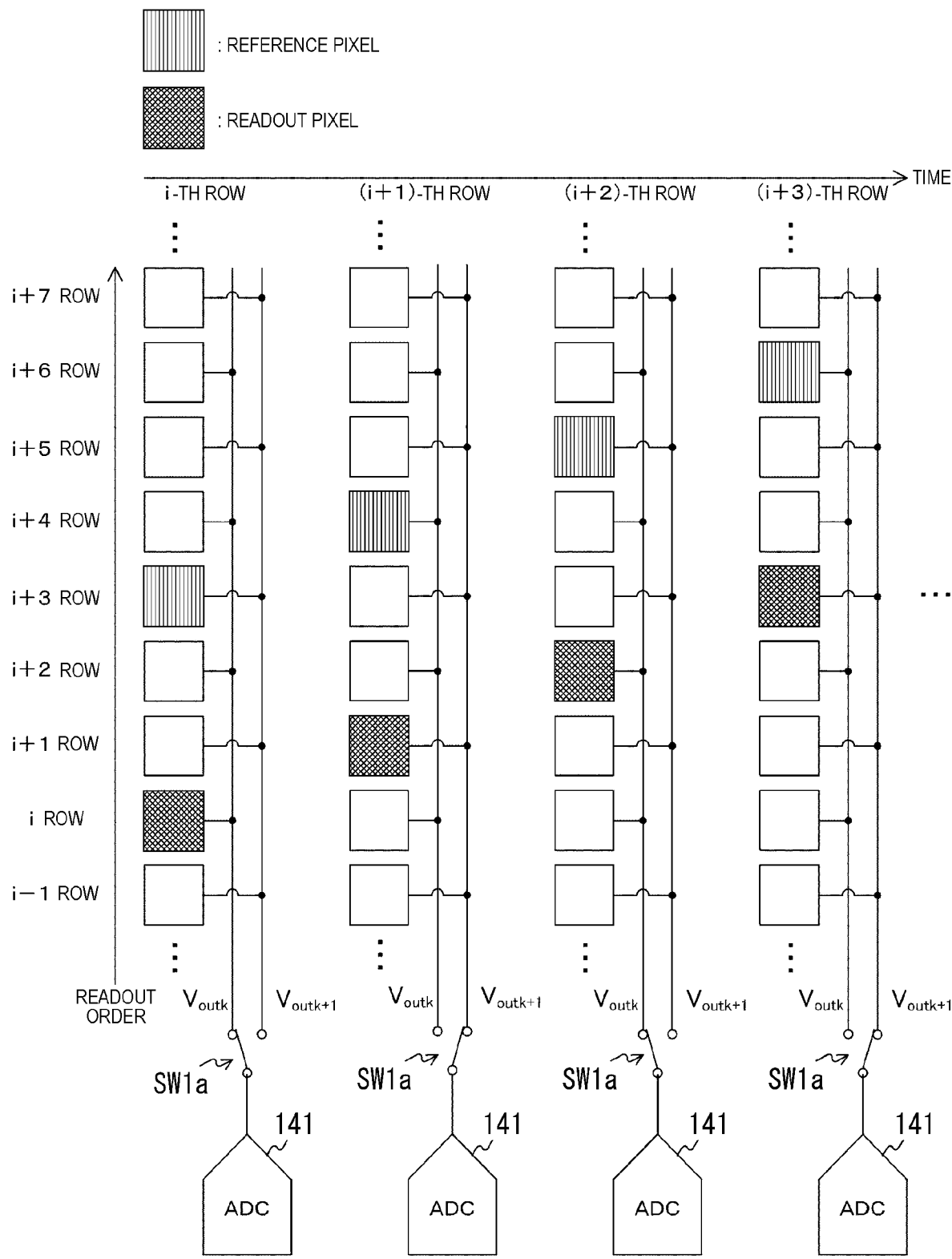
FIG. 34 is a diagram illustrating an example of a positional relationship between the readout pixel and the reference pixel in a case where the readout pixel and the reference pixel are not adjacent to each other according to the third embodiment of the present technology.

FIG. 34 is a diagram illustrating an example of a positional relationship between the readout pixel and the reference pixel in a case where the readout pixel and the reference pixel are not adjacent to each other according to the third embodiment of the present technology. FIG. 34 illustrates an example in which the reference row is not adjacent to the readout row. When a pixel that does not share a vertical signal line with the readout pixel is used as the reference pixel, the readout pixel and the reference pixel do not need to be adjacent to each other, as illustrated in FIG. 34. Furthermore, a pixel for which readout has not been completed may be selected as the reference pixel, as illustrated in FIG. 34. The switch SW1a is controlled such that the vertical signal line for outputting the signal of the readout pixel is connected to the ADC 141.

Figure 35:
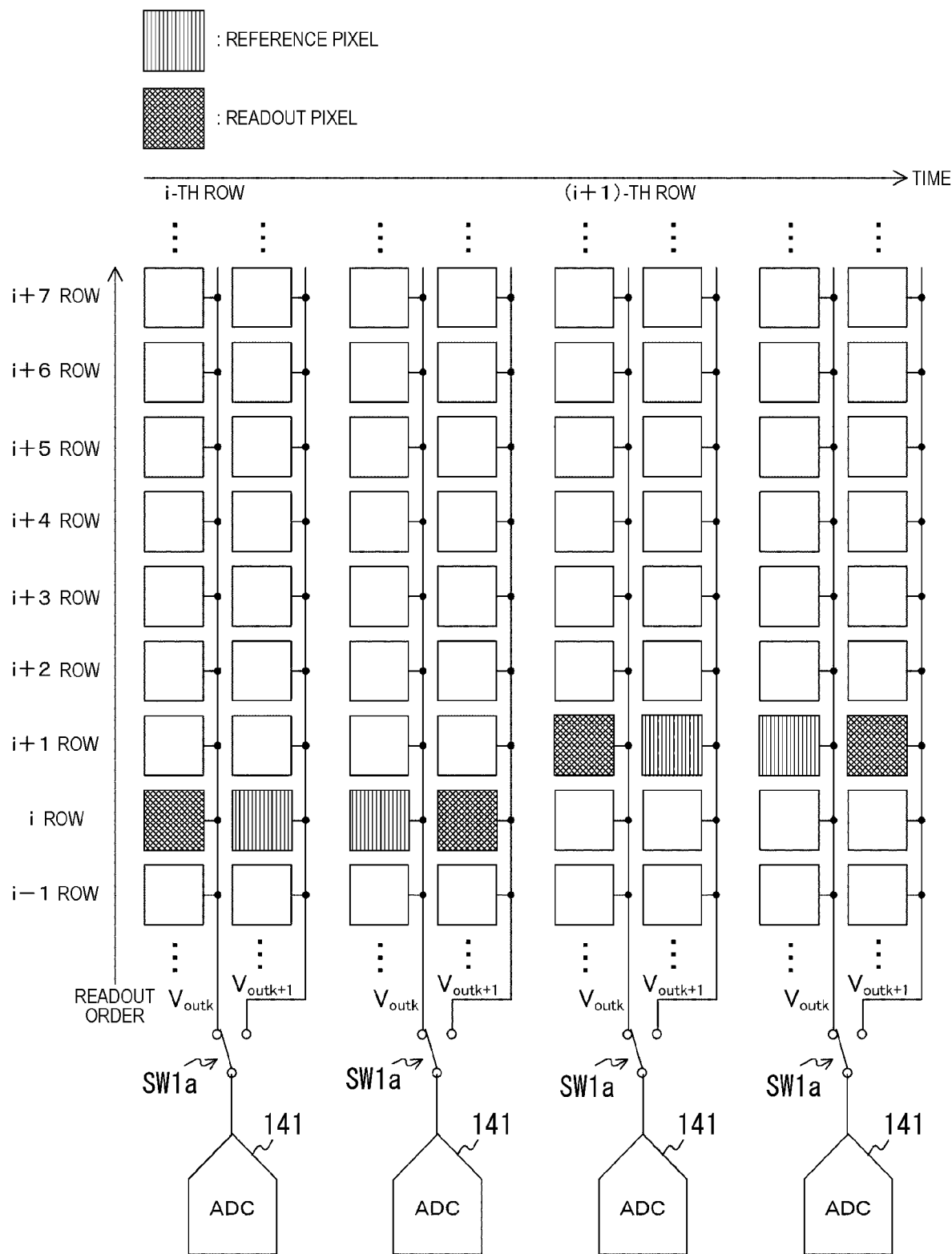
FIG. 35 is a diagram illustrating an example of a positional relationship between the readout pixel and the reference pixel in a case where the readout pixel and the reference pixel are adjacent to each other in a row direction according to the third embodiment of the present technology.

FIG. 35 is a diagram illustrating an example of a positional relationship between the readout pixel and the reference pixel in a case where the readout pixel and the reference pixel are adjacent to each other in a row direction according to the third embodiment of the present technology. FIG. 35 illustrates an access order in units of readout row time per two columns of pixels. FIG. 35 illustrates a case where the reference pixel is located at an adjacent position in a horizontal direction to the readout pixel, and the reference pixel illustrated in FIG. 10 is in the effective pixel region of the same row as the readout pixel. The vertical drive unit 12 performs the readout access while maintaining the same row while interchanging the readout pixel and the reference pixel.

For example, in a case of reading the i-th row, the vertical drive unit 12 selects an odd column in the i-th row as the readout pixel and selects an even column in the i-th row as the reference pixel. Then, the column readout circuit unit 13 reads the odd column in the i-th row by the differential amplification circuit. Next, the vertical drive unit 12 selects the even column in the i-th row as the readout pixel and selects the odd column in the i-th row as the reference pixel. That is, the vertical drive unit 12 interchanges the readout pixel and the reference pixel in the row. Then, the column readout circuit unit 13 reads the odd column in the i-th row by the differential amplification circuit. Next, when a horizontal synchronization period that is a period of a horizontal synchronization signal elapses, the vertical drive unit 12 selects an odd column in the (i+1)-th row as the readout pixel and selects an even column in the raw as the reference pixel. Hereinafter, similar control is repeated.

Here, it is assumed that a frequency of the horizontal synchronization signal is higher than that of the vertical synchronization signal. The vertical synchronization signal is a periodic signal indicating timing to read one frame, and the horizontal synchronization signal is a periodic signal indicating timing to read a row in a frame.

Figure 36:
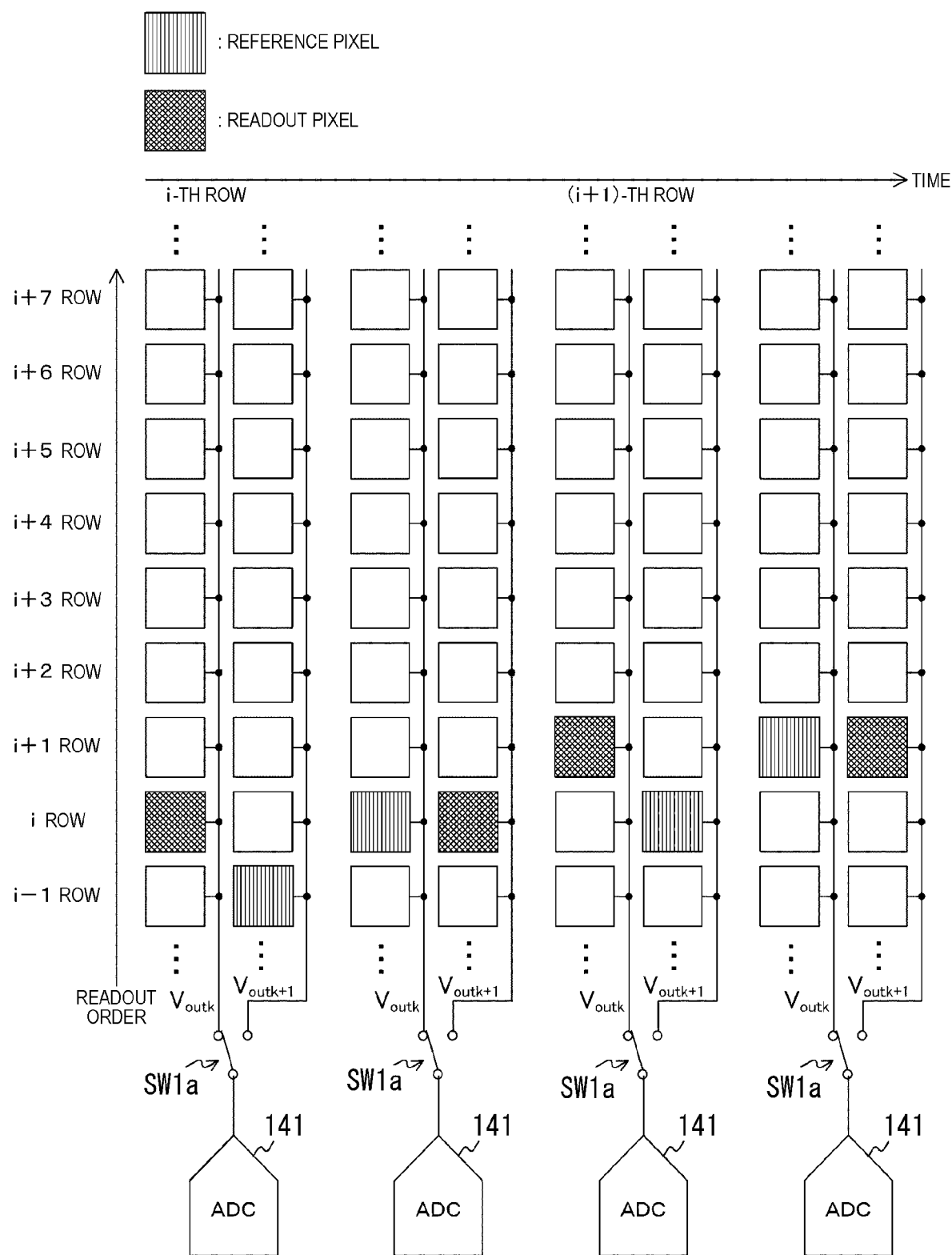
FIG. 36 is a diagram illustrating a different example of the positional relationship between the readout pixel and the reference pixel according to the third embodiment of the present technology.

FIG. 36 is a diagram illustrating a different example of the positional relationship between the readout pixel and the reference pixel according to the third embodiment of the present technology. In FIG. 36, a case where the reference pixel is located at a horizontal adjacent position to the readout pixel, and a case where the reference pixel is located at a diagonal adjacent position in to the readout pixel are mixed. FIG. 36 illustrates the case where the reference pixel is in the effective pixel region of the same row as the readout pixel illustrated in FIG. 10 and the case where the reference pixel is in the effective pixel region in a different row and a different column from the readout pixel illustrated in FIG. 12. The readout access is performed while maintaining that the reference pixel is a pixel for which readout has been completed in the previous row.

For example, in the case of reading the i-th row, the vertical drive unit 12 selects an odd column in the i-th row as the readout pixel and selects an even column (in other words, a pixel diagonally below) in the (i−1)-th row as the reference pixel. Then, the column readout circuit unit 13 reads the odd column in the i-th row by the differential amplification circuit. Next, the vertical drive unit 12 selects the even column in the i-th row as the readout pixel and selects the odd column in the row as the reference pixel. Then, the column readout circuit unit 13 reads even columns in the i-th row by the differential amplification circuit. Next, when the horizontal synchronization period elapses, the vertical drive unit 12 selects an odd column in the (i+1)-th row as the readout pixel and selects the even column in the i-th row as the reference pixel. Hereinafter, similar control is repeated.

As described above, according to the third embodiment of the present technology, the effective pixel is selected as the reference pixel, and the signal obtained by amplifying the difference between the respective potentials of the readout pixel and the reference pixel is read. Therefore, there is no need to arrange dummy pixels and light-shielding pixels.

6. Fourth Embodiment

In the above-described first embodiment, the floating diffusion region and the selection transistor have been arranged for each pixel. However, the larger the number of pixels, the circuit scale of the pixel array unit 11 increases. A CMOS image sensor 10 of a fourth embodiment is different from the first embodiment in that a plurality of adjacent pixels shares a floating diffusion region.

FIG. 37 is a diagram illustrating a configuration example of pixels according to the fourth embodiment of the present technology. a in FIG. 37 illustrates a circuit diagram illustrating a configuration example of a pixel block 230. b in FIG. 37 is a diagram illustrating the simplified pixel block 230.

In a pixel array unit 11, a plurality of the pixel blocks 230 is arrayed in a two-dimensional lattice manner. Pixels 210 and 220 are arrayed in the column direction for each of the pixel blocks 230.

The pixel 210 includes a photoelectric conversion unit 211, a transfer transistor 212, a reset transistor 213, a floating diffusion region 214, an amplification transistor 215, and a selection transistor 216. The pixel 220 includes a photoelectric conversion unit 221 and a transfer transistor 222.

The transfer transistor 212 transfers a charge from the photoelectric conversion unit 211 to the floating diffusion region 214 under control of a vertical drive unit 12. The transfer transistor 222 transfers a charge from the photoelectric conversion unit 221 to the floating diffusion region 214 under the control of the vertical drive unit 12.

The floating diffusion region 214 converts the transferred charge into a voltage signal. Note that the floating diffusion region 214 is an example of a charge-voltage conversion unit described in claims.

The reset transistor 213 resets the floating diffusion region 214 under the control of the vertical drive unit 12.

The selection transistor 216 outputs the voltage signal to a vertical signal line VSL under the control of the vertical drive unit 12.

As described above, the pair of adjacent pixels shares the floating diffusion region 214, the amplification transistor 215, and the selection transistor 216. Therefore, the row of the pixel block 230 sharing the floating diffusion region 214 (floating diffusion: FD) is hereinafter referred to as an "FD row".

Figure 38:
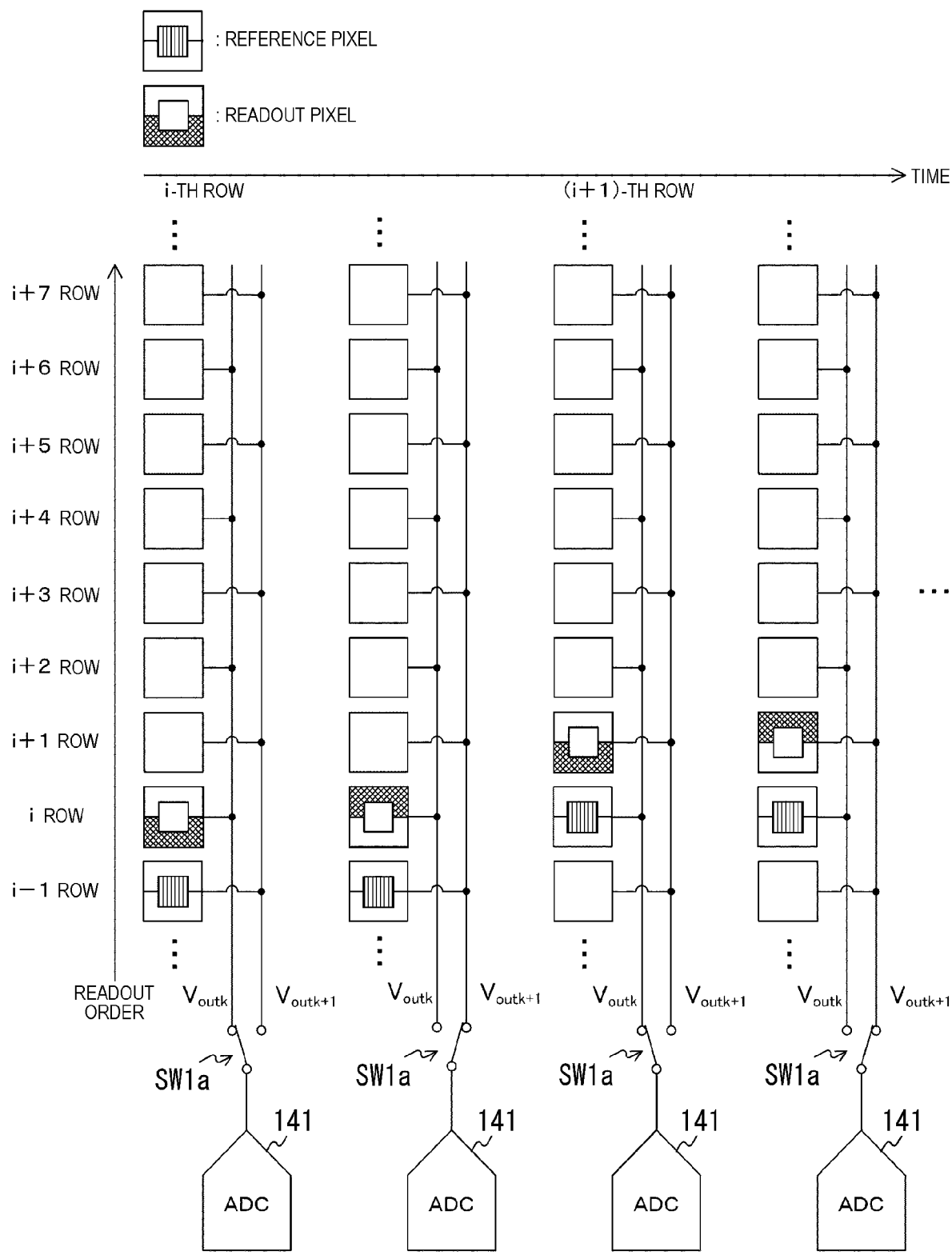
FIG. 38 is a diagram illustrating an example of a positional relationship between a readout pixel and a reference pixel in a differential mode according to the fourth embodiment of the present technology.

FIG. 38 is a diagram illustrating an example of a positional relationship between a readout pixel and a reference pixel in a differential mode according to the fourth embodiment of the present technology. FIG. 38 illustrates an example of FD two-pixel sharing structure. The readout pixel is in units of photodiode (PD) but the reference pixel does not open the transfer transistor and is unrelated to the PD, so illustrated in units of FD. FIG. 38 illustrates an access order in units of readout row time per column of pixels. The reference pixel is accessed while maintaining the relative positional relationship with the FD of the readout pixel.

For example, in a case of reading the i-th FD row, the vertical drive unit 12 selects one of a pair of effective pixel rows in the i-th row as the readout row and selects both of a pair of effective pixel rows in the (i−1)-th FD row as the reference rows. Then, a column readout circuit unit 13 reads the readout row by a differential amplification circuit. Next, when a horizontal synchronization period elapses, the vertical drive unit 12 selects the other pixel of the pair of effective pixel rows in the i-th FD row as the readout row, and selects both of the pair of effective pixel rows in the (i−1)-th FD row of the pixel block 230 as the reference rows. Then, the column readout circuit unit 13 reads the readout row by the differential amplification circuit. Next, when the horizontal synchronization period elapses, the vertical drive unit 12 selects one of a pair of effective pixel rows in the (i+1)-th FD row as the readout row, and selects both of the pair of effective pixel rows in the i-th FD row as the reference rows. Hereinafter, similar control is repeated.

As described above, according to the fourth embodiment of the present technology, the vertical drive unit 12 has a pair of pixels sharing the floating diffusion region and sequentially reads the voltage signal from the pair of pixels. Therefore, the circuit scale of the pixel array unit 11 can be reduced as compared with the case of not sharing the floating diffusion region.

7. Fifth Embodiment

In the above-described fourth embodiment, one effective pixel row has been read at a time. However, the larger the number of rows, the longer the time to complete the readout of one frame. A CMOS image sensor 10 of a fifth embodiment is different from the fourth embodiment in reading two rows at a time.

Figure 39:
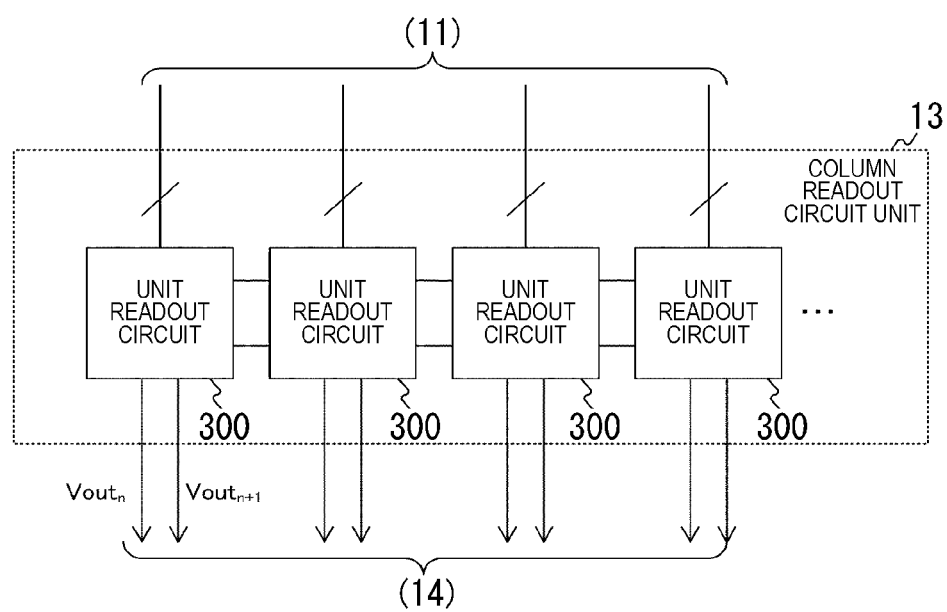
FIG. 39 is a block diagram illustrating a configuration example of a column readout circuit unit according to a fifth embodiment of the present technology.

FIG. 39 is a block diagram illustrating a configuration example of a column readout circuit unit 13 according to the fifth embodiment of the present technology. In the column readout circuit unit 13 of the fifth embodiment, a unit readout circuit 300 is arranged for each column.

Figure 40:
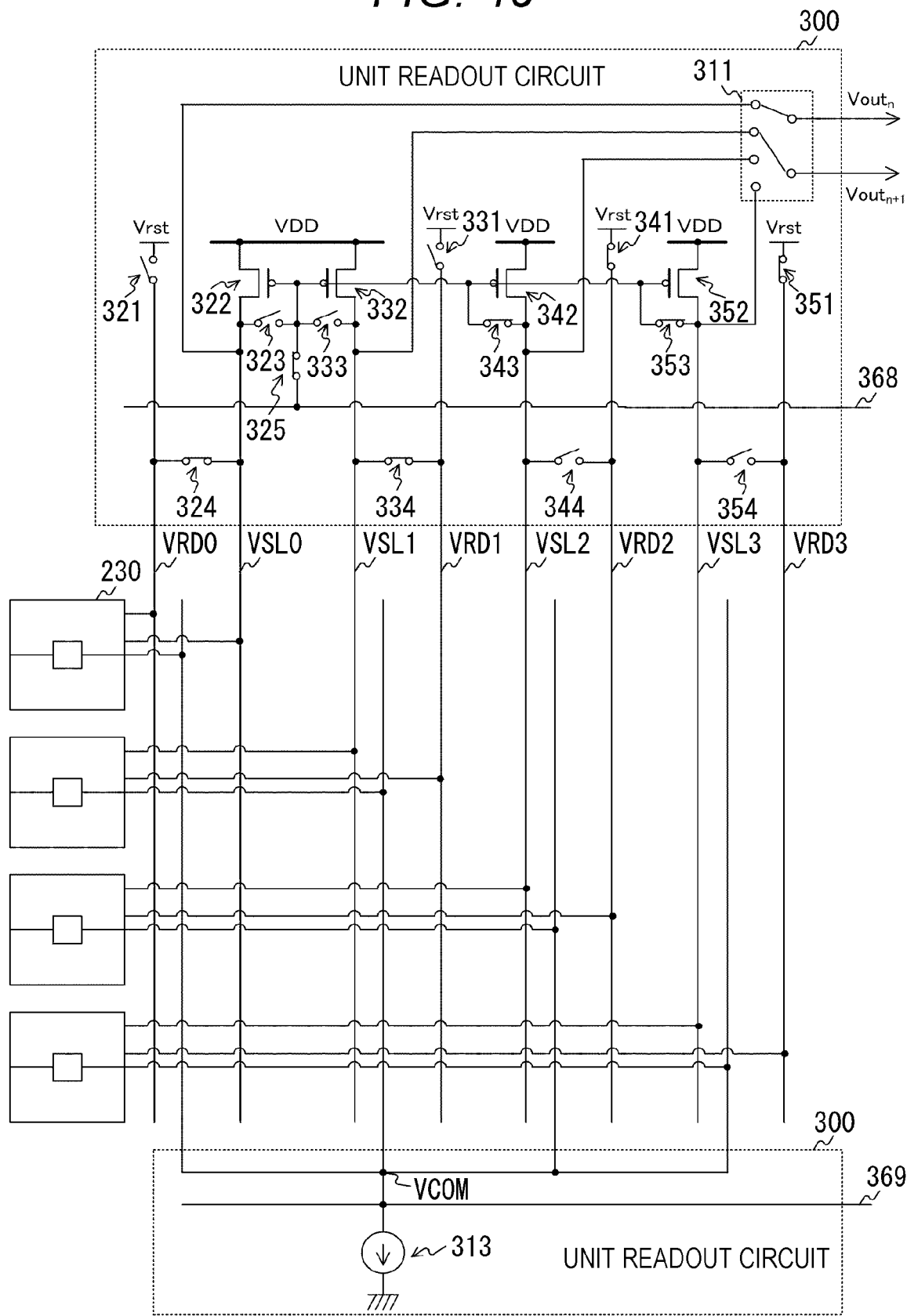
FIG. 40 is a circuit diagram illustrating a configuration example of a unit readout circuit according to the fifth embodiment of the present technology.

FIG. 40 is a circuit diagram illustrating a configuration example of the unit readout circuit 300 according to the fifth embodiment of the present technology. The unit readout circuit 300 includes a multiplexer 311, switches 321, 331, 341, and 351, and PMOS transistors 322, 332, 342, and 352. Furthermore, the unit readout circuit 300 includes switches 323 to 325, switches 333 and 334, switches 343 and 344, switches 353 and 354, and a load MOS circuit 313.

Furthermore, in a pixel array unit 11, vertical reset input lines VRD0 to VRD3 and vertical signal lines VSL0 to VSL3 are wired.

A reset transistor 213 in the 4m-th (m is an integer) FD row is connected to the vertical reset input line VRD0, and a selection transistor 216 in the row is connected to the vertical signal line VSL0. Furthermore, a reset transistor 213 in the (4m+1)-th FD row is connected to the vertical reset input line VRD1, and a selection transistor 216 in the row is connected to the vertical signal line VSL1. Similarly, a reset transistor 213 in the (4m+2)-th FD row is connected to the vertical reset input line VRD2, and a selection transistor 216 in the row is connected to the vertical signal line VSL2. A reset transistor 213 in the (4m+3)-th FD row is connected to the vertical reset input line VRD3, and a selection transistor 216 in the row is connected to the vertical signal line VSL3. Furthermore, all the pixels in a column are connected to the load MOS circuit 313 via a connection point VCOM.

The multiplexer 311 connects two of the vertical signal lines VSL0 to VSL3 to output terminals $Vout_n$ and $Vout_{n+1}$ under the control of the vertical drive unit 12. Pixel signals are output to a column signal processing unit 14 via these output terminals.

The switch 321 connects the vertical reset input line VRD0 to a power supply Vrst under the control of the vertical drive unit 12. Similarly, the switches 331, 341, and 351 connect the vertical reset input lines VRD1, VRD2, and VRD3 to the power supply Vrst under the control of the vertical drive unit 12, respectively.

The PMOS transistors 322, 332, 342, and 352 are connected in parallel to a power supply VDD. Furthermore, gates of these transistors are connected. A drain of the PMOS transistor 322 is connected to the vertical signal line VSL0, and a drain of the PMOS transistor 332 is connected to the vertical signal line VSL1. A drain of the PMOS transistor 342 is connected to the vertical signal line VSL2, and a drain of the PMOS transistor 352 is connected to the vertical signal line VSL3.

The switch 323 short-circuits the gate and drain of the PMOS transistor 322 under the control of the vertical drive unit 12. Similarly, the switches 333, 343, and 353 short-circuit the respective gates and drains of the PMOS transistors 332, 342, and 352 under the control of the vertical drive unit 12.

The switch 324 connects the vertical reset input line VRD0 and the vertical signal line VSL0 under the control of the vertical drive unit 12. Similarly, the switches 334, 344, and 354 connect the vertical reset input lines VRD1, VRD2, and VRD3 and the vertical signal lines VSL1, VSL2, and VSL3 under the control of the vertical drive unit 12.

The switch 325 laterally connects bias voltages of current mirror circuits including the switch 321 and the like and the PMOS transistor 322 and the like in a horizontal connection via a horizontal signal line 368 under the control of the vertical drive unit 12.

Furthermore, source sides, drain sides, or both of the source sides and the drain sides of amplification transistors 215 of the pixel blocks 230 are connected (connected by wire) among columns.

The vertical drive unit 12 simultaneously selects a pair of adjacent effective pixel rows as the readout rows, and selects a pair of FD rows adjacent to the readout rows (in other words, two pairs of effective pixel rows) as the reference rows. The vertical drive unit 12 turns on a pair of switches corresponding to the reference rows among the switches 321, 331, 341, and 351 and turns off the rest. Furthermore, the vertical drive unit 12 turns on a pair of switches corresponding to the reference rows among the switches 323, 333, 343, and 353 and turns off the rest. The vertical drive unit 12 turns on a pair of switches corresponding to the readout rows among the switches 324, 334, 344, and 354, and turns off the rest. Furthermore, the vertical drive unit 12 turns on the switch 325 in a differential readout period.

Note that the column readout circuit unit 13 does not perform readout in an SF mode. However, a configuration of adding a switch and switching the SF mode and a differential mode can be adopted. In this case, as illustrated in FIGS. 19 and 20, a switch (SW27) for switching a connection destination of the vertical reset input line VRD0 or the like to the power supply VDD is added. Moreover, switches (SW23 and SW24) for switching the connection destination of the load MOS circuit 313 from the amplification transistor to the vertical signal line VSL0 or the like and switches (SW17 and SW22) for switching the connection destination of the amplification transistor to the power supply VDD are only required to be added.

Figure 41:
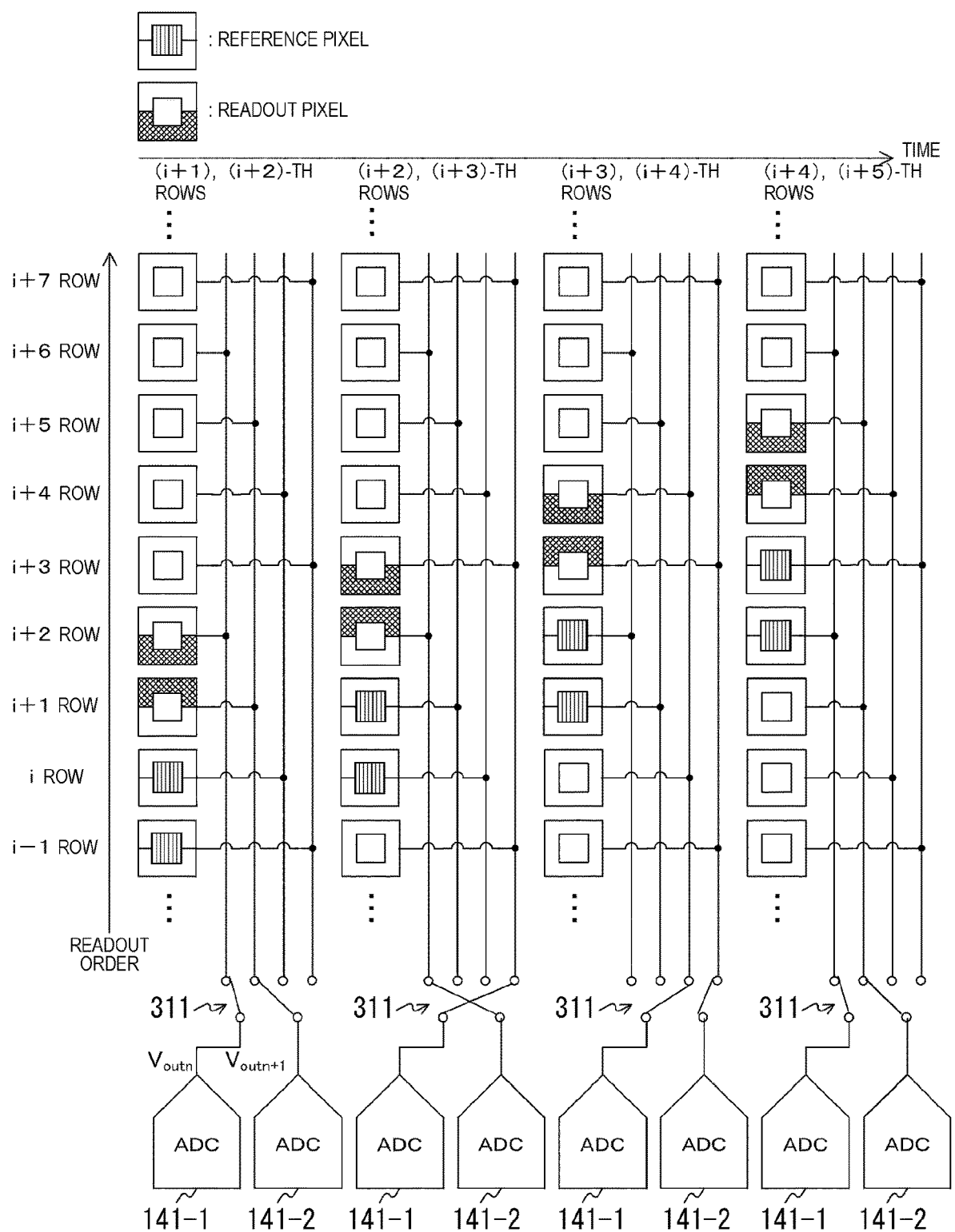
FIG. 41 is a diagram illustrating an example of a positional relationship between a readout pixel and a reference pixel according to the fifth embodiment of the present technology.

FIG. 41 is a diagram illustrating an example of a positional relationship between the readout pixels and the reference pixels according to the fifth embodiment of the present technology. FIG. 41 illustrates an FD two pixel-sharing structure and a case of simultaneously reading two rows of readout pixels. In the case of configuring two differential pairs using two reference pixels for two readout pixels in order to simultaneously read two rows, two ADCs are arranged for each column of pixels. In FIG. 41, one reference pixel is separated by two FD rows from one readout pixel, and two reference pixels are separated by two FD rows from two readout pixels. Each reference pixel is accessed while maintaining the relative positional relationship with the FD of each readout pixel.

For example, ADCs 141-1 and 141-2 are arranged for each column. The vertical drive unit 12 selects an upper pixel row of the (i+1)-th FD row and a lower pixel row of the (i+2)-th FD row as the readout rows, and selects the i-th and (i−1)-th FD rows as the reference rows. The multiplexer 311 connects two of the four vertical signal lines, the two corresponding to the readout rows, to the ADCs 141-1 and 141-2.

Next, when a horizontal synchronization period elapses, the vertical drive unit 12 selects an upper pixel row of the (i+2)-th FD row and a lower pixel row of the (i+3)-th FD row as the readout rows, and selects the (i+1)-th and i-th FD rows as the reference rows. Hereinafter, similar control is repeated.

As described above, according to the fifth embodiment of the present technology, a pair of rows sharing an FD is simultaneously selected as the readout rows. Therefore, the readout speed can be improved as compared with the case of reading one row at a time.

8. Sixth Embodiment

In the above-described fifth embodiment, the vertical drive unit 12 has selected a pair of effective pixel rows as the readout rows and has selected a pair of FD rows (in other words, two pairs of effective pixel rows) as the reference rows. However, in this configuration, four vertical signal lines and four vertical reset input lines need to be wired for each column, and the number of vertical wiring increases as compared with the first embodiment in which one effective pixel row is selected at a time. A CMOS image sensor 10 of a sixth embodiment is different from that of the first embodiment in reducing the number of vertical wiring by selecting one FD row (in other words, a pair of effective pixel rows) as reference rows.

Figure 42:
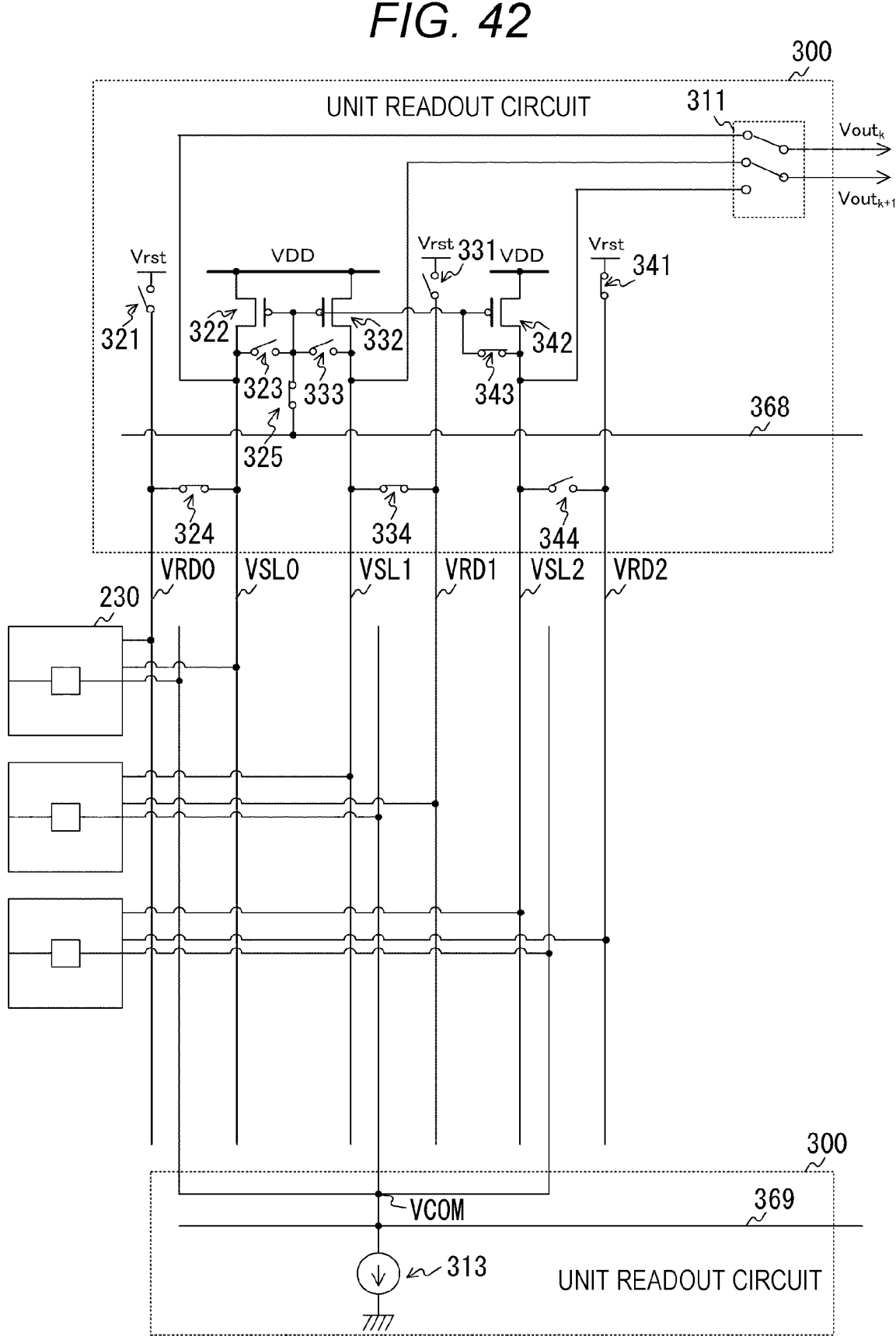
FIG. 42 is a circuit diagram illustrating a configuration example of a unit readout circuit according to a sixth embodiment of the present technology.

FIG. 42 is a circuit diagram illustrating a configuration example of a unit readout circuit 300 according to the sixth embodiment of the present technology. A unit readout circuit 300 of the sixth embodiment is different from that of the fifth embodiment in that a PMOS transistor 352 and switches 351, 353, and 354 are not provided.

Furthermore, a vertical reset input line VRD3 and a vertical signal line VSL3 are not wired in a pixel array unit 11. A multiplexer 311 connects any two of vertical signal lines VSL0 to VSL2 to output terminals $Vout_n$ and $Vout_{n+1}$.

Then, a vertical drive unit 12 simultaneously selects a pair of adjacent effective pixel rows as readout rows, and selects one FD row adjacent to the readout rows (in other words, a pair of effective pixel rows) as reference rows.

Note that a column readout circuit unit 13 does not perform readout in an SF mode. However, a configuration of adding a switch and switching the SF mode and a differential mode can be adopted. In this case, as illustrated in FIGS. 19 and 20, a switch for switching a connection destination of a vertical reset input line VRD0 or the like to a power supply VDD is only required to be added, for example.

Figure 43:
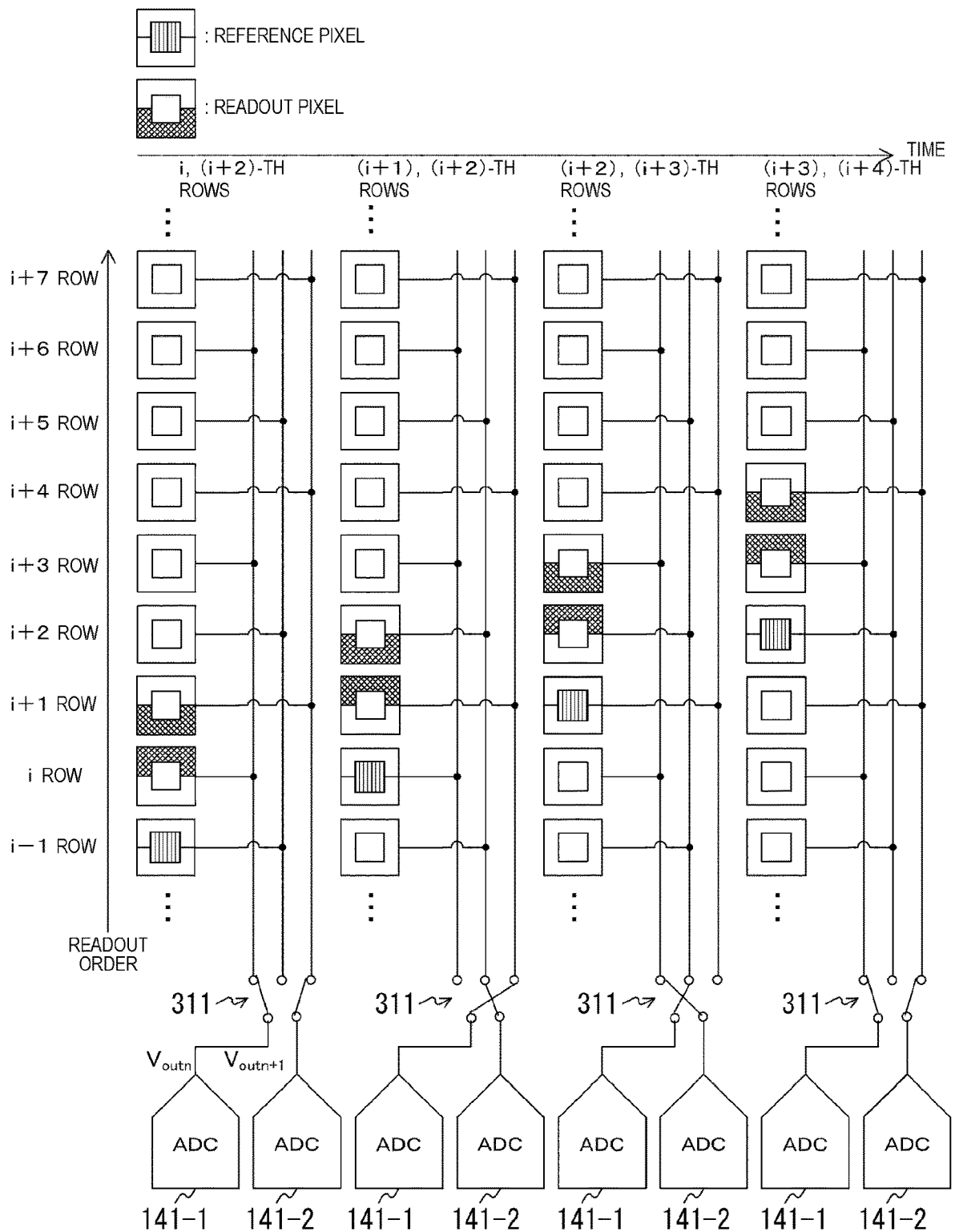
FIG. 43 is a diagram illustrating an example of a positional relationship between a readout pixel and a reference pixel according to the sixth embodiment of the present technology.

FIG. 43 is a diagram illustrating an example of a positional relationship between the readout pixels and the reference pixels according to the sixth embodiment of the present technology. FIG. 43 illustrates an FD two pixel-sharing structure and a case of simultaneously reading two rows of readout pixels. To simultaneously read two rows, a differential pair is configured using one reference pixel for two readout pixels. The number of reference pixels may be smaller than the number of readout pixels. In FIG. 43, the reference pixel is separated by two FD rows from one readout pixel, and the reference pixel is separated by one FD row from two readout pixels. Each reference pixel is accessed while maintaining the relative positional relationship with the FD of each readout pixel.

For example, the vertical drive unit 12 selects an upper pixel row of the i-th FD row and a lower pixel row of the (i+1)-th FD row as the readout rows, and selects the (i−1)-th FD row as the reference row. Next, when a horizontal synchronization period elapses, the vertical drive unit 12 selects an upper pixel row of the (i+1)-th FD row and a lower pixel row of the (i+2)-th FD row as the readout rows, and selects the i-th FD row as the reference row. Hereinafter, similar control is repeated.

As described above, according to the sixth embodiment of the present technology, the vertical drive unit 12 selects one FD row (a pair of effective pixel rows) as the reference row. Therefore, the number of wiring in the vertical direction can be reduced as compared with the fifth embodiment in which a pair of FD rows is selected as the reference rows.

9. Seventh Embodiment

In the above-described first embodiment, the readout pixel and the reference pixel have been interchanged. However, a large number of switches for interchanging the pixels need to be arranged in the column readout circuit unit 13. The circuit scale of the column readout circuit unit 13 increases by the space for the switches. A CMOS image sensor 10 of a seventh embodiment is different from that of the first embodiment in fixing a position of a reference pixel and not performing control of interchanging a readout pixel and the reference pixel.

Figure 44:
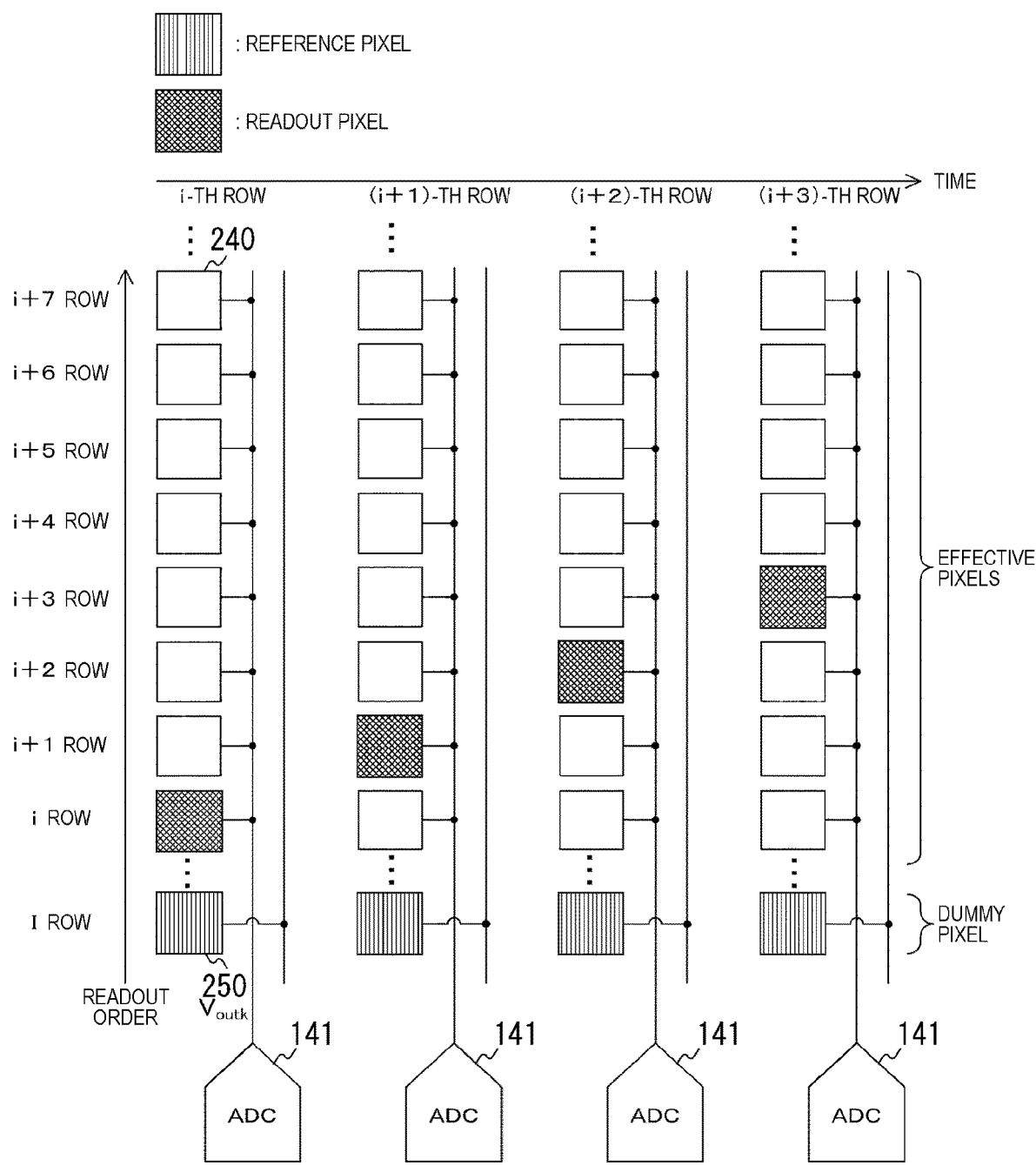
FIG. 44 is a diagram illustrating an example of a positional relationship between a readout pixel and a reference pixel according to the seventh embodiment of the present technology.

FIG. 44 is a diagram illustrating an example of a positional relationship between the readout pixel and the reference pixel according to the seventh embodiment of the present technology. In FIG. 44, a dummy pixel dedicated to a reference pixel or an effective pixel located at an end in a vertical direction of effective pixels is selected as the reference pixel, and forms a differential pair. FIG. 44 is an access example associated with the circuit configuration examples illustrated in FIGS. 13 and 14. As illustrated in FIGS. 13 and 14, it is not necessary to interchange the reference pixel and the readout pixel, so a column readout circuit unit 13 is not provided with a switch for interchanging. Regardless of readout of a readout pixel, the absolute position of the reference pixel is fixed by the dummy pixel.

For example, the dummy pixel is arranged in an I (I is an integer) row at the lower end, and a region other than the I row corresponds to an effective pixel region. A vertical drive unit 12 selects the i-th effective pixel row as the readout row and selects the I-th dummy row as the reference row. Then, the column readout circuit unit 13 reads the i-th readout row by a differential amplification circuit. Next, when a horizontal synchronization period elapses, the vertical drive unit 12 selects the (i+1)-th effective pixel row as the readout row and selects the I-th dummy row as the reference row. Hereinafter, similar control is repeated.

As described above, according to the seventh embodiment of the present technology, the position of the reference pixel is fixed, and the readout pixel and the reference pixel are read without being interchanged. Therefore, a switch for interchanging the readout pixel and the reference pixel is not necessary, and the circuit scale can be reduced.

10. Eighth Embodiment

In the above-described seventh embodiment, the position of the reference pixel has been fixed. However, in the case where the position of a reference pixel is fixed, an output of a column having variations in a threshold voltage Vth or the like and a dummy pixel with large leakage or the like has different output characteristics in, for example, offset and gain from other columns, and becomes a fixed stripe pattern noise. A CMOS image sensor 10 of an eighth embodiment is different from that of the seventh embodiment in changing a position of a reference pixel every time readout is performed.

Figure 45:
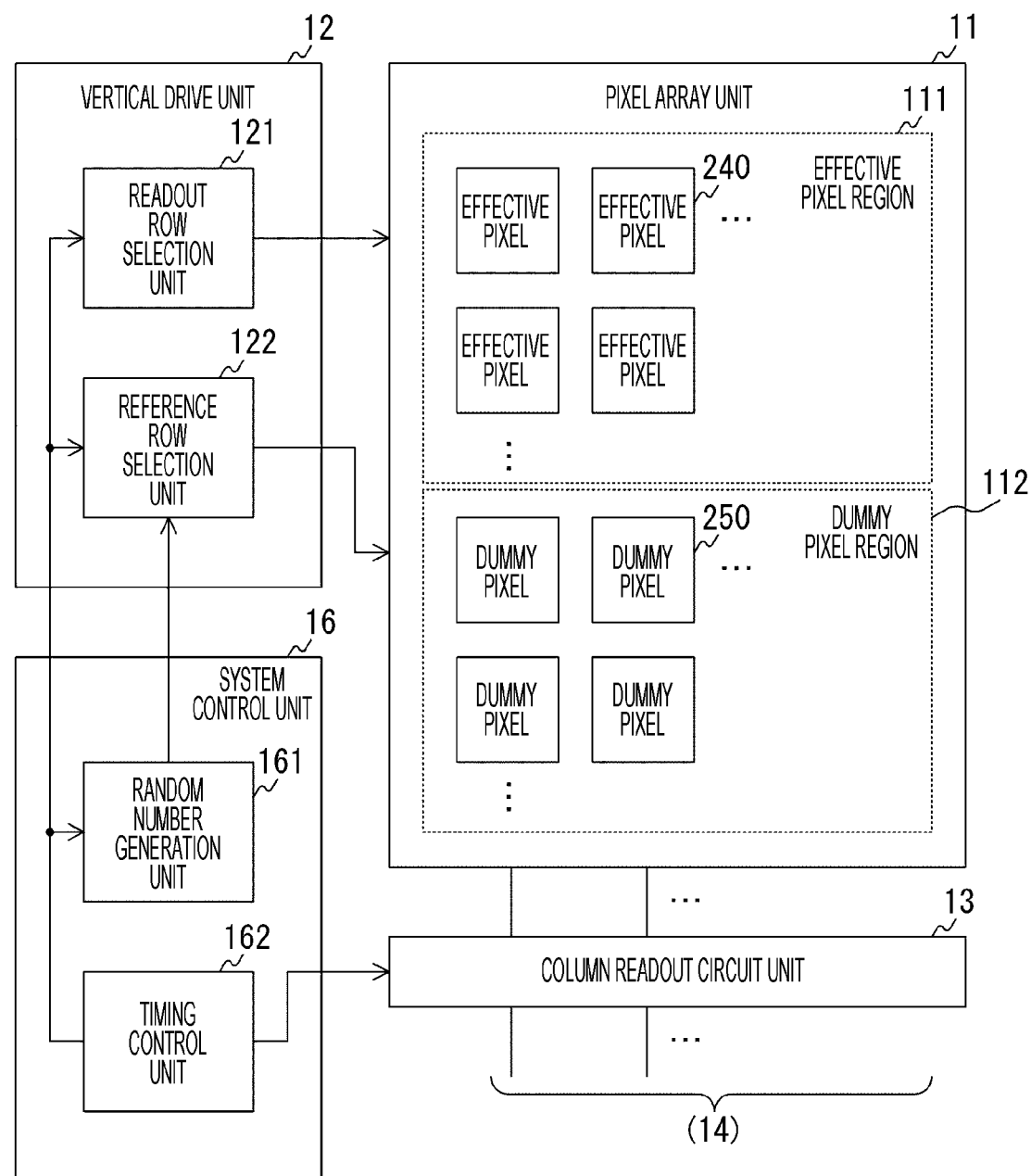
FIG. 45 is a diagram illustrating an example of a solid-state imaging device according to an eighth embodiment of the present technology.

FIG. 45 is a diagram illustrating an example of the CMOS image sensor 10 according to the eighth embodiment of the present technology. A vertical drive unit 12 of the eighth embodiment includes a readout row selection unit 121 and a reference row selection unit 122. Furthermore, a pixel array unit 11 of the eighth embodiment is provided with an effective pixel region 111 where a plurality of effective pixels 240 is arrayed in a two-dimensional lattice manner and a dummy pixel region 112 where a plurality of dummy pixels 250 is arrayed in a two-dimensional lattice manner. A system control unit 16 of the eighth embodiment includes a random number generation unit 161 and a timing control unit 162. Note that the pixel array unit 11 is an example of a pixel unit described in claims.

The timing control unit 162 controls operation timing of each of a vertical drive unit 12, a column readout circuit unit 13, a column signal processing unit 14, and a horizontal drive unit 15. The timing control unit 162 generates a horizontal synchronization signal and supplies the horizontal synchronization signal to the vertical drive unit 12 and the random number generation unit 161.

The random number generation unit 161 generates a random number in synchronization with the horizontal synchronization signal. The random number generation unit 161 generates a pseudo random number using a linear feedback shift register or the like every time a period of the horizontal synchronization signal elapses, and supplies the pseudo random number to the reference row selection unit 122.

The readout row selection unit 121 selects a readout row in synchronization with the horizontal synchronization signal. The readout row selection unit 121 sequentially selects the effective pixel rows as the readout rows every time the period of the horizontal synchronization signal elapses. The selected effective pixel generates an FD potential according to a received light amount as a signal potential.

The reference row selection unit 122 selects a reference row in synchronization with the horizontal synchronization signal. The reference row selection unit 122 selects a dummy row different from a previous dummy row as a current dummy row on the basis of the random number (in other words, randomly) every time the period of the horizontal synchronization signal elapses. The selected reference pixel generates a predetermined FD potential as a reference potential. Note that the reference row selection unit 122 randomly selects the reference row but the configuration is not limited thereto as long as a reference row different from the previous reference row can be selected. For example, the reference row selection unit 122 can select a dummy row different from the previous dummy row as the reference row in a fixed order.

The column readout circuit unit 13 reads a signal according to a difference between the reference potential and the signal potential as a pixel signal, for each column. Note that the column readout circuit unit 13 is an example of a readout circuit unit described in claims.

Figure 46:
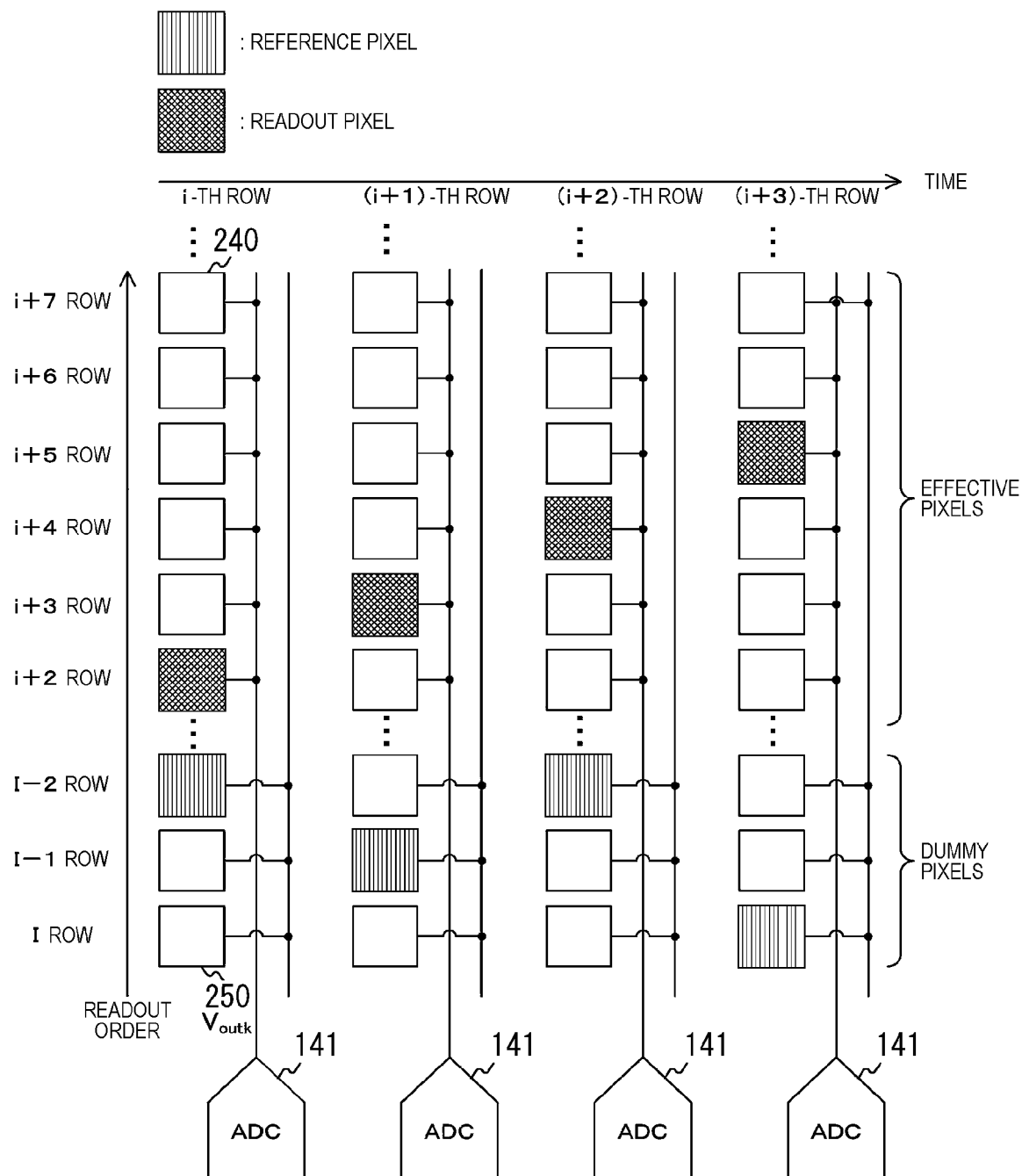
FIG. 46 is a diagram illustrating an example of a positional relationship between a readout pixel and a reference pixel according to the eighth embodiment of the present technology.

FIG. 46 is a diagram illustrating an example of a positional relationship between the readout pixel and the reference pixel according to the eighth embodiment of the present technology. FIG. 46 illustrates a pixel access order in a time direction in a case where three dummy pixels are included for each pixel column. Any one of the three dummy pixels is randomly selected regardless of an effective pixel, and forms a differential pair as the reference pixel. The random pixel address signal is generated by the system control unit 16.

For example, the dummy pixels 250 are arranged in three rows of an I row, an (I−1) row to an (I−3) row, and the effective pixels 240 are arranged in the other rows. The vertical drive unit 12 selects the i-th effective pixel row as the readout row and selects the (I−2)-th dummy row as the reference row on the basis of the random number. Next, when the period of the horizontal synchronization signal elapses, the vertical drive unit 12 selects the (i+1)-th effective pixel row as the readout row and selects the (I−1)-th dummy row as the reference row on the basis of the random number. Hereinafter, similar control is repeated.

Figure 47:
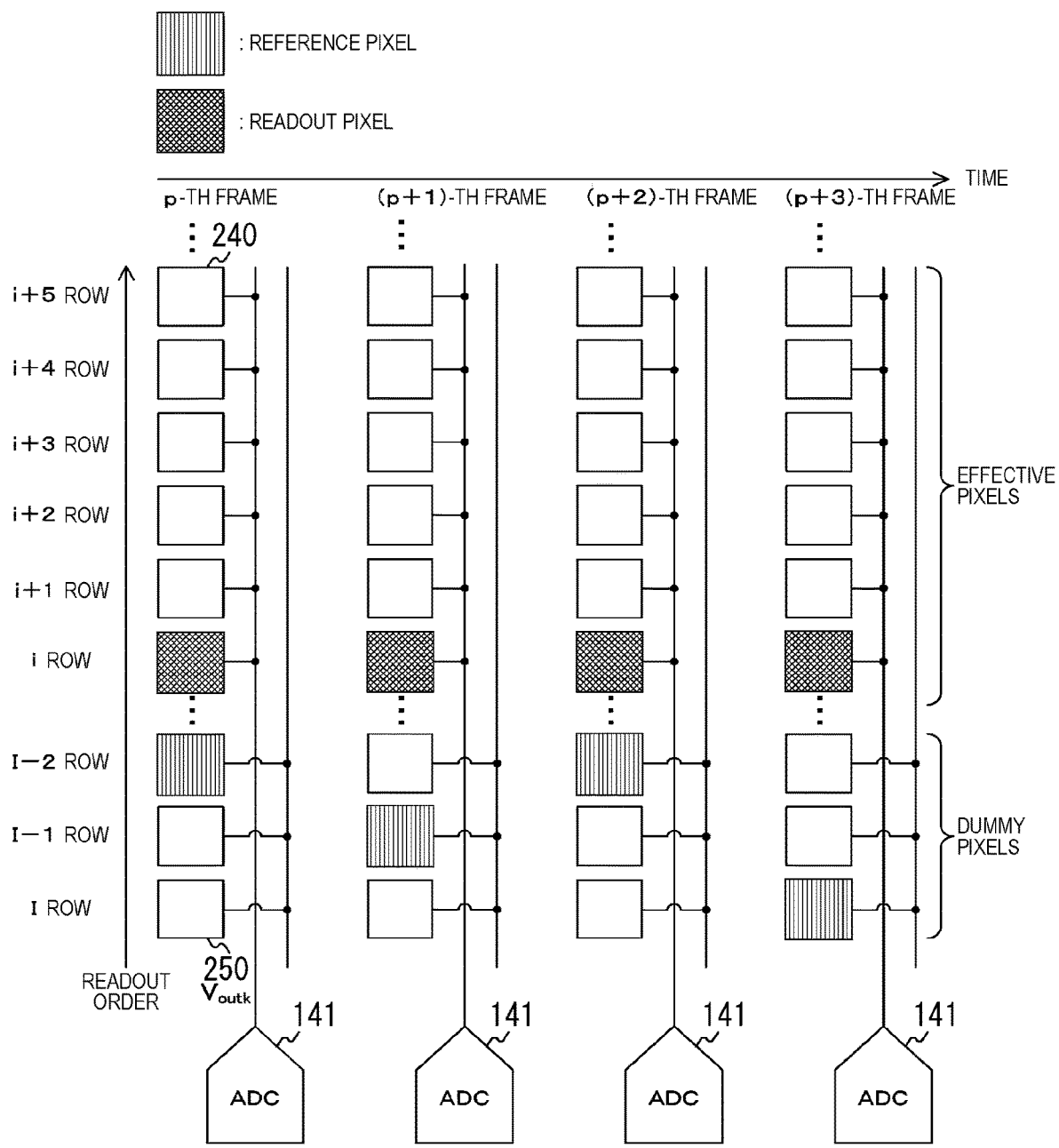
FIG. 47 is a diagram illustrating an example of a positional relationship between a readout pixel and a reference pixel in units of frame according to the eighth embodiment of the present technology.

FIG. 47 is a diagram illustrating an example of a positional relationship between the readout pixel and the reference pixel in units of frame according to the eighth embodiment of the present technology. FIG. 47 illustrates an example of randomly selecting the reference pixel in units of frame. The time is a frame unit, and indicates the position of the reference pixel for each frame when a certain i-th row is read. Although the same readout pixel is read, any one of the three dummy pixels is randomly selected for each frame and forms the differential pair as the reference pixel. The random pixel address signal is generated by the system control unit 16.

For example, the vertical drive unit 12 selects the i-th effective pixel row as the readout row and selects the (I−2)-th dummy row as the reference row on the basis of the random number in the p-th frame. Next, when a vertical synchronization signal elapses, the vertical drive unit 12 selects the i-th effective pixel row as the readout row and selects the (I−1)-th dummy row as the reference row on the basis of the random number in the (p+1)-th frame. Hereinafter, similar control is repeated. As described above, it is desirable to change not only the reference row for each period (row) of the horizontal synchronization signal but also the reference row for each period (frame) of the vertical synchronization signal.

As described above, according to the eighth embodiment of the present technology, the position of the reference row is changed every time the readout row is read. Therefore, the fixed pattern noise can be reduced as compared with the case where the position of the reference row is fixed.

11. Ninth Embodiment

In the above-described eighth embodiment, the dummy row has been randomly selected as the reference row. However, in this configuration, a plurality of dummy rows needs to be arranged, and the ratio of the effective pixel region in the pixel array unit 11 is lowered by the dummy region. A CMOS image sensor 10 of a ninth embodiment is different from that of the eighth embodiment in randomly selecting an effective pixel row as a reference row.

Figure 48:
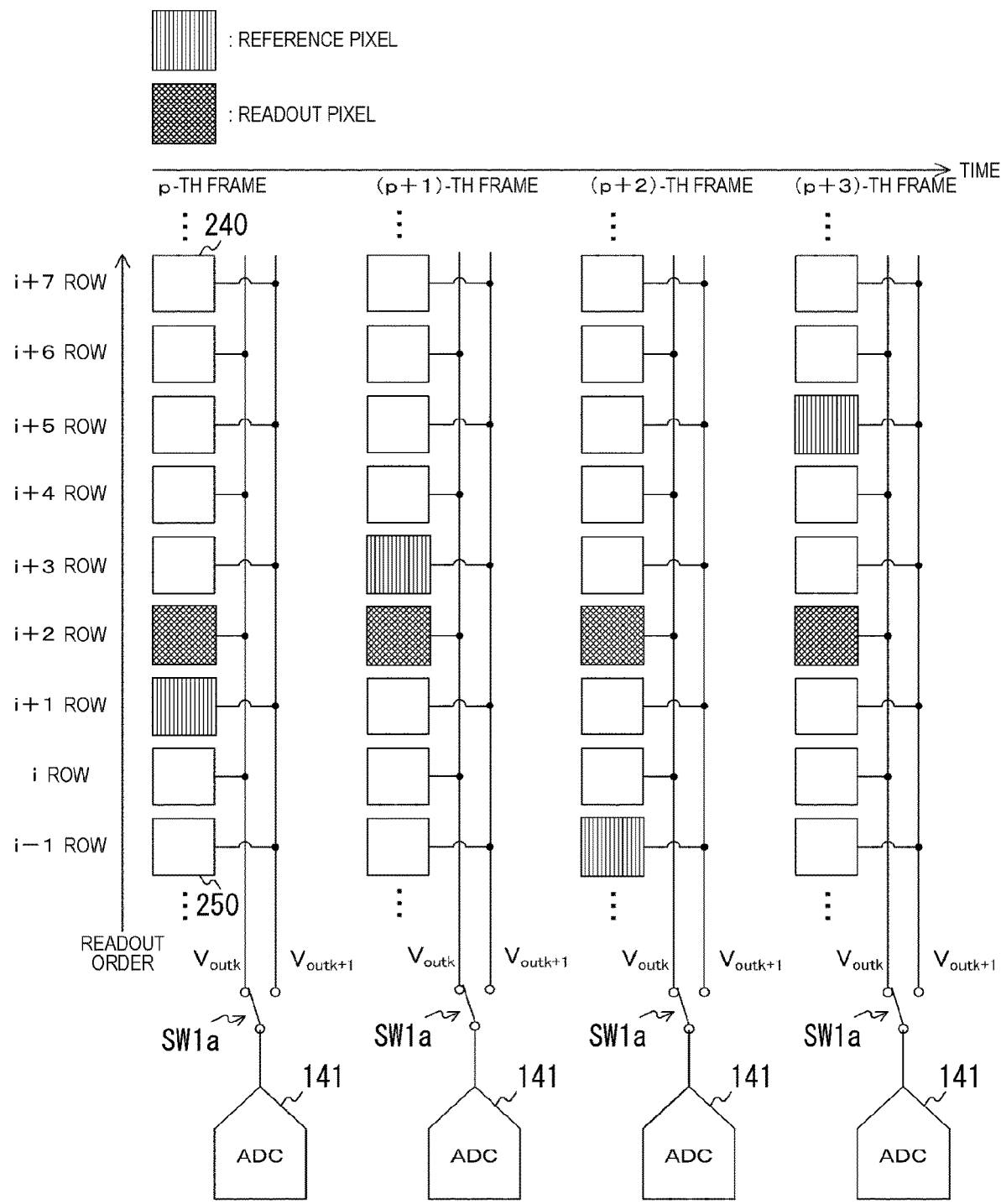
FIG. 48 is a diagram illustrating an example of a positional relationship between a readout pixel and a reference pixel in units of frame according to a ninth embodiment of the present technology.

FIG. 48 is a diagram illustrating an example of a positional relationship between a readout pixel and a reference pixel in units of frame according to the ninth embodiment of the present technology. A reference row selection unit 122 of the ninth embodiment is different from that of the eighth embodiment in randomly selecting any of effective pixel rows near a readout row as a reference row.

FIG. 48 illustrates an example of randomly accessing a reference pixel in units of frame in a case of selecting the reference pixel in the effective pixels. The time is a frame unit, and indicates the position of the reference pixel for each frame when a certain i-th row is read. Although the same readout pixel is read, any one of neighboring effective pixels that do not share a vertical signal line with the readout pixel is randomly selected for each frame, and forms a differential pair as the reference pixel. The random pixel address signal is generated by a system control unit 16. For example, an address of the reference row with respect to the readout row is randomly selected from any of −3 rows, −1 row, +1 row, or +3 rows.

For example, a vertical drive unit 12 randomly selects a reference row every time a readout row is selected. Furthermore, the vertical drive unit 12 selects the i-th effective pixel row as the readout row and selects the (i+1)-th effective pixel row as the reference row on the basis of a random number in the p-th frame. Next, when a period of a vertical synchronization signal elapses, the vertical drive unit 12 selects the i-th effective pixel row as the readout row and selects the (i+1)-th effective pixel row as the reference row on the basis of the random number in the (p+1)-th frame. Hereinafter, similar control is repeated.

As described above, according to the ninth embodiment of the present technology, the effective pixel row is selected as the reference row, and thus dummy rows can be reduced. As a result, the ratio of the effective pixel region in the pixel array unit 11 can be increased.

12. Tenth Embodiment

In the above-described second embodiment, a pair of effective pixels has been selected as the reference pixel and the readout pixel, and the differential readout has been performed. However, the image quality of image data may deteriorate due to a dark current. For example, when light enters another pixel, an in-phase node of a differential amplifier fluctuates, and a horizontal stripe called streaking occurs due to a lateral offset. When strong light enters an effective pixel and output signal amplitude is large, current balance of the differential amplifier is lost due to a channel length modulation effect of an amplifier transistor and a PMOS active load. Then, in the effective pixel, a function to adjust the current balance by taking the current from or by another pixel via the horizontally connected node works. As a result, an offset is added to a pixel output (for example, black level) without strong light, and streaking occurs. A CMOS image sensor 10 of a tenth embodiment is different from that of the first embodiment in performing differential readout from a pair of light-shielding pixels and correcting an offset of black level.

Figure 49:
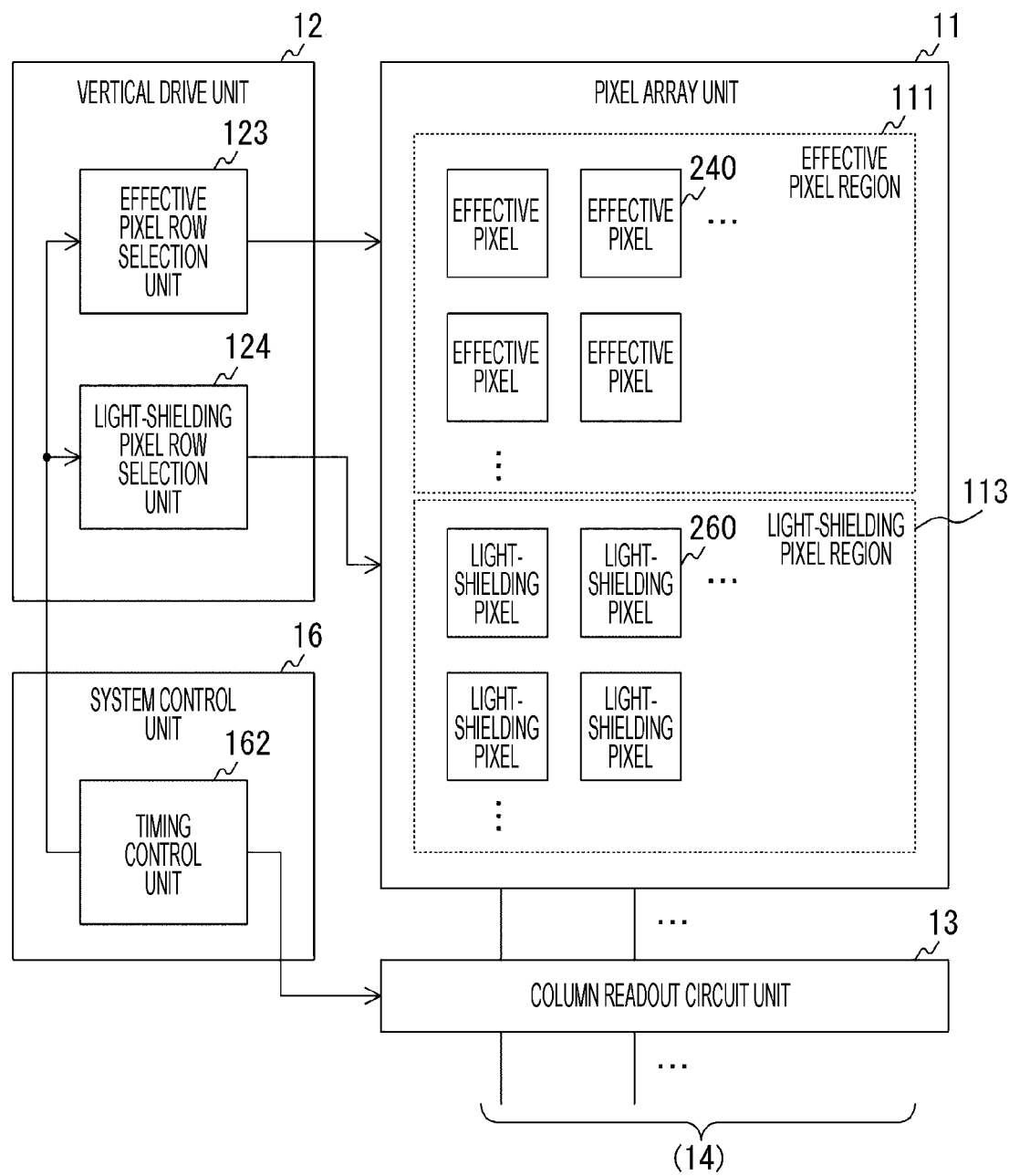
FIG. 49 is a diagram illustrating an example of a CMOS image sensor according to a tenth embodiment of the present technology.

FIG. 49 is a diagram illustrating an example of the CMOS image sensor 10 according to the tenth embodiment of the present technology. In the tenth embodiment, a random number generation unit 161 is not arranged in a system control unit 16. Furthermore, an effective pixel row selection unit 123 and a light-shielding pixel row selection unit 124 are arranged in a vertical drive unit 12 of the tenth embodiment. Furthermore, an effective pixel region 111 and a light-shielding pixel region 113 in which a plurality of light-shielding pixels 260 is arrayed in a two-dimensional lattice manner are provided in a pixel array unit 11 of the tenth embodiment.

The effective pixel row selection unit 123 selects one of a pair of horizontally adjacent effective pixels 240 as the readout pixel and the other as the reference pixel. Furthermore, the light-shielding pixel row selection unit 124 selects one of a pair of horizontally adjacent light-shielding pixels 260 as the readout pixel and the other as the reference pixel.

Figure 50:
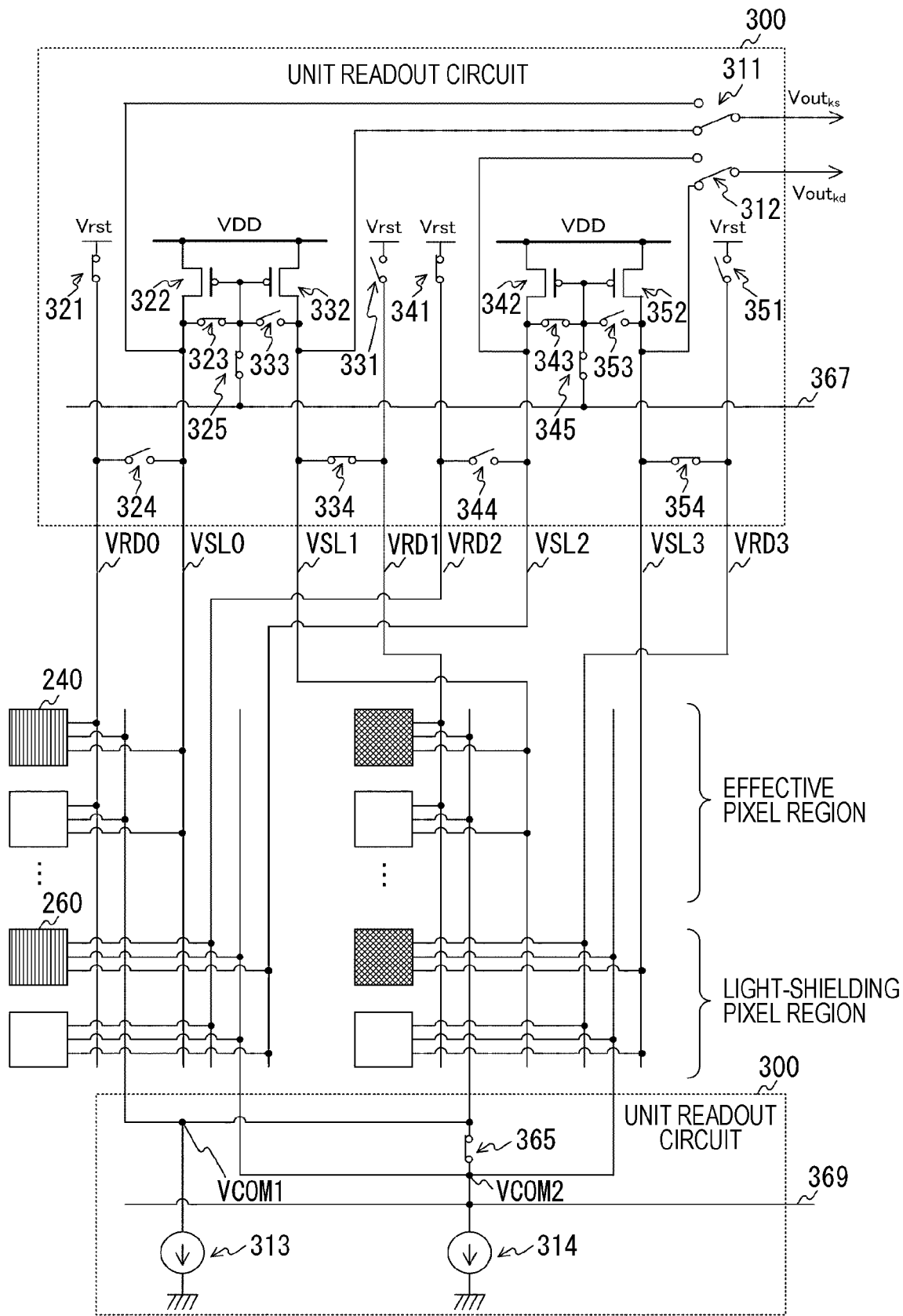
FIG. 50 is a circuit diagram illustrating a configuration example of a unit readout circuit according to the tenth embodiment of the present technology.

FIG. 50 is a circuit diagram illustrating a configuration example of a unit readout circuit 300 according to the tenth embodiment of the present technology. In a column readout circuit unit 13 of the tenth embodiment, the unit readout circuit 300 is arranged for each two columns.

The unit readout circuit 300 of the tenth embodiment includes multiplexers 311 and 312, switches 321, 331, 341, and 351, and PMOS transistors 322, 332, 342, and 352. Furthermore, the unit readout circuit 300 includes switches 323 to 325, switches 333 and 334, switches 343 to 345, switches 353 and 354, load MOS circuits 313 and 314, and a switch 365.

Furthermore, vertical reset input lines VRD0, VRD1, VRD2, and VRD3 and vertical signal lines VSL0, VSL1, VSL2, and VSL3 are wired for every two columns corresponding to the unit readout circuit 300 in the pixel array unit 11.

The vertical reset input line VRD0 and the vertical signal line VSL0 are connected to odd columns in the effective pixel region. The vertical reset input line VRD2 and the vertical signal line VSL2 are connected to odd columns in the light-shielding pixel region. Furthermore, the vertical reset input line VRD1 and the vertical signal line VSL1 are connected to even columns in the effective pixel region. The vertical reset input line VRD3 and the vertical signal line VSL3 are connected to even columns in the light-shielding pixel region.

The multiplexer 311 connects one of the vertical signal lines VSL0 and VSL1 to an output terminal $Vout_{ks}$ under the control of the vertical drive unit 12. The multiplexer 312 connects one of the vertical signal lines VSL2 and VSL3 to an output terminal $Vout_{kd}$ under the control of the vertical drive unit 12.

The load MOS circuit 313 is connected to two columns in the effective pixel region via a connection point VCOM1, and the load MOS circuit 314 is connected to two columns in the light-shielding pixel region via a connection point VCOM2.

The switch 365 connects the connection point VCOM1 and the connection point VCOM2 under the control of the vertical drive unit 12. Furthermore, the connection point VCOM2 is laterally connected via a horizontal signal line 369.

The switches 321 and 331, the PMOS transistors 322 and 332, the switches 323 to 325, and the switches 333 and 334 configure a left-side current mirror circuit, and the remaining elements configure a right-side current mirror circuit.

The left-side current mirror circuit is connected to the vertical reset input lines VRD0 and VRD1 and the vertical signal lines VSL0 and VSL1, and configures a differential amplification circuit using one of the pair of horizontally adjacent effective pixels 240 as a readout effective pixel and the other as a reference effective pixel. Meanwhile, the right-side current mirror circuit is connected to the vertical reset input lines VRD2 and VRD3 and the vertical signal lines VSL2 and VSL3, and configures a differential amplification circuit using one of the pair of horizontally adjacent light-shielding pixels 260 as a readout light-shielding pixel and the other as a reference light-shielding pixel.

Furthermore, the vertical drive unit 12 controls the switch 365 in an on state in a differential readout period. Furthermore, in the differential readout period, the vertical drive unit 12 turns on the switch 325 when averaging potentials of the reference effective pixels, and the vertical drive unit 12 turns on the switch 345 when averaging potentials of the reference light-shielding pixels.

With the above configuration, a source node, a drain node, or both of the source and drain nodes of an amplification transistor of the reference pixel and a source node, a drain node, or both of the source and drain nodes of an amplification transistor of the light-shielding pixel are laterally connected.

Furthermore, the multiplexer 311 outputs a signal differentially read from the pair of effective pixels to a column signal processing unit 14 as an effective pixel signal, and the multiplexer 312 outputs a signal differentially read from the pair of light-shielding pixels to the column signal processing unit 14 as a light-shielding pixel signal. Here, with the lateral connection configuration, potentials of the reference effective pixel and the reference light-shielding pixel are averaged, and a signal according to a difference between the averaged potential and an FD potential of the readout effective pixel is read as the effective pixel signal. Similarly, a signal according to a difference between the averaged potential and an FD potential of the readout light-shielding pixel is read as the light-shielding pixel signal.

Note that a column readout circuit unit 13 does not perform readout in an SF mode. However, a configuration of adding a switch and switching the SF mode and a differential mode can be adopted. In this case, as illustrated in FIGS. 19 and 20, a switch for switching a connection destination of the vertical reset input line VRD0 or the like to a power supply VDD is only required to be added, for example.

Figure 51:
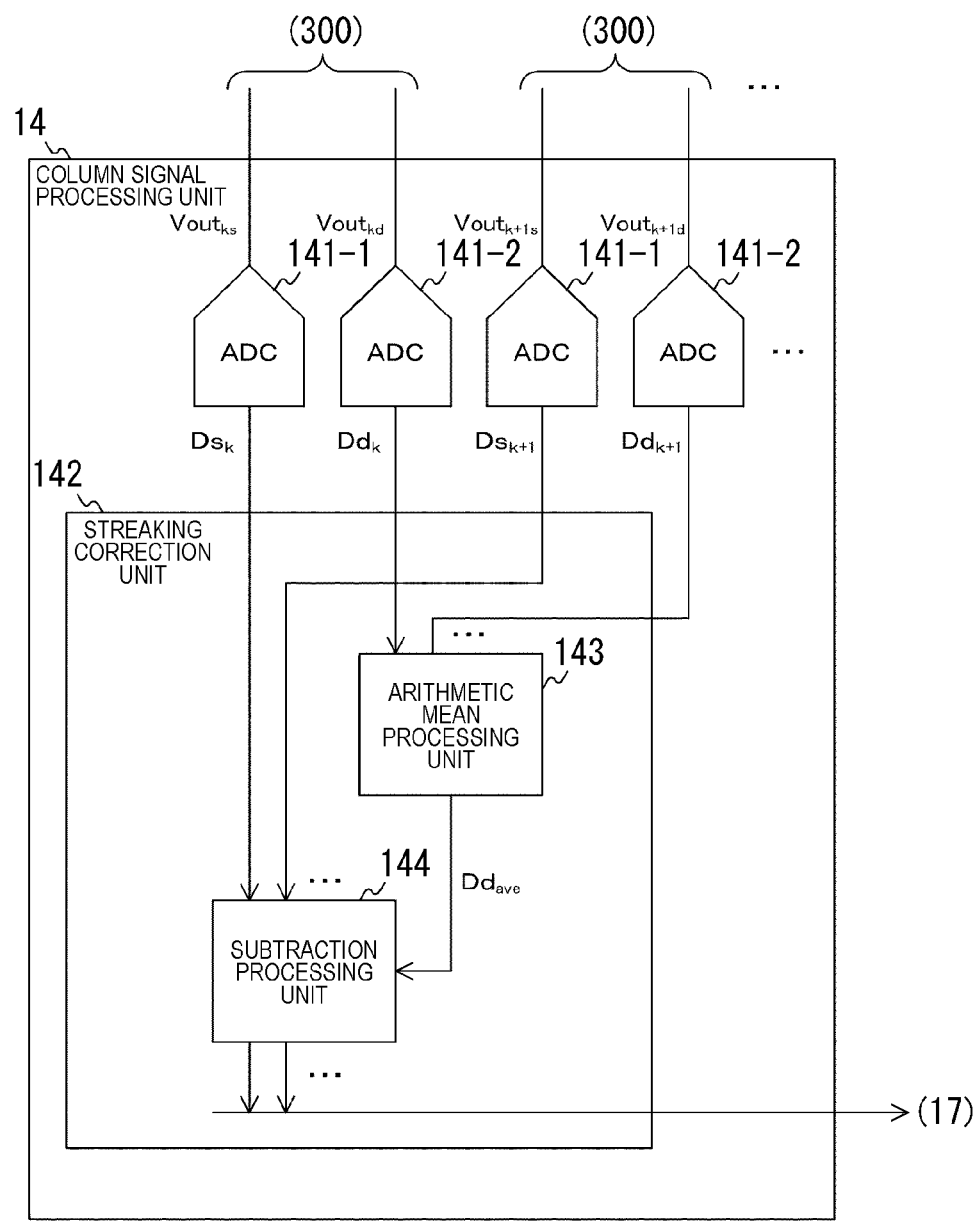
FIG. 51 is a block diagram illustrating a configuration example of a column signal processing unit according to the tenth embodiment of the present technology.

FIG. 51 is a block diagram illustrating a configuration example of the column signal processing unit 14 according to the tenth embodiment of the present technology. The column signal processing unit 14 of the tenth embodiment includes ADCs 141-1 and 141-2 for each unit readout circuit 300. Furthermore, the column signal processing unit 14 includes a streaking correction unit 142. The streaking correction unit 142 includes an arithmetic mean processing unit 143 and a subtraction processing unit 144.

The ADC 141-1 converts an analog effective pixel signal from an output terminal $Vout_{ks}$ into a digital signal $Ds_k$ and supplies the digital signal $Ds_k$ to the subtraction processing unit 144. The ADC 141-2 converts an analog light-shielding pixel signal from an output terminal $Vout_{kd}$ into a digital signal $Dd_k$ and supplies the digital signal $Dd_k$ to the arithmetic mean processing unit 143.

The arithmetic mean processing unit 143 calculates an average value of the AD-converted light-shielding pixel signals ($Dd_k$) as a black level offset. The arithmetic mean processing unit 143 supplies a calculated offset $Dd_{ave}$ to the subtraction processing unit 144.

The subtraction processing unit 144 subtracts the offset $Dd_{ave}$ from each of the AD-converted effective pixel signals, and outputs a subtraction result to a signal processing unit 17. As a result, the black level offset is corrected.

A ratio of victim pixel count/aggressor pixel count becomes large due to the lateral connection, and streaking is improved. The offset can be corrected by horizontally arranging the light-shielding pixels.

However, in this case, the area of the pixel array unit 11 increases. In contrast, in the CMOS image sensor 10, the existing vertical light-shielding pixels are used, the increase in the area and wiring of the pixel array unit 11 can be suppressed.

Figure 52:
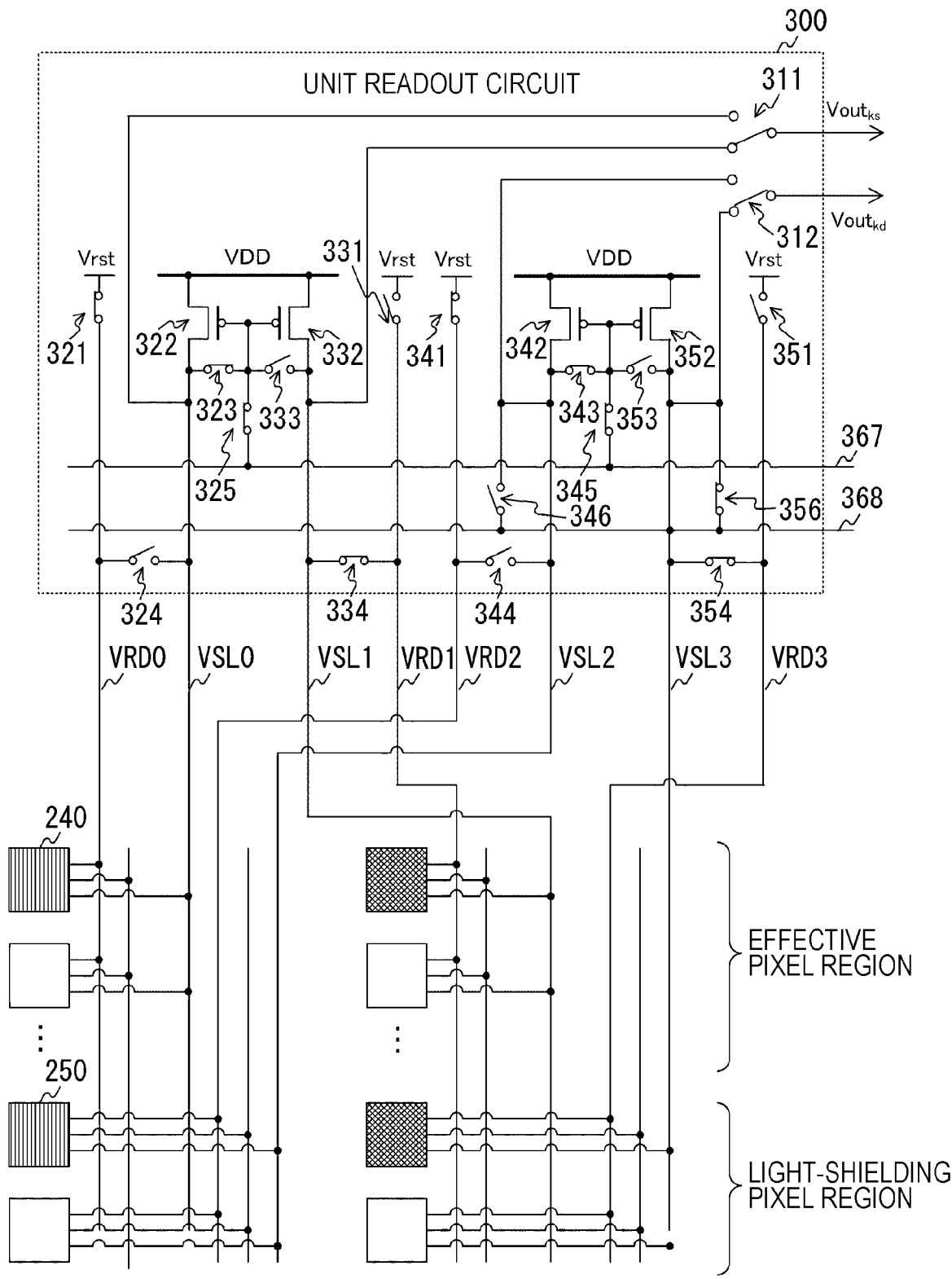
FIG. 52 is a circuit diagram illustrating a configuration example of a unit readout circuit to which a horizontal signal line is added according to the tenth embodiment of the present technology.

FIG. 52 is a circuit diagram illustrating a configuration example of a unit readout circuit to which a horizontal signal line 368 is added according to the tenth embodiment of the present technology. Furthermore, switches 346 and 356 are added. The switch 346 connects the vertical signal line VSL2 connected to the light-shielding pixel to the horizontal signal line 368 under the control of the vertical drive unit 12. The switch 356 connects the vertical signal line VSL3 connected to the light-shielding pixel to the horizontal signal line 368 under the control of the vertical drive unit 12. The vertical signal line VSL2 or VSL3 is laterally connected to an adjacent column via the horizontal signal line 368.

The vertical drive unit 12 turns on the switch 346 and turns off the switch 356 in a case where the light-shielding pixel corresponding to the vertical signal line VSL2 is used as the readout light-shielding pixel. Furthermore, the vertical drive unit 12 turns off the switch 346 and turns on the switch 356 in a case where the light-shielding pixel corresponding to the vertical signal line VSL3 is used as the readout light-shielding pixel. As a result, FD potentials of the readout light-shielding pixels in each column are averaged in addition to the FD potentials of the reference pixels in each column.

As described above, according to the tenth embodiment of the present technology, the differential readout is performed from a pair of light-shielding pixels and the black level offset is calculated. Therefore, the streaking can be suppressed by subtraction of the offset.

13. Modification (Stacked Configuration)

Figure 53:
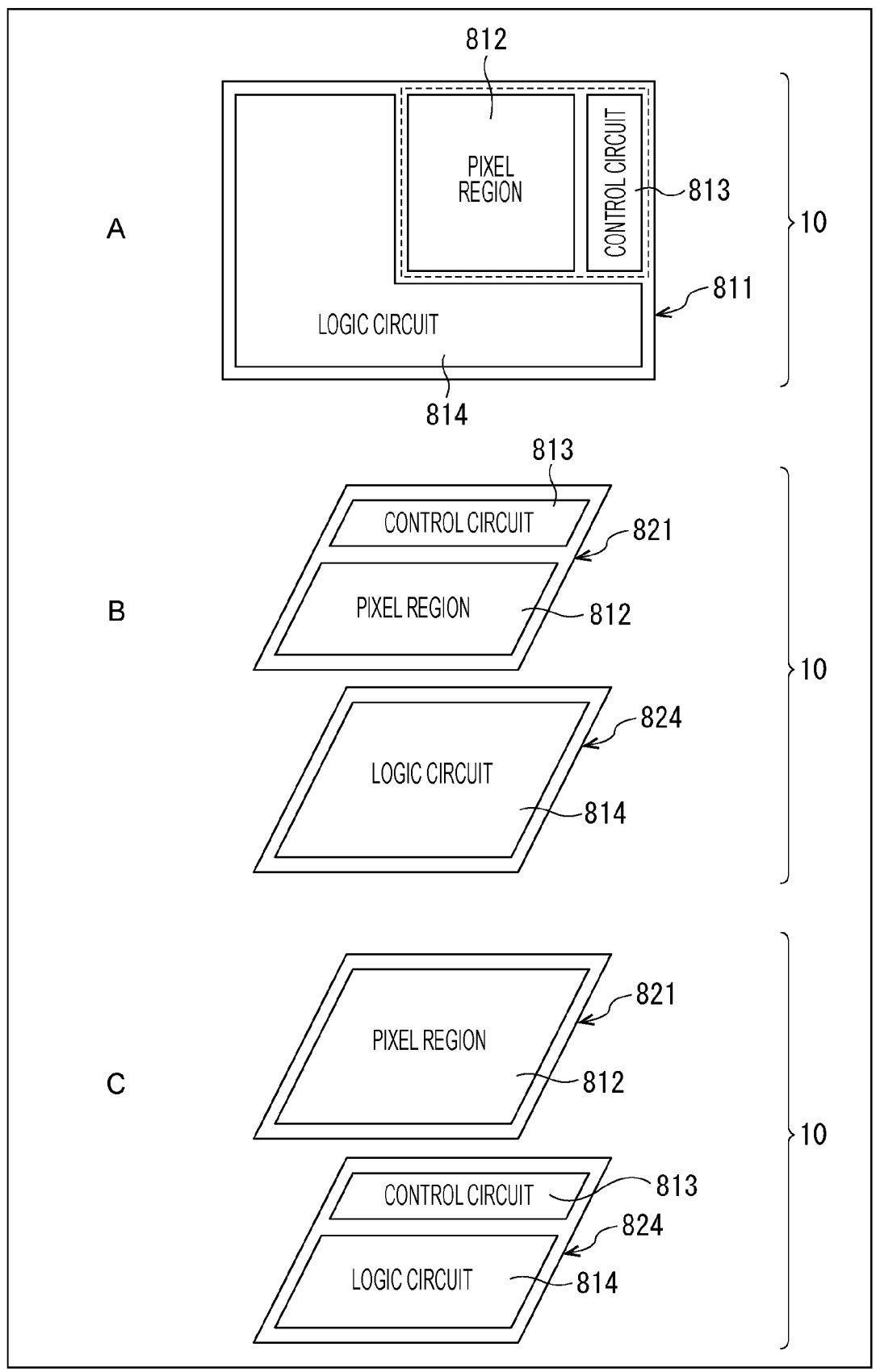
FIG. 53 is a diagram illustrating configuration examples of stacked solid-state imaging devices to which the present technology is applicable.

FIG. 53 is a diagram illustrating configuration examples of stacked solid-state imaging devices to which the present technology is applicable.

FIG. 53A illustrates a schematic configuration example of a non-stacked solid-state imaging device. The CMOS image sensor 10 (FIG. 6) has one die (semiconductor substrate) 811 as illustrated in FIG. 33A. A pixel region 812 in which pixels are two-dimensionally arranged, a control circuit 813 for driving the pixels and performing various other controls, and a logic circuit 814 for performing signal processing are mounted on the die 811.

FIGS. 53B and 53C illustrate schematic configuration examples of stacked solid-state imaging devices. As illustrated in FIGS. 33B and 33C, the CMOS image sensor 10 (FIG. 6) is configured as one semiconductor chip in which two dies of a sensor die 821 and a logic die 824 are stacked and electrically connected.

In FIG. 53B, the pixel region 812 and the control circuit 813 are mounted on the sensor die 821, and the logic circuit 814 including a signal processing circuit for performing signal processing is mounted on the logic die 824.

In FIG. 53C, the pixel region 812 is mounted on the sensor die 821, and the control circuit 813 and the logic circuit 814 are mounted on the logic die 824.

(Configuration of Signal Processing Device)

In the above description, the solid-state imaging device such as the CMOS image sensor 10 has been described as an example. However, the present technology can be applied not only to a solid-state imaging device but also to a signal processing device that perform various types of signal processing. Note that, in the readout pixel 100S and the reference pixel 100R, the floating diffusion region 121S and the floating diffusion region 121R as floating diffusions (FDs) can also be said to be a sample-hold circuit. That is, the readout-side amplification transistor 114S is provided according to each input signal from a plurality of input channels and amplifies the input signal input through the sample-hold circuit, and the reference-side amplification transistor 114R is paired with each of the readout-side amplification transistors 114S.

14. Configuration of Electronic Device

Figure 54:
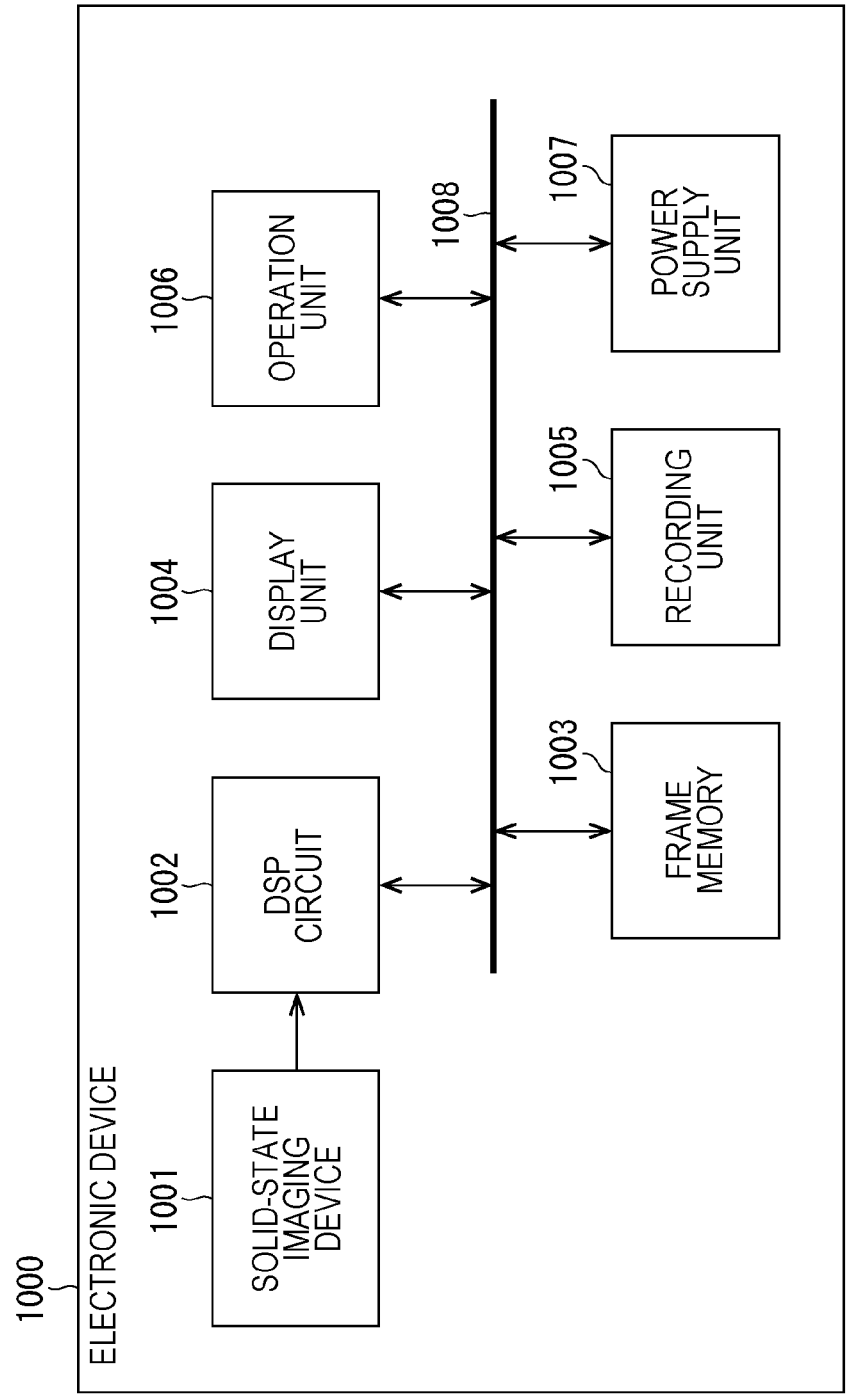
FIG. 54 is a block diagram illustrating a configuration example of an electronic device including a solid-state imaging device to which the present technology is applied.

FIG. 54 is a block diagram illustrating a configuration example of an electronic device including a solid-state imaging device to which the present technology is applied. An electronic device 1000 is an electronic device such as an imaging device like a digital still camera or a video camera, or a portable terminal device like a smart phone or a tablet terminal, for example.

The electronic device 1000 includes a solid-state imaging device 1001, a DSP circuit 1002, a frame memory 1003, a display unit 1004, a recording unit 1005, an operation unit 1006, and a power supply unit 1007. Furthermore, in the electronic device 1000, the DSP circuit 1002, the frame memory 1003, the display unit 1004, the recording unit 1005, the operation unit 1006, and the power supply unit 1007 are connected to one another via a bus line 1008.

The solid-state imaging device 1001 corresponds to the above-described CMOS image sensor 10, and performs the differential amplification readout or the source-follower readout for a plurality of pixels two-dimensionally arranged in the pixel array unit 11.

Here, in the differential amplification readout, the reset voltage of the reference pixel can be externally applied, and the reset voltage of the readout pixel can be negatively fed back from the vertical signal line 22S. Furthermore, in the differential amplification readout, nodes on source sides, drain sides, or both of the source sides and the drain sides of the amplification transistors of the reference pixels are connected (connected by wire) among the columns of the pixel array unit.

The DSP circuit 1002 is a camera signal processing circuit that processes a signal supplied from the solid-state imaging device 1001. The DSP circuit 1002 outputs image data obtained by processing the signal from the solid-state imaging device 1001. The frame memory 1003 temporarily holds the image data processed by the DSP circuit 1002 on a frame basis.

The display unit 1004 includes a panel-type display device such as a liquid crystal panel or an organic electro luminescence (EL) panel, for example, and displays a moving image or a still image imaged by the solid-state imaging device 1001. The recording unit 1005 records image data of a moving image or a still image captured by the solid-state imaging device 1001 on a recording medium such as a semiconductor memory or a hard disk.

The operation unit 1006 outputs operation commands for various functions held by the electronic device 1000 in response to an operation by a user. The power supply unit 1007 appropriately supplies various power sources serving as operating power sources of the DSP circuit 1002, the frame memory 1003, the display unit 1004, the recording unit 1005, and the operation unit 1006 to these supply targets.

The electronic device 1000 is configured as described above. The present technology is applied to the solid-state imaging device 1001 as described above. Specifically, the CMOS image sensor 10 can be applied to the solid-state imaging device 1001.

By applying the present technology to the solid-state imaging device 1001, in the differential amplification readout, the reset voltage of the reference pixel can be externally applied, and the reset voltage of the readout pixel can be negatively fed back from the vertical signal line 22S. Therefore, the differential amplification readout enables not only suppressing out of readable range of a reset level due to reset feedthrough but also controlling a floating diffusion region potential of a readout pixel at the time of reset to a desired value while realizing high conversion efficiency (amplification factor).

Furthermore, by applying the present technology to the solid-state imaging device 1001, nodes on source sides, drain sides, or both of the source sides and the drain sides of the amplification transistors of the reference pixels can be connected (connected by wire) among the columns of the pixel array unit in the differential amplification readout. Therefore, the increase in noise can be suppressed while realizing the high conversion efficiency (amplification factor) by the differential amplification readout.

15. Use Example of Solid-State Imaging Device

Figure 55:
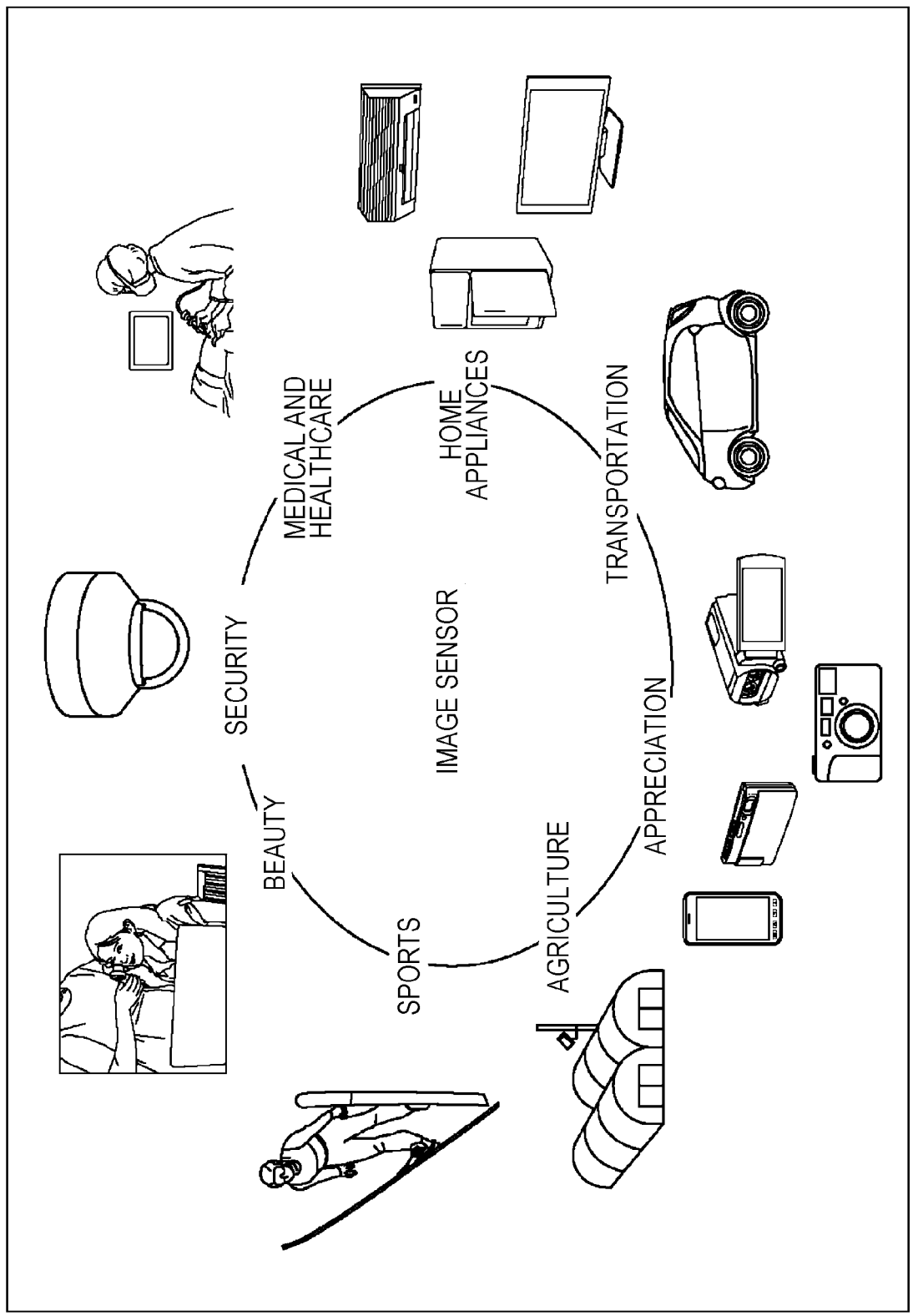
FIG. 55 is a diagram illustrating use examples of the solid-state imaging device to which the present technology is applied.

FIG. 55 is a diagram illustrating use examples of the solid-state imaging device to which the present technology is applied.

The CMOS image sensor 10 can be used in various cases of sensing light such as visible light, infrared light, ultraviolet light, and an X-rays, for example as follows. That is, as illustrated in FIG. 22, the CMOS image sensor 10 can be used in devices in the field of traffic, the field of home appliances, the field of medical and healthcare, the field of security, the field of beauty, the field of sports, the field of agriculture, or the like, for example, in addition to the field of appreciation in which images to be provided for use in appreciation are captured.

Specifically, in the field of appreciation, for example, the CMOS image sensor 10 can be used in a device (for example, the electronic device 1000 in FIG. 34) for capturing an image to be provided for appreciation, such as a digital camera, a smart phone, or a mobile phone device having a camera function.

In the field of traffic, for example, the CMOS image sensor 10 can be used in a device provided for use in traffic, such as an in-vehicle sensor that captures the front, rear, peripheries, an interior of the vehicle, etc. for safe driving such as automatic stop, recognition of a state of a driver, or the like, a monitoring camera that monitors traveling vehicles and roads, or a distance measuring sensor that measures a distance between vehicles or the like.

In the field of home appliances, for example, the CMOS image sensor 10 can be used in devices provided for home appliances such as TV receivers, refrigerators, and air conditioners to capture gestures of users and perform device operations according to the gestures.

Furthermore, in the field of medical and healthcare, for example, the CMOS image sensor 10 can be used in a device provided for use in medical and healthcare, such as an endoscope or a device that performs angiography by receiving infrared light.

In the field of security, for example, the CMOS image sensor 10 can be used in a device provided for use in security, such as a monitoring camera for crime prevention or a camera for person authentication use. Furthermore, in the field of beauty, for example, the CMOS image sensor 10 can be used in a device provided for use in beauty, such as a skin measuring instrument that captures skin or a microscope that captures scalp.

In the field of sports, for example, the CMOS image sensor 10 can be used in a device provided for use in sports, such as an action camera or a wearable camera for sport use or the like. Furthermore, in the field of agriculture, for example, the CMOS image sensor 10 can be used in a device provided for use in agriculture, such as a camera for monitoring the condition of fields and crops 16. Application Example to Moving Body The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 56:
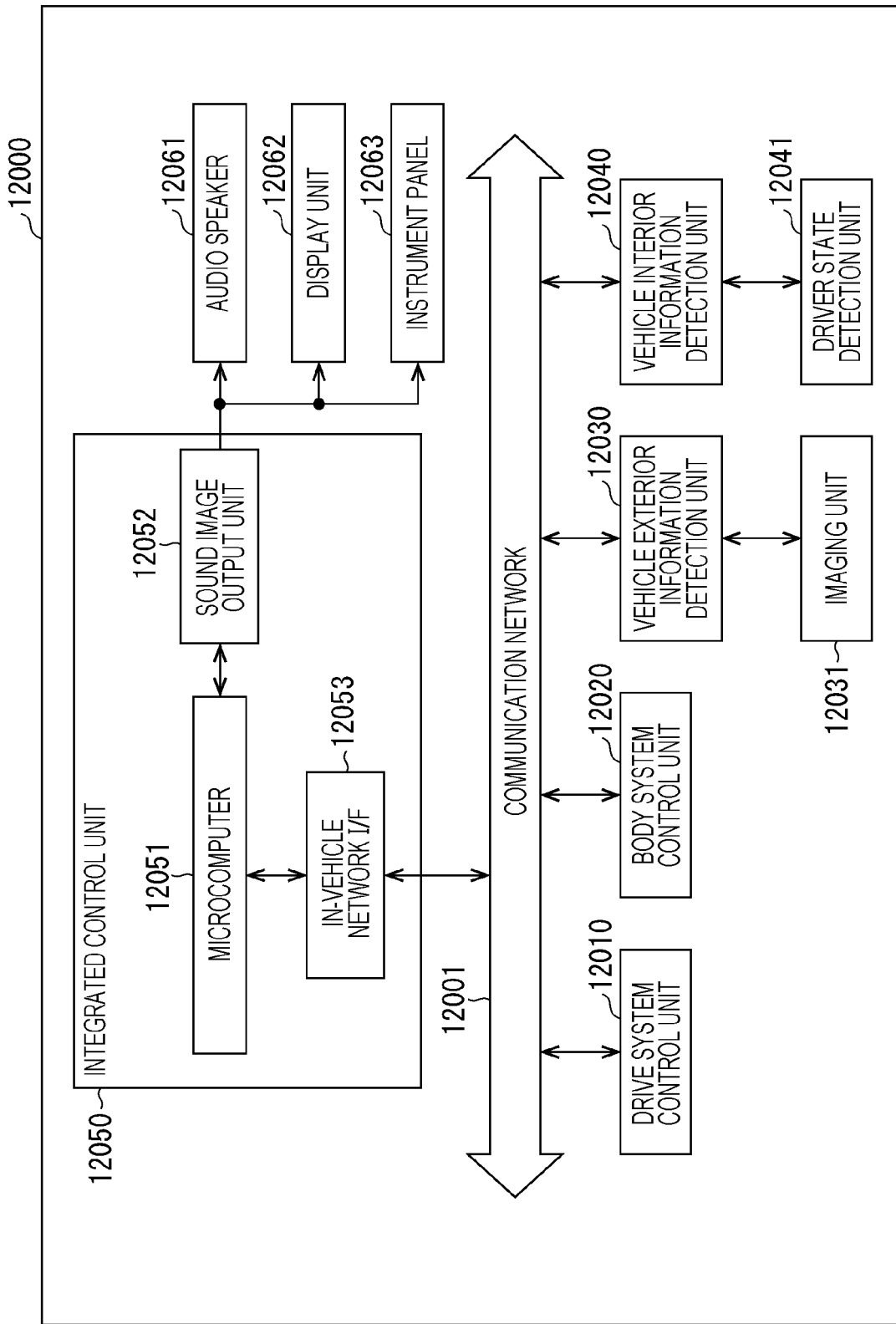
FIG. 56 is a block diagram illustrating an example of a schematic configuration of a vehicle control system.

FIG. 56 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 56, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a received light amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on a vehicular gap, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 56, as the output device, an audio speaker 12061, a display unit 12062, and an instrument panel 12063 are exemplarily illustrated. The display unit 12062 may include, for example, at least one of an on-board display or a head-up display.

Figure 57:
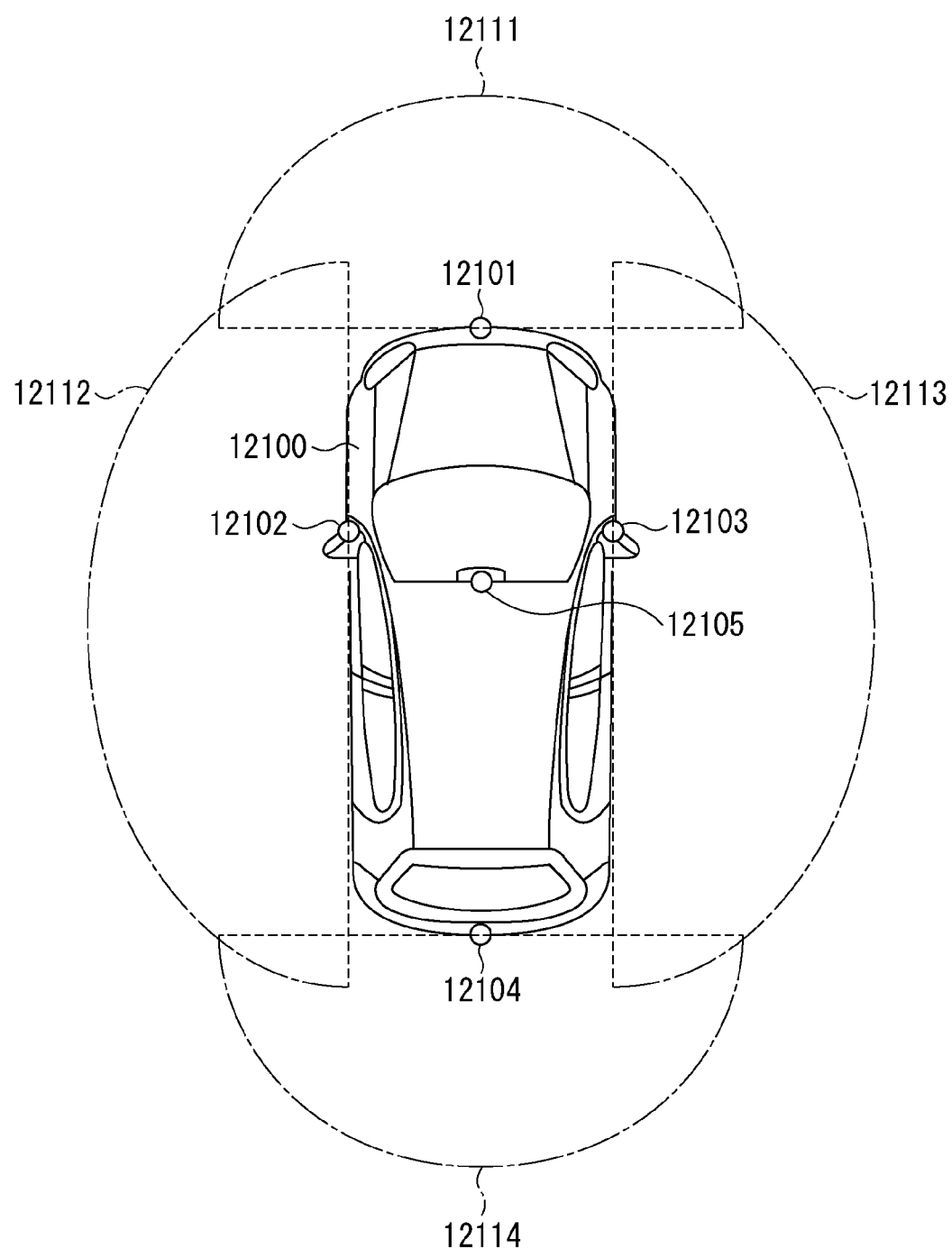
FIG. 57 is an explanatory diagram illustrating an example of installation positions of a vehicle exterior information detection unit and an imaging unit.

FIG. 57 is a diagram illustrating an example of an installation position of the imaging unit 12031.

In FIG. 57, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper or a back door, an upper portion of a windshield, and the like in an interior of the vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires an image in back of the vehicle 12100. The imaging unit 12105 provided at the upper portion of the windshield in the interior of the vehicle is mainly used for detecting a preceding vehicle, a pedestrian, an obstacle, a traffic signal, a traffic sign, a lane, or the like.

Note that FIG. 57 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of image sensors or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12101, of the above-described configurations. Specifically, the CMOS image sensor 10 in FIG. 1 can be applied to the imaging unit 12031. By applying the technology according to the present disclosure to the imaging unit 12031, out of the readable range of the reset level due to reset feedthrough can be suppressed while realizing the high conversion efficiency (amplification factor) by the differential amplification readout. In addition, the FD potential of the readout pixel at the time of reset can be controlled to a desired value, or the increase in noise can be suppressed. Therefore, for example, a captured image with higher quality can be acquired, and obstacles such as pedestrians can be more accurately recognized.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Note that the effects described in the present specification are merely examples and are not limited, and other effects may be exhibited.

Note that the present technology can also have the following configurations.

(1) A solid-state imaging device including:
 a pixel unit provided with a plurality of rows, each row including a plurality of pixels;
 a readout row selection unit configured to select one of the plurality of rows as a readout row every time a predetermined period elapses and cause each of the plurality of pixels in the readout row to generate a signal potential according to a received light amount;
 a reference row selection unit configured to select a row different from a previous row from among the plurality of rows as a current reference row every time the predetermined period elapses, and cause each of the plurality of pixels in the reference row to generate a predetermined reference potential; and
 a readout circuit unit configured to read a signal according to a difference between the signal potential and the reference potential.

(2) The solid-state imaging device according to (1), further including:
 a random number generation unit configured to generate a predetermined random number, in which
 the reference row selection unit selects the reference row on the basis of the random number.

(3) The solid-state imaging device according to (1) or (2), in which
 the plurality of rows includes an effective pixel row including an effective pixel that performs photoelectric conversion and a dummy pixel row including a dummy pixel that does not perform photoelectric conversion,
 the readout row selection unit selects one of the effective pixel rows as the readout row, and
 the reference row selection unit selects one of the dummy pixel rows as the reference row.

(4) The solid-state imaging device according to (1) or (2), in which
 the plurality of rows includes an effective pixel row including an effective pixel that performs photoelectric conversion,
 the readout row selection unit selects the effective pixel row as the readout row, and
 the reference row selection unit selects a row different from the readout row from among the effective pixel rows as the reference row.

(5) The solid-state imaging device according to (4), in which
 the reference row selection unit selects an effective pixel row adjacent to the readout row in a direction perpendicular to a predetermined direction as the reference row.

(6) The solid-state imaging device according to (4), in which
 the reference row selection unit selects the effective pixel row at a predetermined relative position to the readout row in a direction perpendicular to the predetermined direction as the reference row.

(7) The solid-state imaging device according to (4), in which
 the readout row selection unit selects one of the effective pixel rows as the readout row, and
 the reference row selection unit selects the effective pixel row at a predetermined relative position to the readout row in a direction perpendicular to the predetermined direction as the reference row.

(8) The solid-state imaging device according to (4), in which
 the readout row selection unit selects a pair of the effective pixel rows not sharing a charge-voltage conversion unit as the readout rows, and
 the reference row selection unit selects two pairs of the effective pixel rows each pair sharing the charge-voltage conversion unit as the reference rows.

(9) The solid-state imaging device according to (4), in which
 the readout row selection unit selects a pair of the effective pixel rows not sharing a charge-voltage conversion unit as the readout rows, and
 the reference row selection unit selects a pair of the effective pixel rows sharing the charge-voltage conversion unit as the reference rows.

(10) The solid-state imaging device according to any one of (1) to (9), in which
 the predetermined period is a period of a horizontal synchronization signal, and
 the reference row selection unit selects a row different from the reference row corresponding to the previous readout row as the reference row every time a period of a predetermined vertical synchronization signal having a lower frequency than the horizontal synchronization signal elapses.

(11) The solid-state imaging device according to any one of (1) to (10), in which
each of the plurality of pixels in the readout row includes a readout-side amplification transistor provided according to each of input signals from a plurality of input channels and which amplifies the input signal input via a sample-hold circuit,
each of the plurality of pixels in the reference row includes a reference-side amplification transistor paired with each of the readout-side amplification transistors, and
an output of the readout-side amplification transistor is set for the sample-hold circuit on a side of the readout-side amplification transistor as a negative feedback, and an arbitrary voltage is set for a sample-hold circuit on a side of the reference-side amplification transistor.

(12) The solid-state imaging device according to (11), in which
each of the plurality of pixels includes
a photoelectric conversion unit,
a transfer transistor configured to transfer a charge photoelectrically converted by the photoelectric conversion unit,
a charge-voltage conversion unit configured to convert the charge transferred by the transfer transistor into a voltage signal, and
a reset transistor configured to reset the charge-voltage conversion unit.

(13) The solid-state imaging device according to (12), in which
each of the plurality of pixels further includes a selection transistor that selects the pixel, and
the selection transistor selects an arbitrary pair of a readout pixel including the readout-side amplification transistor and a reference pixel including the reference-side amplification transistor.

(14) The solid-state imaging device according to (12) or (13), in which
a reference pixel including the reference-side amplification transistor is read on a column-by-column basis.

(15) The solid-state imaging device according to any one of (12) to (14), in which,
in a reference pixel including the reference-side amplification transistor, the transfer transistor and the charge-voltage conversion unit are configured to be a same as an effective pixel that accumulates and reads a signal.

(16) The solid-state imaging device according to any one of (12) to (15), in which
each of the plurality of pixels is capable of source follower-type readout, and
the readout circuit unit further includes a switching unit that switches the source-follower readout and a differential amplification readout.

(17) The solid-state imaging device according to any one of (12) to (15), in which
the readout circuit unit further includes a switching unit that switches a readout pixel including the readout-side amplification transistor and a reference pixel including the reference-side amplification transistor.

(18) The solid-state imaging device according to (17), in which
the readout circuit unit complementarily switches wire connection between the readout-side amplification transistor and the reference-side amplification transistor after reading a signal read by the readout-side amplification transistor via the transfer transistor according to a differential pair with the reference-side amplification transistor, and reads a signal read by the reference-side amplification transistor before switching via the transfer transistor according to a differential pair with the readout-side amplification transistor before switching.

(19) The solid-state imaging device according to (17) or (18), in which
the switching unit sets the effective pixel near the effective pixel that accumulates and reads a signal as the reference pixel including the reference-side amplification transistor.

(20) The solid-state imaging device according to any one of (12) to (19), in which,
in a plurality of the reference-side amplification transistors, source sides, drain sides, or both of the source sides and the drain sides of all or some of the plurality of reference-side amplification transistors are connected by wire.

(21) The solid-state imaging device according to (1), in which
each of the plurality of pixels in the readout row includes a readout-side amplification transistor provided according to each of input signals from a plurality of input channels and which amplifies the input signal input via a sample-hold circuit,
each of the plurality of pixels in the reference row includes a reference-side amplification transistor paired with each of the readout-side amplification transistors, and
in a plurality of the reference-side amplification transistors, source sides, drain sides, or both of the source sides and the drain sides of all or some of the plurality of reference-side amplification transistors are connected by wire.

(22) The solid-state imaging device according to (21), in which
the input channels are included in pixels two-dimensionally arranged in a matrix in a pixel array unit, and
each of the plurality of pixels includes
a photoelectric conversion unit,
a transfer transistor configured to transfer a charge photoelectrically converted by the photoelectric conversion unit,
a charge-voltage conversion unit configured to convert the charge transferred by the transfer transistor into a voltage signal, and
a reset transistor configured to reset the charge-voltage conversion unit.

(23) The solid-state imaging device according to (22), in which
each of the pixels further includes a selection transistor that selects the pixel, and
the selection transistor selects an arbitrary pair of a readout pixel including the readout-side amplification transistor and a reference pixel including the reference-side amplification transistor.

(24) The solid-state imaging device according to (22) or (23), in which
a reference pixel including the reference-side amplification transistor is read on a column-by-column basis, and
a number of reference pixels connected by wire with the reference-side amplification transistors is a same as a number of readout pixels including the readout-side amplification transistors or less than the number of the readout pixels.

(25) The solid-state imaging device according to any one of (22) to (24), in which,
in a reference pixel including the reference-side amplification transistor,
the transfer transistor and the charge-voltage conversion unit are configured to be a same as an effective pixel that accumulates and reads a signal.

(26) The solid-state imaging device according to any one of (22) to (25), in which
each of the plurality of pixels is capable of source follower-type readout, and
the readout circuit unit further includes a switching unit that switches the source-follower readout and a differential amplification readout.

(27) The solid-state imaging device according to (22) to (25), in which
the readout circuit unit further includes a switching unit that switches a readout pixel including the readout-side amplification transistor and a reference pixel including the reference-side amplification transistor.

(28) The solid-state imaging device according to (27), in which
the solid-state imaging device complementarily switches wire connection between the readout-side amplification transistor and the reference-side amplification transistor after reading a signal read by the readout-side amplification transistor via the transfer transistor according to a differential pair with the reference-side amplification transistor, and reads a signal read by the reference-side amplification transistor before switching via the transfer transistor according to a differential pair with the readout-side amplification transistor before switching.

(29) The solid-state imaging device according to (27) or (28), in which
the switching unit sets the effective pixel near the effective pixel that accumulates and reads a signal as the reference pixel including the reference-side amplification transistor.

(30) The solid-state imaging device according to any one of (22) to (29), in which
the input signal is input to the readout-side amplification transistors and the reference-side amplification transistor via a sample-hold circuit,
an output of the differential amplification circuit is set for the sample-hold circuit on a side of the readout-side amplification transistor as a negative feedback, and
an arbitrary voltage is set for the sample-hold circuit on a side of the reference-side amplification transistor.

(31) The solid-state imaging device according to any one of (22) to (30), in which
the readout circuit unit further includes a switch configured to connect, by wire, source sides, drain sides, or both of the source sides and the drain sides of all or some of the plurality of reference-side amplification transistors in a case of an ON state.

(32) A solid-state imaging device including:
a pixel unit provided with a plurality of effective pixels each configured to perform photoelectric conversion and a plurality of light-shielding rows each configured not to perform photoelectric conversion;
an effective pixel row selection unit configured to set one of a pair of the effective pixels of the plurality of effective pixels as a readout effective pixel and cause the readout effective pixel to generate a potential according to a received light amount, and set the other of the pair of effective pixels as a reference effective pixel and cause the reference effective pixel to generate a predetermined potential;
a light-shielding pixel row selection unit configured to set one of a pair of the light-shielding pixels of the plurality of light-shielding pixels as a readout light-shielding pixel and cause the readout light-shielding pixel to generate a potential according to a dark current, and set the other of the pair of effective pixels as a reference light-shielding pixel and cause the reference light-shielding pixel to generate a predetermined potential; and
a readout circuit configured to read a signal according to a difference between the potential of the readout effective pixel and a potential obtained by averaging the potential of the reference effective pixel and the potential of the reference light-shielding pixel, and read a signal according to a difference between the potential of the readout light-shielding pixel and the averaged potential.

REFERENCE SIGNS LIST

10 CMOS image sensor
11 Pixel array unit
12 Vertical drive unit
13 Column readout circuit unit
14 Column signal processing unit
15 Horizontal drive unit
16 System control unit
17 Signal processing unit
18 Data storage unit
22,22R, 22S Vertical signal line
31 Pixel drive line
32 Vertical pixel wiring
50 Differential pixel readout circuit
61,61R,61S Vertical reset input line
62,62R, 62S Vertical current supply line
111 Effective pixel region
112 Dummy pixel region
113 Light-shielding pixel region
121 Readout row selection unit
122 Reference row selection unit
123 Effective pixel row selection unit
124 Light-shielding pixel row selection unit
141, 141-1, and 141-2 ADC
142 Streaking correction unit
143 Arithmetic mean processing unit
144 Subtraction processing unit
161 Random number generation unit
162 Timing control unit
210 and 220 Pixel
211 and 221 Photoelectric conversion unit
212 and 222 Transfer transistor
213 Reset transistor
214 Floating diffusion region
215 Amplification transistor
216 Selection transistor
230 Pixel block
240 Effective pixel
250 Dummy pixel
260 Light-shielding pixel
300 Unit readout circuit
311 and 312 Multiplexer
313 and 314 Load MOS circuit
321, 323 to 325, 331, 333, 334, 341, 343 to 346, 351, 353, 354, 356, and 365 Switch
322, 332, 342, and 352 PMOS transistor

The invention claimed is:

1. A solid-state imaging device comprising:
a pixel array including a plurality of rows, each row including a plurality of pixels, each of the pixels including a photoelectric conversion unit and a transfer transistor;
a readout row selection circuit configured to select a readout row from among the plurality of rows every time a predetermined period elapses and cause each of the plurality of pixels in the readout row to generate a signal potential according to a received light amount;
a reference row selection circuit configured to select a row different from a previous row from among the plurality of rows as a current reference row every time the predetermined period elapses, and cause each of the plurality of pixels in the reference row to generate a reference potential; and
a readout circuit configured to read a signal according to a difference between the signal potential and the reference potential, wherein
the plurality of rows includes effective pixel rows that include effective pixels that perform photoelectric conversion and dummy pixel rows that include dummy pixels,
the dummy pixel rows are arranged in a light shielding region that inhibits photoelectric conversion,
the readout row selection circuit selects one of the effective pixel rows as the readout row,
the reference row selection circuit selects one of the dummy pixel rows as the reference row,
each of the plurality of pixels in the readout row includes a readout-side amplification transistor electrically connected to the photoelectric conversion unit via the transfer transistor,
each of the plurality of pixels in the reference row includes a reference-side amplification transistor electrically connected to the photoelectric conversion unit via the transfer transistor,
an input signal is input to the readout-side amplification transistors and the reference-side amplification transistor via a sample-hold circuit,
an output of a differential amplification circuit is applied to the sample-hold circuit on a side of the readout-side amplification transistor as a negative feedback, and
an arbitrary voltage is set for the sample-hold circuit on a side of the reference-side amplification transistor.

2. The solid-state imaging device according to claim 1, further comprising:
a random number generation circuit configured to generate a random number, wherein
the reference row selection circuit selects the reference row on a basis of the random number.

3. The solid-state imaging device according to claim 1, wherein each of the plurality of pixels includes a reset transistor.

4. The solid-state imaging device according to claim 3, wherein
each of the pixels further includes a selection transistor that selects the pixel, and
the selection transistor selects an arbitrary pair of a readout pixel including the readout-side amplification transistor and a reference pixel including the reference-side amplification transistor.

5. The solid-state imaging device according to claim 3, wherein
a reference pixel including the reference-side amplification transistor is read on a column-by-column basis, and
a number of reference pixels connected by wire with the reference-side amplification transistors is a same as a number of readout pixels including the readout-side amplification transistors or less than the number of the readout pixels.

6. The solid-state imaging device according to claim 3, wherein, in a reference pixel including the reference-side amplification transistor, the transfer transistor is configured to be the same as the transfer transistor of an effective pixel that accumulates and reads a signal.

* * * * *